(12) United States Patent
Benton et al.

(10) Patent No.: US 11,541,352 B2
(45) Date of Patent: Jan. 3, 2023

(54) REMOVING COMPONENTS OF ALCOHOLIC SOLUTIONS VIA FORWARD OSMOSIS AND RELATED SYSTEMS

(71) Applicant: Porifera, Inc., San Leandro, CA (US)

(72) Inventors: Charles Benton, Berkeley, CA (US); Olgica Bakajin, Berkeley, CA (US); Jennifer Klare, Berkeley, CA (US); Ravindra Revanur, Fremont, CA (US)

(73) Assignee: Porifera, Inc., San Leandro, CA (US)

( * ) Notice: Subject to any disclaimer, the term of this patent is extended or adjusted under 35 U.S.C. 154(b) by 445 days.

(21) Appl. No.: 16/473,088

(22) PCT Filed: Dec. 22, 2017

(86) PCT No.: PCT/US2017/068345
§ 371 (c)(1),
(2) Date: Jun. 24, 2019

(87) PCT Pub. No.: WO2018/119460
PCT Pub. Date: Jun. 28, 2018

(65) Prior Publication Data
US 2020/0024557 A1    Jan. 23, 2020

Related U.S. Application Data

(60) Provisional application No. 62/438,950, filed on Dec. 23, 2016.

(51) Int. Cl.
*C12H 6/00*        (2019.01)
*B01D 61/02*       (2006.01)
(Continued)

(52) U.S. Cl.
CPC ......... *B01D 61/002* (2013.01); *B01D 61/022* (2013.01); *B01D 61/025* (2013.01);
(Continued)

(58) Field of Classification Search
CPC .. B01D 61/002; B01D 61/022; B01D 61/025; B01D 61/362; B01D 61/364;
(Continued)

(56) References Cited

U.S. PATENT DOCUMENTS 2,116,920 A   5/1938  Leonard
3,216,930 A  11/1965  Glew
(Continued)

FOREIGN PATENT DOCUMENTS

CA   2785807 A1    7/2011
CN  101228214 A    7/2008
(Continued)

OTHER PUBLICATIONS

Extended European Search Report for EP Application No. 17882858.8 dated Aug. 17, 2020.
(Continued)

*Primary Examiner* — Patrick Orme
(74) *Attorney, Agent, or Firm* — Dorsey & Whitney LLP

(57) ABSTRACT

Examples disclosed herein relate to methods and systems for controllably removing one or more solutes from a solution. Examples disclosed herein relate to methods and systems for removing water from alcoholic beverages.

20 Claims, 16 Drawing Sheets

(51) Int. Cl.
*C12G 3/08* (2006.01)
*B01D 61/00* (2006.01)
*C12H 3/00* (2019.01)
*B01D 61/58* (2006.01)
*C12H 3/02* (2019.01)
*B01D 61/36* (2006.01)

(52) U.S. Cl.
CPC ............... *B01D 61/58* (2013.01); *C12G 3/08* (2013.01); *C12H 3/00* (2019.02); *C12H 3/02* (2019.02); *C12H 6/00* (2019.02); *B01D 61/362* (2013.01); *B01D 61/364* (2013.01); *B01D 2311/06* (2013.01); *B01D 2311/08* (2013.01); *B01D 2311/25* (2013.01); *B01D 2311/2669* (2013.01); *B01D 2317/022* (2013.01); *B01D 2317/025* (2013.01); *B01D 2317/06* (2013.01); *B01D 2317/08* (2013.01)

(58) Field of Classification Search
CPC ............... B01D 61/58; B01D 2311/06; B01D 2311/08; B01D 2311/25; B01D 2311/2669; B01D 2317/022; B01D 2317/025; B01D 2317/06; B01D 2317/08; C12C 11/11; C12G 3/08; C12H 3/00; C12H 3/02; C12H 3/04; C12H 6/00
See application file for complete search history.

(56) References Cited

U.S. PATENT DOCUMENTS

| | | | |
|---|---|---|---|
| 3,352,422 A | 11/1967 | Heden | |
| 3,721,621 A | 3/1973 | Hough | |
| 4,326,509 A | 4/1982 | Usukura | |
| 4,428,720 A | 1/1984 | Van Erden et al. | |
| 4,454,176 A | 6/1984 | Buckfelder et al. | |
| 4,618,533 A | 10/1986 | Steuck | |
| 4,756,835 A | 7/1988 | Wilson | |
| 4,778,688 A * | 10/1988 | Matson | B01D 61/005 426/425 |
| 4,792,402 A * | 12/1988 | Fricker | C12H 3/04 210/651 |
| 4,900,443 A | 2/1990 | Wrasidlo | |
| 5,084,220 A | 1/1992 | Moller | |
| 5,100,556 A | 3/1992 | Nichols | |
| 5,192,434 A | 3/1993 | Moller | |
| 5,238,574 A | 8/1993 | Kawashima et al. | |
| 5,281,430 A | 1/1994 | Herron et al. | |
| 5,593,738 A | 1/1997 | Ihm et al. | |
| 5,635,071 A | 6/1997 | Al-Samadi | |
| 6,261,879 B1 | 7/2001 | Houston et al. | |
| 6,406,626 B1 | 6/2002 | Murakami et al. | |
| 6,413,070 B1 | 7/2002 | Meyering et al. | |
| 6,513,666 B2 | 2/2003 | Meyering et al. | |
| 6,755,970 B1 | 6/2004 | Knappe et al. | |
| 6,849,184 B1 | 2/2005 | Lampi et al. | |
| 6,884,375 B2 | 4/2005 | Wang et al. | |
| 6,992,051 B2 | 1/2006 | Anderson | |
| 7,177,978 B2 | 2/2007 | Kanekar et al. | |
| 7,205,069 B2 | 4/2007 | Smalley et al. | |
| 7,445,712 B2 | 11/2008 | Herron | |
| 7,611,628 B1 | 11/2009 | Hinds, III | |
| 7,627,938 B2 | 12/2009 | Kim et al. | |
| 7,799,221 B1 | 9/2010 | MacHarg | |
| 7,879,243 B2 | 2/2011 | Al-Mayahi et al. | |
| 7,901,578 B2 | 3/2011 | Pruet | |
| 7,955,506 B2 | 6/2011 | Bryan et al. | |
| 8,029,671 B2 | 10/2011 | Cath et al. | |
| 8,029,857 B2 | 10/2011 | Hoek et al. | |
| 8,038,887 B2 | 10/2011 | Bakajin et al. | |
| 8,083,942 B2 | 12/2011 | Cath et al. | |
| 8,177,978 B2 | 5/2012 | Kurth et al. | |
| 8,181,794 B2 | 5/2012 | McGinnis et al. | |
| 8,221,629 B2 | 7/2012 | Al-Mayahi et al. | |
| 8,246,791 B2 | 8/2012 | McGinnis et al. | |
| 8,252,350 B1 | 8/2012 | Cadwalader et al. | |
| 8,356,717 B2 | 1/2013 | Waller, Jr. et al. | |
| 8,518,276 B2 | 8/2013 | Stiemer et al. | |
| 8,567,612 B2 | 10/2013 | Kurth et al. | |
| 8,920,654 B2 | 12/2014 | Revanur et al. | |
| 8,960,449 B2 | 2/2015 | Tomioka et al. | |
| 9,216,391 B2 | 12/2015 | Revanur et al. | |
| 9,227,360 B2 | 1/2016 | Lulevich et al. | |
| 9,636,635 B2 | 5/2017 | Benton et al. | |
| 9,861,937 B2 | 1/2018 | Benton et al. | |
| 2001/0006158 A1* | 7/2001 | Ho | A23L 27/11 210/644 |
| 2002/0063093 A1 | 5/2002 | Rice et al. | |
| 2002/0148769 A1 | 10/2002 | Deuschle et al. | |
| 2003/0038074 A1 | 2/2003 | Patil | |
| 2003/0173285 A1 | 9/2003 | Schmidt et al. | |
| 2004/0004037 A1 | 1/2004 | Herron | |
| 2004/0071951 A1 | 4/2004 | Jin | |
| 2004/0084364 A1 | 5/2004 | Kools | |
| 2005/0056590 A1 | 3/2005 | Baggott et al. | |
| 2005/0142385 A1 | 6/2005 | Jin | |
| 2005/0166978 A1 | 8/2005 | Brueckmann et al. | |
| 2006/0144789 A1 | 7/2006 | Cath et al. | |
| 2006/0233694 A1 | 10/2006 | Sandhu et al. | |
| 2007/0181473 A1 | 8/2007 | Manth et al. | |
| 2007/0215544 A1 | 9/2007 | Kando et al. | |
| 2007/0246426 A1 | 10/2007 | Collins | |
| 2008/0017578 A1 | 1/2008 | Childs et al. | |
| 2008/0149561 A1 | 6/2008 | Chu et al. | |
| 2008/0210370 A1 | 9/2008 | Smalley et al. | |
| 2008/0223795 A1 | 9/2008 | Bakajin et al. | |
| 2008/0236804 A1 | 10/2008 | Cola et al. | |
| 2008/0237126 A1 | 10/2008 | Hoek et al. | |
| 2008/0290020 A1 | 11/2008 | Marand et al. | |
| 2009/0078640 A1 | 3/2009 | Chu et al. | |
| 2009/0214847 A1 | 8/2009 | Maruyama et al. | |
| 2009/0250392 A1 | 10/2009 | Thorsen et al. | |
| 2009/0272692 A1 | 11/2009 | Kurth et al. | |
| 2009/0283475 A1 | 11/2009 | Hylton et al. | |
| 2009/0308727 A1 | 12/2009 | Kirts | |
| 2009/0321355 A1 | 12/2009 | Ratto et al. | |
| 2010/0025330 A1 | 2/2010 | Ratto et al. | |
| 2010/0032377 A1 | 2/2010 | Wohlert | |
| 2010/0051538 A1 | 3/2010 | Freeman et al. | |
| 2010/0059433 A1 | 3/2010 | Freeman et al. | |
| 2010/0062156 A1 | 3/2010 | Kurth et al. | |
| 2010/0140162 A1 | 6/2010 | Jangbarwala | |
| 2010/0155333 A1 | 6/2010 | Husain et al. | |
| 2010/0192575 A1 | 8/2010 | Al-Mayahi et al. | |
| 2010/0206743 A1 | 8/2010 | Sharif et al. | |
| 2010/0206811 A1 | 8/2010 | Ng et al. | |
| 2010/0212319 A1 | 8/2010 | Donovan | |
| 2010/0224550 A1 | 9/2010 | Herron | |
| 2010/0224561 A1 | 9/2010 | Marcin | |
| 2010/0297429 A1 | 11/2010 | Wang et al. | |
| 2010/0320140 A1 | 12/2010 | Nowak et al. | |
| 2010/0326833 A1 | 12/2010 | Messalem et al. | |
| 2011/0017666 A1 | 1/2011 | Cath et al. | |
| 2011/0036774 A1 | 2/2011 | McGinnis | |
| 2011/0057322 A1 | 3/2011 | Matsunaga et al. | |
| 2011/0073540 A1 | 3/2011 | McGinnis et al. | |
| 2011/0132834 A1 | 6/2011 | Tomioka et al. | |
| 2011/0133487 A1 | 6/2011 | Oklejas, Jr. | |
| 2011/0155666 A1 | 6/2011 | Prakash et al. | |
| 2011/0186506 A1 | 8/2011 | Ratto et al. | |
| 2011/0203994 A1 | 8/2011 | Mcginnis et al. | |
| 2011/0220574 A1 | 9/2011 | Bakajin et al. | |
| 2011/0284456 A1 | 11/2011 | Brozell et al. | |
| 2011/0311427 A1 | 12/2011 | Hauge et al. | |
| 2012/0008038 A1 | 1/2012 | Yen et al. | |
| 2012/0012511 A1 | 1/2012 | Kim et al. | |
| 2012/0043274 A1 | 2/2012 | Chi et al. | |
| 2012/0080378 A1 | 4/2012 | Revanur et al. | |
| 2012/0080381 A1 | 4/2012 | Wang et al. | |
| 2012/0103892 A1 | 5/2012 | Beauchamp et al. | |
| 2012/0118743 A1 | 5/2012 | Liang et al. | |
| 2012/0118826 A1 | 5/2012 | Liberman et al. | |
| 2012/0118827 A1 | 5/2012 | Chang et al. | |

(56) References Cited

U.S. PATENT DOCUMENTS

| | | |
|---|---|---|
| 2012/0132595 A1 | 5/2012 | Bornia |
| 2012/0152841 A1 | 6/2012 | Vissing et al. |
| 2012/0160753 A1 | 6/2012 | Vora et al. |
| 2012/0231535 A1 | 9/2012 | Herron et al. |
| 2012/0234758 A1 | 9/2012 | McGinnis et al. |
| 2012/0241371 A1 | 9/2012 | Revanur et al. |
| 2012/0241373 A1 | 9/2012 | Na et al. |
| 2012/0251521 A1 | 10/2012 | Rostro et al. |
| 2012/0261321 A1 | 10/2012 | Han et al. |
| 2012/0267297 A1* | 10/2012 | Iyer .......... C02F 1/52 210/175 |
| 2012/0267306 A1 | 10/2012 | McGinnis et al. |
| 2012/0273421 A1 | 11/2012 | Perry et al. |
| 2012/0298381 A1 | 11/2012 | Taylor |
| 2013/0001162 A1 | 1/2013 | Yangali-Quintanilla et al. |
| 2013/0095241 A1 | 4/2013 | Lulevich et al. |
| 2013/0105383 A1 | 5/2013 | Tang et al. |
| 2013/0126431 A1 | 5/2013 | Henson et al. |
| 2013/0203873 A1 | 8/2013 | Linder et al. |
| 2013/0220581 A1* | 8/2013 | Herron ......... B01D 61/58 165/104.28 |
| 2013/0220927 A1* | 8/2013 | Moody ......... B01D 61/005 210/652 |
| 2014/0015159 A1 | 1/2014 | Lazar et al. |
| 2014/0175011 A1 | 6/2014 | Benton et al. |
| 2014/0302579 A1 | 10/2014 | Boulanger et al. |
| 2014/0319056 A1* | 10/2014 | Fuchigami ........ C02F 1/445 210/648 |
| 2015/0014232 A1 | 1/2015 | McGinnis et al. |
| 2015/0014248 A1 | 1/2015 | Herron et al. |
| 2015/0064306 A1* | 3/2015 | Tatera ........ C12G 1/02 426/14 |
| 2015/0273399 A1 | 10/2015 | Roh et al. |
| 2016/0002074 A1 | 1/2016 | Benton et al. |
| 2016/0038880 A1 | 2/2016 | Benton et al. |
| 2016/0136577 A1 | 5/2016 | McGovern et al. |
| 2016/0136578 A1 | 5/2016 | McGovern et al. |
| 2016/0136579 A1 | 5/2016 | McGovern et al. |
| 2016/0230133 A1 | 8/2016 | Peterson et al. |
| 2017/0121190 A1 | 5/2017 | Ikuno |
| 2017/0190650 A1 | 7/2017 | Peterson et al. |
| 2017/0197181 A1 | 7/2017 | Benton et al. |
| 2017/0232392 A1 | 8/2017 | Desormeaux et al. |
| 2017/0333847 A1 | 11/2017 | Lulevich et al. |
| 2018/0311618 A1* | 11/2018 | Benton ........ C12H 3/04 |

FOREIGN PATENT DOCUMENTS

| | | |
|---|---|---|
| CN | 102642894 A | 8/2012 |
| CN | 102674605 A | 9/2012 |
| CN | 105142762 A | 12/2015 |
| CN | 107922220 A | 4/2018 |
| EP | 1894612 A1 | 3/2008 |
| EP | 3181215 A1 | 6/2017 |
| FR | 2189091 A1 | 1/1974 |
| JP | S55149682 A | 11/1980 |
| JP | 59059213 A | 4/1984 |
| JP | S5959213 A | 4/1984 |
| JP | 62-140620 A | 6/1987 |
| JP | 2005-138028 A | 6/2005 |
| JP | 2010094641 A | 4/2010 |
| JP | 2012183492 A | 9/2012 |
| JP | 2013128874 A | 7/2013 |
| KR | 101144316 B1 | 5/2012 |
| KR | 101229482 B1 | 2/2013 |
| WO | 1993/010889 | 6/1993 |
| WO | 9413159 A1 | 6/1994 |
| WO | 9962623 | 12/1999 |
| WO | 0213955 A1 | 2/2002 |
| WO | 2006040175 A1 | 4/2006 |
| WO | 2008/137082 A1 | 11/2008 |
| WO | 2009/035415 | 3/2009 |
| WO | 2009039467 A1 | 3/2009 |
| WO | 2009104214 A1 | 8/2009 |
| WO | 2009129354 A2 | 10/2009 |
| WO | 2009129354 A3 | 10/2009 |
| WO | 2010006196 A2 | 1/2010 |
| WO | 2010050421 A1 | 5/2010 |
| WO | 2010067063 A1 | 6/2010 |
| WO | 2010144057 A1 | 12/2010 |
| WO | 2011028541 A1 | 3/2011 |
| WO | 2011028541 A2 | 3/2011 |
| WO | 2012/047282 | 4/2012 |
| WO | 2012/084960 | 6/2012 |
| WO | 2012095506 A1 | 7/2012 |
| WO | 2012102677 A1 | 8/2012 |
| WO | 2012/135065 | 10/2012 |
| WO | 2013/022945 A2 | 2/2013 |
| WO | 2013032742 A1 | 3/2013 |
| WO | 2013/059314 | 4/2013 |
| WO | 2014063149 A1 | 4/2014 |
| WO | 2014/071238 A1 | 5/2014 |
| WO | 2014100766 A2 | 6/2014 |
| WO | 2014144704 A1 | 9/2014 |
| WO | 2014144778 A1 | 9/2014 |
| WO | WO-2014144778 A1 * | 9/2014 .......... B01D 61/022 |
| WO | 2015157818 A1 | 10/2015 |
| WO | 2016022954 A1 | 2/2016 |
| WO | 2016070103 A1 | 5/2016 |
| WO | 2016094835 A1 | 6/2016 |
| WO | 2016210337 A2 | 12/2016 |
| WO | 2016210337 A3 | 12/2016 |
| WO | 2018119460 A1 | 6/2018 |
| WO | 2018200538 A1 | 11/2018 |
| WO | 2019113335 A1 | 6/2019 |

OTHER PUBLICATIONS

"Guide to Forward Osmosis Membranes", ForwardOsmosisTech, https://www.forwardosmosistech.com/forward-osmosis-membranes/ (last visited Aug. 19, 2020)., 2020, 1-6.

Qingchun, Ge et al., "Draw solutions for forward osmosis processes: Developments, challenges, and prospects for the future", Journal of Membrane Science, vol. 442, Sep. 1, 2013, pp. 225-237.

International Search Report and Written Opinion dated Feb. 22, 2018 for PCT Application No. PCT/US2017/068345.

Akthakul, et al., "Antifouling polymer membranes with subnanometer size selectivity", Macromolecules 37, Sep. 3, 2004, 7663-7668.

Beibei, et al., "(Category A—No Translation—do not cite per client) Preparation of Thin Film Composite Membrane by Interfacial Polymerization Method", Progress in Chemistry, vol. 19, No. 9, Sep. 30, 2007, 1-8.

Blandin, et al., "Validation of assisted forward osmosis (AFO) process: Impact of hydraulic pressure", Journal of Membrane Science vol. 447, pp. 1-11, Jun. 2013.

Cath, et al., "Forward osmosis: principles, applications and recent developments", Journal of Membrane Science 281, May 31, 2006, 70-87.

Chen, et al., Influences of molecular weight, molecular size, flux, and recovery for aromatic pesticide removal by nanofiltration membranes, Jan. 2004, Desalination 160, pp. 103-111.

Li, et al., "Electronic properties of multiwalled carbon nanotubes in an embedded vertical array", Applied Physics Letters vol. 81, No. 5, Jul. 2002, 910-912.

Mandal, et al., "Drug delivery system based on chronobiology—a review", Journal of Controlled Release 147, Aug. 4, 2010, 314-325.

McCutcheon, et al., "Influence of membrane support layer hydrophobicity on water flux in osmotically driven membrane processes", Journal of Membrane Science, Mar. 2008, 458-466.

McEuen, P. et al., "Single-Walled Nanotubes Electronics", IEEE Transactions on Nanotechnology, Vo.1, No. 1, Mar. 2002.

Santus, et al., "Osmotic drug delivery: a review of the patent literature", Journal of Controlled Release 35, Jul. 1995, 1-21.

Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences vol. 96, No. 9, Sep. 2007, 2364-2374.

(56) References Cited

OTHER PUBLICATIONS

Yip, et al., "High Performance Thin-Film Composite Forward Osmosis Membrane", Environmental Science and Technology, Apr. 21, 2010, 3812-3818.

Yip, et al., "High performance Thin-Film Composite Forward Osmosis Membrane", Environmental Science andTechnology vol. 44, Apr. 21, 2010, 3812-3818.

Yip, Nagai Y. et al., "High Performance Thin-Film Composite Forward Osmosis Membrane", Environmental Science & Technology, vol. 44, No. 10, 2010, Apr. 21, 2010, 3812-3818.

Zhao, et al., "Modification of porous poly (vinylidene fluoride) membrane using amphiphilic polymers with different structures in phase inversion process", Journal of Membrane Science 310, Mar. 2008, 567-576.

English translation of Office Action for CN Application No. 201680045242, dated Apr. 8, 2021.

English translation of Office Action for CN Application No. 201780086041.9, dated May 8, 2021.

Office Action for AU Application No. 2016283127, dated Nov. 20, 2020.

Summons to Attend Oral Proceedings for EP 16815432.6, mailed Jul. 19, 2021.

"Osmotic Pressure and Solutions", Center for Student Success and Academic Counseling, The University of North Carolina at Chapel Hill, http://cssac.unc.edu/programs/learning-center/Resources/Study/Guides/Chemistry%20102/Osmotic%20Pressure, accessed Jan. 20, 2021.

Ge, Qingchun et al., "Draw Solutions for Forward Osmosis Processes: Developments, Challenges, and Prospects for the Future", Journal of Membrane Science, vol. 442, issued Apr. 6, 2013, pp. 225-237.

"English translation of Office Action for CN Application No. 201680045242.X, dated Sep. 2, 2021".

"Examination Report for EP 17882858.8, dated Oct. 25, 2021".

"Hydranautics—A NITTO Group Company, "Pro Series—Specialty Membrane Products for Challenging Industrial Wastewaters"", Pro-Series-Brochure (published online: May 18, 2020); pp. 1-4 (p. 2, col. 2, paragraph 2); URL: https://membranes.com/wp-content/uploads/Documents/brochure/PRO/PRO-Series-Brochure_web.pdf, May 18, 2020.

"International Search Report and Written Opinion for PCT/US2021/050330, dated Dec. 29, 2021".

Low, et al., ""Challenges in membrane-based liquid phase separations"", Green Chemical Engineering, vol. 2, Issue 1 (Mar. 2021), pp. 3-13.

Shon, Ho Kyong, et al., "Introduction: Role of Membrane Science and Technology and Forward Osmosis Processes", https://app.knovel.com/hotlink/toc/id:kpFOFA0001/forward-osmosis-fundamentals/forward-osmosis-fundamentals, 2015, pp. 1, 5-6.

"Examination Report for AU Patent App. No. 2021204374, dated Apr. 21, 2022".

"English Translation for Rejection Decision, dated Jun. 28, 2022, for CN 201780086041.9".

\* cited by examiner

REMOVING COMPONENTS OF ALCOHOLIC SOLUTIONS VIA FORWARD OSMOSIS AND RELATED SYSTEMS

CROSS-REFERENCE TO RELATED APPLICATION(S)

This application is a 35 U.S.C. § 371 National Stage Application of PCT Application No. PCT/US2017/068345, filed Dec. 22, 2017, which claims the benefit under 35 U.S.C. § 119 of the earlier filing data of U.S. Application Ser. No. 62/438,950, filed Dec. 23, 2016 the entire contents of which are hereby incorporated by reference, in their entirety, for any purposes.

BACKGROUND

Existing techniques for dewatering alcoholic solutions include both thermal processes (e.g., distillation, evaporation), and hydrostatic pressure-driven membrane processes (e.g., reverse osmosis, nanofiltration, ultrafiltration). Thermal processes may be disadvantageous for concentration of alcoholic solutions because of high energy consumption, loss of volatile organic compounds (VOCs), and modification to protein structures important to flavor, aroma, and taste. Pressure driven membrane processes may be limited by poor retention of alcohol and VOCs, and hydrostatic pressure limits.

SUMMARY

Methods for concentrating a solution are disclosed. An example method includes introducing a feed solution having at least one permeable solute into a first side of a forward osmosis system. The example method includes circulating a draw solution through a second side of the forward osmosis system in a countercurrent flow with respect to the feed solution, the draw solution having one or more solutes and a concentration of the at least one permeable solute that is lower than a concentration of the at least one permeable solute in the feed solution. The example method includes generating a diluted draw solution in the second side of the forward osmosis system, the diluted draw solution having a higher water concentration and higher at least one permeable solute concentration than the draw solution. The example method includes producing a product stream including a concentrated feed solution from the first side of the forward osmosis system, the concentrated feed solution having a lower water content and a concentration of the at least one permeable solute that is less than the concentration of the at least one permeable solute in the feed solution. The example method includes regenerating the draw solution from the diluted draw solution. The example method includes recirculating the draw solution that has been regenerated through the second side of the forward osmosis system Methods for concentrating an alcoholic solution via forward osmosis are disclosed. An example method includes introducing an alcoholic beverage into a first side of a forward osmosis system. The example method includes circulating a draw solution in a second side of the forward osmosis system in a countercurrent flow with respect to the alcoholic beverage, the draw solution having an alcohol concentration lower than the alcohol concentration in the alcoholic beverage. The example method includes generating a diluted draw solution in the second side of the forward osmosis system, the diluted draw solution having a higher water concentration and higher alcohol concentration than the draw solution. The example method includes producing a product stream including a concentrated beverage having a reduced alcohol content and reduced water content from the first side of the forward osmosis system. The example method includes regenerating the draw solution from the diluted draw solution. The example method includes producing a permeate stream from the diluted draw solution.

Systems for concentrating a solution are disclosed. An example system includes a forward osmosis element including at least one selectively permeable forward osmosis membrane separating a first side of the forward osmosis element from a second side of the forward osmosis element. The example system includes a supply of a solution containing one or more permeable solutes fluidly coupled to the first side. The example system includes a supply of a draw solution operably coupled to the second side in a countercurrent flow with respect to the first side, the draw solution having a concentration of the one or more permeable solutes that is less than a concentration of the one or more permeable solutes in the solution and a total solutes concentration higher than a total solutes concentration of the solution. The example system includes at least one draw solution regenerating apparatus operably coupled to the second side and configured to receive output therefrom.

Methods for maintaining an amount of one or more solutes in a solution while removing water therefrom are disclosed. The example method includes introducing a feed solution having at least one permeable solute into a first side of a forward osmosis system. The example method includes circulating a draw solution through a second side of the forward osmosis system, the draw solution having one or more solutes and a concentration of the at least one permeable solute that is greater than a concentration of the at least one permeable solute in the feed solution. The example method includes generating a diluted draw solution in the second side of the forward osmosis system, the diluted draw solution having a higher water concentration and lower at least one permeable solute concentration than the draw solution. The example method includes producing a product stream including a concentrated feed solution from the first side of the forward osmosis system, the concentrated feed solution having a lower water content and a concentration of the at least one permeable solute that is higher than the concentration of the at least one permeable solute in the feed solution. The example method includes regenerating the draw solution from the diluted draw solution. The example method includes recirculating the draw solution that has been regenerated through the second side of the forward osmosis system.

Methods of dewatering a solution are disclosed. An example method includes introducing feed solution having one or more permeable solutes into a first side of a forward osmosis system. The example method includes circulating a draw solution having one or more permeable solutes therein through a second side of the forward osmosis system, the draw solution having permeable solute concentration greater than or equal to at least one species of the one or more permeable solutes in the feed solution. The example method includes generating a diluted draw solution in the second side of the forward osmosis system, the diluted draw solution having a higher water concentration than the draw solution. The example method includes producing a product stream including a concentrated feed solution from the first side of the forward osmosis system, the concentrated feed solution having a higher concentration of the at least one species of the one or more permeable solutes than the feed solution.

Methods of dewatering an alcoholic beverage using forward osmosis are disclosed. An example method includes introducing an alcoholic beverage into a first side of a forward osmosis system. The example method includes circulating a draw solution in a second side of the forward osmosis system, the draw solution having an alcohol concentration greater than or equal to the alcoholic beverage. The example method includes generating a diluted draw solution in the second side of the forward osmosis system, the diluted draw solution having a higher water concentration than the draw solution. The example method includes producing a product stream including a concentrated alcoholic beverage from the first side of the forward osmosis system. The example method includes regenerating the draw solution from the diluted draw solution. The example method further includes producing a permeate stream from the diluted draw solution.

Systems for dewatering an alcoholic solution are disclosed. An example system includes a forward osmosis element including at least one selectively permeable forward osmosis membrane separating a first side of the forward osmosis element from a second side of the forward osmosis element. The example system includes an alcohol solution in the first side. The example system includes a draw solution in the second side, the draw solution having a higher alcohol weight percentage than the alcohol solution.

Methods of dewatering a solution are disclosed. An example method includes introducing a feed solution having one or more permeable solutes into a first side of a forward osmosis system. The example method includes circulating a draw solution having one or more permeable solutes and one or more impermeable solutes therein through a second side of the forward osmosis system. The example method includes generating a diluted draw solution in the second side of the forward osmosis system, the diluted draw solution having a higher water concentration than the draw solution. The example method includes producing a product stream including a concentrated feed solution from the first side of the forward osmosis system, the concentrated feed solution having a desired concentration of the at least one species of the one or more permeable solutes; wherein a combined osmotic pressure of the one or more permeable solutes and the one or more impermeable solutes in the draw solution is greater than an osmotic pressure of the concentrated feed solution Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. Understanding that these drawings depict only embodiments of the invention and are not therefore to be considered to be limiting of its scope, embodiments of the invention will be described and explained with additional specificity and detail through the use of the accompanying drawings in which.

Figure 1:
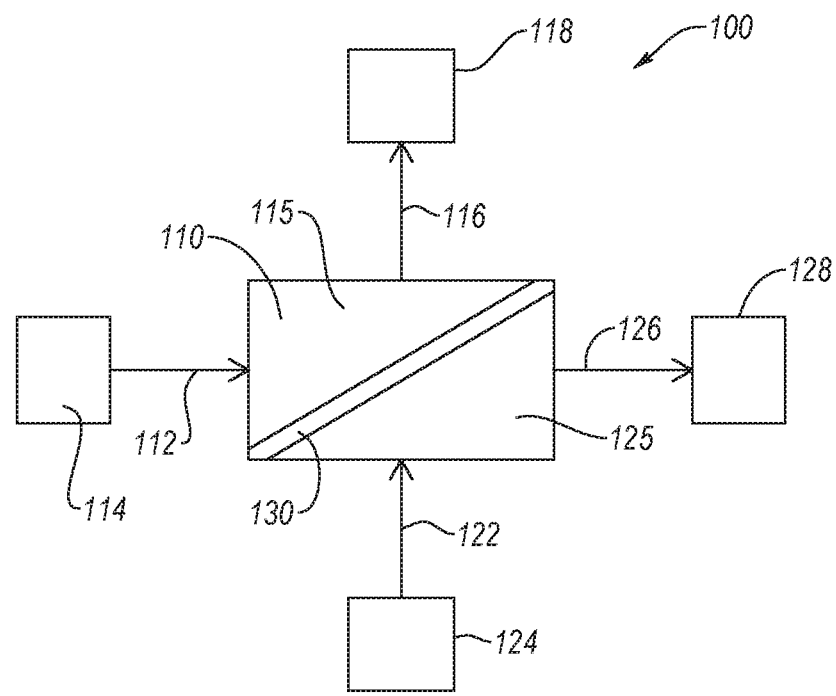
FIG. 1 is a block diagram of a co-current forward osmosis system for removing one or more components from solutions, according to examples described herein.

all arranged in accordance with at least some embodiments of the present disclosure.

DETAILED DESCRIPTION

Embodiments described herein relate to methods for removing water or water and permeable solutes from solutions having one or more permeable solutes therein using forward osmosis (FO), and systems for the same. One or more solutes (e.g., dissolved, dispersed, or suspended components of a solvent system) can be selectively separated from one or more solvents using FO. The one or more solutes can include at least partially dissolved, dispersed, or suspended sugar(s), alcohol(s), volatile organic compounds (VOCs), proteins, salt(s), sugar alcohol(s), or other components of liquid systems that are capable of filtration (e.g., retention or removal) at a filtration membrane via FO, or combinations of any of the foregoing. Solutes may include permeable solutes that are capable of crossing the FO membrane, such as ethanol, methanol, ethylene glycol, etc. Solutes may include impermeable solutes that are substantially incapable of crossing the FO membrane (excepting negligible amounts of flux), such as sodium chloride, magnesium chloride, magnesium sulfate, glycerol, fructose, glucose, sucrose, polyethylene glycol, etc.

In example methods and systems disclosed herein, a first solution (e.g., feed solution) having a lower concentration of one or more permeable solutes is passed along a first side of a semipermeable membrane while a second solution (e.g., draw solution) of a higher osmotic pressure (e.g., higher concentration of the one or more permeable solutes) is passed along a second side of the semipermeable membrane. One or more solvents (e.g., water) and/or permeable solutes (e.g., methanol, ethanol, ethylene glycol, lithium, lactic acid, acetic acid, citric acid, boron and boron oxides, hydroxide salts, ammonia etc.) are drawn from the feed solution into the draw solution, while one or more impermeable solutes (e.g., solutes that are substantially incapable of passing through the FO membrane (except in negligible amounts), such as proteins, flavor compounds, glucose, sucrose, fructose, glycerol, etc.) are selectively retained, thereby concentrating the feed solution while diluting the draw solution. While it is understood that permeability of a material is dependent upon membrane materials relative to the specific material, as used herein, the terms "permeable" and "impermeable" refer to the permeability of specific solutes across an FO membrane (ignoring permeability of the same solutes relative to RO membranes). In some embodiments, the impermeable solutes could constitute matter that is concentrated in the feed solution to produce feed concentrate. In some embodiments, the impermeable solutes present in the draw solution can provide the driving force (osmotic pressure differential) for the concentration process. The retention by the semipermeable membrane of one or more impermeable solutes may be 99% or higher, or 95% or higher, or 90% s or higher and may be specific for that particular membrane and solute combination and may be affected by operating conditions such as temperature, flux, etc. The retention by the semipermeable membrane of one or more permeable solutes may be less than 99%, or may be less than 95%, or 90% or less and may be specific for that particular membrane and solute combination and may be affected by operating conditions such as temperature, flux, etc. The net flux of one or more permeable solutes and/or impermeable solutes across the FO membranes herein may be zero (e.g., some positive or negative fluxes are balanced out across the entirety of the FO membrane). This process may be carried out with both feed and draw solutions at common, atmospheric pressures. Specific permeable and/or impermeable solutes may be preferentially rejected by the FO membrane similar to reverse osmosis (RO).

When concentrating feed streams having multiple components (e.g., water, ethanol, carbohydrates, etc.) by forward osmosis, retention of one component (e.g., ethanol) versus the other (e.g., carbohydrates) may be poor (e.g., less than 70%). By adding one or more specific components (e.g., permeable solute(s) such as ethanol and/or impermeable solute(s) such as glycerol, sucrose, etc.) selected from the multiple components (e.g., ethanol, ethylene glycol, glycerol, sucrose, etc.) to the draw solution, the separation systems herein may retain one or more specific components (e.g., ethanol) in the feed stream while at least some of the other components or solvent(s) (e.g., water) in the feed are at least partially removed (e.g., dewatering). The permeable solute may be selectively removed from the other multiple components (e.g., carbohydrates) by minimizing the concentration of permeable solute in the draw solution. Additional permeable solute may be further removed by dilution of the feed stream before concentration by forward osmosis, during, or after, increases the total amount of water and permeable solute removed. Methods of reconstituting the dewatered alcoholic solutions present in the draw solutions that leverage various pressure driven membrane and distillation processes are also disclosed herein.

Examples of methods and systems disclosed herein utilize forward osmosis for separation of liquids. Forward osmosis (FO) generally refers to the process of transporting liquids (e.g., water) across a semipermeable membrane while rejecting a solute. The FO process dewaters (e.g., concentrates) feed streams using a semipermeable membrane and a draw stream having a higher concentration of one or more components in the feed stream to provide higher osmotic pressure. The driving force in FO, the transfer of at least one liquid and/or solute component (e.g., water) from the feed stream to the draw stream, is osmotic pressure difference(s) generated from chemical potential of the two streams, unlike typical hydrostatic pressure-driven membrane processes. Example methods and systems disclosed can be specifically used for dewatering alcoholic solutions. Dewatering generally refers to the removal of water from a material (e.g., a solid or another (aqueous) solution). Separation systems including FO elements may be used to treat solutions (e.g., aqueous solutions having ethanol therein), which can include alcoholic beverages. Generally, any solution (e.g., a liquid containing water, alcohol, and one or more other permeable solutes) may be dewatered using the systems and methods described herein. The alcohol included in the feed solutions (e.g., alcoholic solutions) may generally be any alcohol, such as ethanol, methanol, etc. Example (alcoholic) solutions may include beer, malt beverages, distilled liquors, a fermentation broth (e.g., for ethanol production), flavor extraction(s), dye extraction(s), wine, or combinations thereof.

While certain solutions, distillates, permeates, concentrates, products, etc., are described as "streams" herein, it is understood that the "streams" may contain said solutions, distillates, permeates, concentrates, products, etc. The term "stream(s)" as used herein is intended to include the meaning of a flow or volume of a solution and is not intended to require that the stream has a constant flow.

Example FO systems and methods disclosed herein allow solutions to be dewatered at ambient pressures and temperatures while allowing selective retention of permeable solute(s) such as alcohol(s), volatile organic compounds (VOCs), sugar(s), etc. Advantageously, the dewatered solution may be transported and shipped in a manner that may be more efficient than transporting and/or shipping the fully hydrated solution. The dewatered solution may then be reconstituted prior to consumption. In this manner, for example, beer may be dewatered to form a dewatered beer solution and may be packaged and shipped in the dewatered form. The dewatered beer solution may have a higher concentration of alcohol than the beer solution, the same concentration of alcohol as the beer solution, or a reduced alcoholic concentration than the beer solution. On receipt, a consumer (or retail outlet) may reconstitute the dewatered beer solution for consumption. The dewatered beer solution may be reconstituted by the addition of carbonated water or by the consumer or a beverage machine to produce a beer or reduced alcoholic beer (e.g., a 3.2% ABW beer, or a non-alcoholic beer). The dewatered beer solution may be reconstituted by the addition of an alcoholic solution (e.g., vodka) and carbonated. Example systems and methods described herein may advantageously employ FO to conduct the dewatering, which may improve flavor retention in the dewatered solution, such that the reconstituted solution (e.g., reconstituted dewatered beer solution) retains a flavor identical or similar to that of the original solution prior to dewatering. Accordingly, the FO systems and techniques disclosed herein may dewater an alcoholic solution without significantly altering or degrading the nutrients or components of the product stream or the flavor(s) of the alcoholic beverage (e.g., when reconstituted). Benefits of concentrating (e.g., dewatering) said solutions may include reduced transportation costs, reduced loss of VOCs, manufacture of a reduced alcoholic solution (e.g., non-alcoholic beer, alcohol-free flavor extracts) increased stability and shelf life, and the manufacture of a unique consumer product (e.g., a dewatered alcoholic beverage).

Benefits and advantages of examples described herein are provided to facilitate appreciation of example systems described herein. It is to be understood that the benefits and advantages are exemplary only, and not all examples described herein may have all, or even any, of the benefits and advantages described.

Example systems for separating liquid components (e.g., dewatering) of a solution or mixture herein may generally include a primary fluid input providing a feed stream containing a feed solution (e.g., an alcoholic beverage or solution); an FO membrane; and at least one fluid output including a concentrated feed stream containing the dewatered alcoholic solution (e.g., alcoholic solution concentrate). A diluted draw stream containing a diluted draw solution may be produced which can provide a second output, a permeate stream generally containing mostly water. Example systems herein may also include a draw stream input providing a draw stream containing the draw solution having a higher concentration of one or more components (e.g., permeable and/or impermeable solutes) than the feed stream and/or concentrated feed stream. While alcoholic solutions, including alcoholic beverages are used as examples of solutions having permeable solutes herein, it is understood that permeable solutes in addition to or in place of alcohol are also considered in each of the examples and can be used interchangeably or additionally with the example alcohols described.

FIG. 1 is a block diagram of a co-current FO system 100 for removing one or more components from a solution. The system 100 is configured as a co-current system. That is, the bulk flow of both the feed stream 112 and the draw stream 122 travels in the same direction through an FO element(s) 110 in the system 100. The system 100 includes a feed stream source 114 which provides at least some of the feed stream 112 to at least one FO element 110. The system 100 further includes at least one draw stream source 124 fluidly coupled to the at least one FO element 110 and configured to provide the draw stream 122 to the at least one FO element 110. The feed stream 112 may be present in, and travel through, the FO element 110 in a first side 115 thereof. The draw stream 122 may be present in, and travel through, the FO element 110 in a second side 125 thereof. The first side 115 and the second side 125 are separated by at least one FO membrane 130 disposed therebetween. The at least one FO element 110 can include an FO housing (e.g., a fluid tight container or assembly) at least partially defining an interior region in which the FO membrane 130 and first and second sides 115 and 125 are located. While the first side 115 is described as the feed side and the second side 125 is described as the draw side, the designations first and second are merely for differentiation between the elements and not meant to be limiting of the elements or configuration of the system 100. For example, the first and second sides 115 and 125 can include separate volumes, layers, serpentine paths, etc., so long as the first side 115 is at least partially chemically separated from the second side 125, such as via at least one FO membrane 130 therebetween.

As the feed stream 112 and draw stream 122 travel through the FO element 110, one or more permeable solutes of the feed stream 112 can permeate through the FO membrane 130 into the draw stream 22. The feed stream 112 can include a feed solution to be concentrated (e.g., dewatered), such as a solution containing any combination of permeable solutes (e.g., alcoholic solution) disclosed herein. The draw stream 122 can include a draw solution having one or more common components (e.g., solvent(s), permeable and/or impermeable solute(s)) of the feed stream 112 therein. For example, the draw stream 122 can include one or more of alcohol, water, glucose, ethylene glycol, sucrose, fructose, glycerol, lactic acid, one or more dissolved salts, or any other component found in the feed stream 112. The presence or addition of one more permeable solutes (e.g., alcohol) and/or impermeable solutes (e.g., glycerol) to the draw stream 122 may be effective to selectively control the retention of one more permeable solutes in the feed stream 112 as it is dewatered. Equal or higher amounts of the one or more common components (e.g., permeable and/or impermeable solutes in both the feed and draw streams) of the feed stream 112 present in the draw stream 122 can limit or prevent said one or more common components from crossing the FO membrane 130 from the feed stream 112 into the draw stream 122. Reduced amounts of the one or more common components (e.g., permeable and/or impermeable solutes in both the feed and draw streams) of the feed stream 112 that are present in the draw stream 122 may allow the one or more common components to cross the FO membrane 130 from the feed stream 112 into the draw stream 122. For example, an equal or higher amount of alcohol and ethylene glycol present in the draw stream 122 than in the feed stream 112 can result in water being preferentially removed from the feed stream 112 via the FO membrane 130 while net alcohol and ethylene glycol amounts are retained. In the absence of alcohol in the draw stream 122, net transfer of alcohol may readily occur from the feed stream 112 to the draw stream 122 such that the final concentrated feed stream 116 would have a reduced alcohol concentration. In some embodiments, a combination of at least two permeable solutes and/or impermeable solutes in the draw stream can be used to provide a sufficient amount of osmotic pressure effective to limit migration of one or more permeable solutes (e.g., ethanol) from the feed stream to the draw stream. For example, a combination of one or more permeable solutes and impermeable solutes may induce a collectively higher osmotic pressure in the draw stream than the osmotic pressure present in the feed stream, thereby inducing selective permeation of the solvent (e.g., water) across the FO membrane while the permeable solute (e.g., ethanol) in the feed stream is substantially entirely retained. For example, an equal or higher amount of the combination of alcohol and glycerol present in the draw stream 122 over the amount of ethanol in the feed stream 112 can result in water being preferentially removed from the feed stream 112 via the FO membrane 130 while alcohol is retained. In some embodiments, at least one of the permeable or impermeable solutes may not be common to the feed stream and the draw stream.

As the feed stream 112 is concentrated in the FO element 110 by removal of at least one fluid component (e.g., solvent such as water) thereof through the FO membrane 130, a concentrated feed stream 116 (e.g., concentrated alcoholic solution) is produced. The concentrated feed stream 116 can be directed to one or more downstream product components 118 fluidly coupled to the first side 115 of the FO element 110. As the draw stream 122 (e.g., draw solution) is diluted by addition of one or more components from the feed stream 112 (e.g., water) via the FO membrane 130, the system 100 produces a diluted draw stream 126 (e.g., draw stream having a similar or higher concentration of one or more components thereof such as water, than were present when the draw stream entered the FO element 110). The diluted draw stream 126 can be directed to one or more downstream draw components 128 fluidly coupled to the second side 125 of the FO element 110.

The feed stream source 114 can include one or more of a tank, a pressurized pump, a valve, a pipe, a conduit, a hose, a temperature control element, etc. The feed stream source 114 is fluidly coupled (e.g., plumbed) to the first side 125 of the FO element 110. The feed stream source 114 can be configured to selectively provide a desired feed rate and/or pressure of the feed stream 112 to the FO element 110. The draw stream source 124 can include one or more of a tank, a pressurized pump, a valve, a pipe, a conduit, a hose, a temperature control element, etc. The draw stream source 124 is fluidly coupled to the second side 125 of the FO element 110. The draw stream source 124 can be configured to selectively provide a desired feed rate and/or pressure of the feed stream 112 to the FO element 110.

The FO element 110 may be any FO element or array of elements, including but not limited to, spiral wound FO element or standard or baffled plate and frame FO element(s). The FO membrane(s) 130 of the FO element(s) 110 can include any permeable membrane such as a selectively permeably membrane configured to allow passage of one or more components of the feed stream therethrough, while rejecting one or more components of the feed stream. In some examples, the FO membrane 130 may be a polymeric membrane including a polymeric material therein such as a polyamide, a cellulose acetate, aramid, poly (vinylidene fluoride), polyacrylonitrile, polysulphone, or any other polymer material suitable for use as a FO membrane. In some examples, the FO membrane may include a thin film composite membrane including one or more of any of the polymer materials disclosed above. In some examples, the FO membrane 130 may include one or more support layers supporting one or more functional layers, such as one or more polyamide thin film layers. In some embodiments, the FO membrane 130 can include an array of FO membranes that may be arranged parallel or in series, or in any combination of parallel and series. Examples of FO elements, FO membranes, and components thereof suitable for use in the FO systems described herein can include any of those described in U.S. Pat. No. 8,920,654, filed Sep. 30, 2011; U.S. patent application Ser. No. 14/137,903 filed Dec. 20, 2013; PCT Application PCT/US2014/029227 filed Mar. 14, 2014; and PCT Application PCT/US2014/029332 filed Mar. 14, 2014, each of which is incorporated by this reference in its entirety for any purpose.

The one or more downstream product components 118 fluidly coupled to the first side 115 can include one or more of a pipeline, a storage tank, a point of use device, a conduit, a pressure pump, a temperature control device (e.g., refrigerator or heater), a packaging apparatus, one or more FO elements, individual packages (e.g., kegs, bottles, etc.). The one or more downstream draw components 128 can include one or more of a pipeline, a conduit, a storage tank, a pump, a temperature control device (e.g., refrigerator), one or more draw solution recovery (e.g., regeneration) apparatuses, a waste storage, a permeate storage, etc. In some embodiments, the one or more draw solution recovery or regeneration apparatuses can include reverse osmosis (RO) elements (e.g., low rejection or standard reverse osmosis apparatuses) or one or more distillation apparatuses.

In use, a feed solution (e.g., 5% ABW alcohol) may be pressurized by a pump (e.g., feed stream source 114) forming low-pressure feed stream 112. The at least one FO element 110 may receive the feed stream 112 and dispense concentrated feed stream 116 (e.g., 30% ABW, at 2 gpm). The draw solution (e.g., 40% ABW at 30 gpm) may be pressurized by a pump (e.g., draw stream source 124) to form low-pressure draw stream 122. The draw stream 122 may include water, a permeable solute (e.g., ethanol), and at least one impermeable solute (e.g., sodium chloride, magnesium chloride, magnesium sulfate, glycerol, fructose, glucose, sucrose, polyethylene glycol). FO element 110 may receive low-pressure draw stream 122 and dispense a dilute draw stream 126 (e.g., 30% ABW at 40 gpm). The permeable solutes in the draw and/or feed stream(s) may include any of the permeable solutes disclosed herein. In the FO element 110, at least some water may permeate from the feed stream 112 to the draw stream 122 across at least one FO membrane 130 therebetween. At least some alcohol or other permeable solute(s) may be retained in the feed stream 112, such that the total amount of alcohol or other permeable solutes is maintained in the feed stream 112 while the feed stream 112 is dewatered, resulting in concentrated feed stream 116 (e.g., 30% ABW).

In some embodiments, the relative alcohol content in the concentrated feed stream 116 (as compared to the feed stream 112) can be increased by at least about 5% ABW, such as about 5% ABW to about 50% ABW, about 10% ABW to about 40% ABW, about 15% ABW to about 35% ABW, about 20% ABW to about 40% ABW, about 25% ABW to about 35% ABW, or less than about 60% ABW. In some embodiments, at least some alcohol can permeate from the draw stream 122 to the feed stream 112. Alternatively, at least some alcohol (and/or other permeable solute(s)) may permeate from the feed stream 112 to the draw stream 122 such that the alcohol (and/or other permeable solute(s)) concentration is decreased in the concentrated feed stream 116. For example, the relative alcohol content of the concentrated feed stream 116 can decrease by at least about 1% ABW as compared to the feed stream 112, such as about 1% ABW to about 40% ABW, about 5% ABW to about 20% ABW, or less than about 40% ABW. The relative alcohol concentration can be decreased by a selected amount such that the alcohol is largely removed (e.g., stream 116 less than about 0.1% ABW). While alcohol is used as an example herein, similar or identical results to any of those disclosed herein can be obtained with other permeable solutes of the feed and draw streams, such as ammonia, ethylene glycol, dissolved salts, etc. (e.g., wherein the concentration of the component is in weight % rather than % ABW).

In some examples (not shown) having an array of FO membranes 130 (e.g., in a baffled plate and frame FO element) or an array of FO elements 110, the feed stream 112 and the draw stream 122 may be received by the same FO element 110 at the beginning of the array, and the concentrated feed stream 116 and the diluted draw stream 126 may be dispensed by the same FO element at the end of the array. Co-current operation may be used with spiral wound elements. Control of the trans-membrane pressure, operating with a positive and low (e.g., 1 to 5 psi) pressure from the feed stream to the draw stream may improve the permeable solute rejection and have significant impacts on the separation of draw components from the feed. Suitable pressures can include about 0.5 psi or more, such as about 0.5 psi to about 10 psi, about 1 psi to about 8 psi, about 2 psi to about 6 psi, about 3 psi to about 5 psi, about 0.5 psi to about 2 psi, about 2 psi to about 4 psi, about 1 psi to about 5 psi, less than about 5 psi, or less than about 3 psi.

In a co-current flow regime, the final concentration of alcohol (and/or other permeable or impermeable solute(s)) in the draw stream 122 and/or diluted draw stream 126 may be greater than or equal to the final alcohol (and/or other permeable solute(s)) concentration of the concentrated feed stream 116, for example 30% ABW. In some examples, an excess of alcohol may be used in the draw stream 122 and/or diluted draw stream 126 to maintain high retention of alcohol in feed streams 112 as they are dewatered. An excess of alcohol (or other permeable draw component) may be used to retain alcohol in the feed because the draw stream is diluted as water transfers from the feed stream to the draw stream, known as dilutive concentration polarization. Therefore, an excess of alcohol in the draw stream may be used to have an effective concentration difference. In addition, water permeating through the membrane may hydrogen bond with some permeable solutes (e.g., alcohol) and increase the permeation relative to permeable solutes that do not hydrogen bond with water. In some embodiments, the excess alcohol (and/or other permeable solute(s)) remains in excess even after dilution of the draw solution, the amount of which may be present in the draw stream 122 or the diluted draw stream 126. In some examples, an excess of greater than 0% ABW to about 60% ABW over the feed stream 112 alcohol content may be used. For example, the final concentration of alcohol in the diluted draw stream 126 can be at least about 1% ABW greater than the final alcohol concentration of the concentrated feed stream 116, such as about 1% ABW to about 60% ABW greater, about 5% ABW to about 50% ABW greater, about 10% A ABW to about 40% ABW greater, about 15% ABW to about 35% ABW greater, about 20% ABW to about 40% ABW greater, about 25% ABW to about 35% ABW greater, about 1% ABW to about 20% ABW greater, about 20% ABW to about 40% ABW greater, about 40% ABW to about 600% ABW greater, about 1% ABW to about 5% ABW greater, about 1% ABW to about 10% ABW greater, about 5% ABW to about 15% ABW greater, about 10% ABW to about 20% ABW greater, or less than about 60% ABW greater than the final alcohol concentration of the concentrated feed stream 116. It has been discovered that a diluted draw stream 126 (and precursor draw stream 122) having a final alcohol concentration (or combined permeable solute and/or impermeable solute concentration) at least about 5% ABW greater (e.g., 10% ABW greater) than the final alcohol content of the associated concentrated feed stream 116 are particularly effective at producing a desired level of alcohol in the concentrated feed stream 116. For example, a final alcohol concentration of a concentrated feed solution may be about 30% ABW while the final alcohol concentration of the diluted draw stream can be at least about 40% ABW.

The species of the one or more components (e.g., solvent(s) such as water and/or permeable solute(s)) of the feed stream 112 that permeate the FO membrane 130 into the draw solution and extent (e.g., amount) of the permeation can be selectively adjusted by controlling one or more of the amount (e.g., concentration) and/or species of one or more permeable solutes (and/or impermeable solutes) of the draw solution of draw stream 122 (e.g., alcohol content), the surface area of the FO membrane 130 in contact with the feed and draw streams 112 and 122, the feed rate of one or both of the feed and draw streams 112 and 122 into the FO element 110, the pressure of one or both of the feed and draw streams 112 and 122 into the FO element 110 (and related hydrostatic pressure across the FO membrane 130), or the temperature of one or both of the feed and draw streams 112 and 122 into the FO element 110. Specifically, the amount of excess alcohol (e.g., ethanol) and/or other permeable or impermeable solutes used in the draw stream 122 may be dependent on one or more of flow rate(s), dewatering rate(s), recovery rate(s), temperature, feed stream composition, draw stream composition, membrane surface area in contact with the streams, type of membrane, pressure in the first and/or second side, etc.

Each of the different components of the systems disclosed herein can be operably (e.g., fluidly) coupled together via one or more conduits (e.g., pipes, tubes, hoses, etc.), valves, pumps, etc. For brevity, the components of the block diagrams are shown with arrows therebetween. It should be understood that each of the arrows may represent one or more conduits, valves, tanks, pumps, or other fluid connections between components of the systems.

Figure 2:
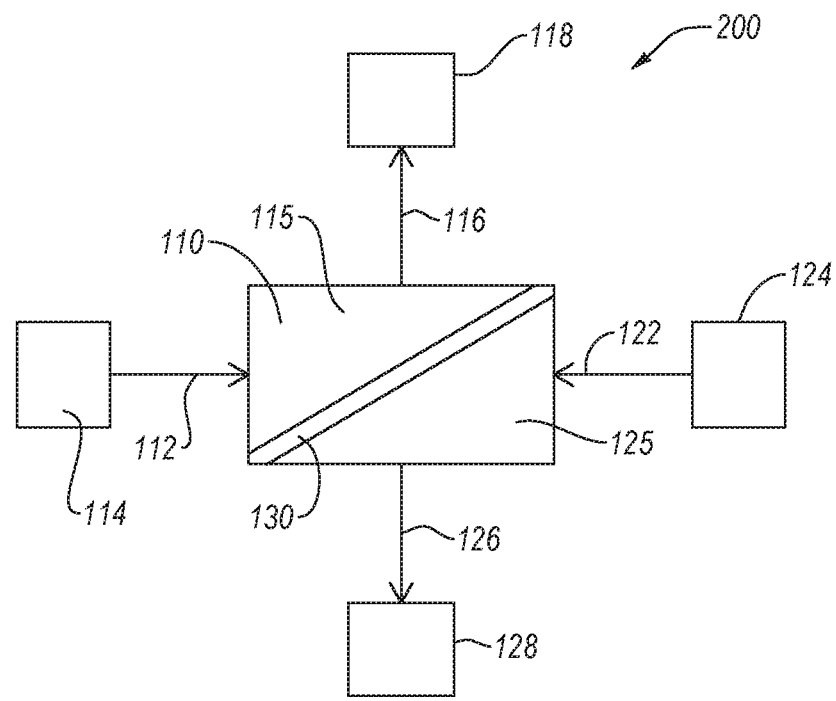
FIG. 2 is a block diagram of a countercurrent system for removing one or more components from solutions, according to examples described herein.

In some embodiments, the FO system or array of elements therein may be configured in a countercurrent configuration. FIG. 2 is a block diagram of a countercurrent system 200 for removing one or more components from solutions. In a countercurrent system, the feed stream and draw stream travel through the FO element in opposing directions. Countercurrent processing may allow the use of a reduced amount of permeable and impermeable solute(s) compared to co-current flows because the permeable and impermeable solute(s) concentration and osmotic differential between the feed stream and draw stream may be essentially constant. Countercurrent processing may allow the use of a reduced amount of permeable and impermeable solute compared to co-current processing because the concentration differential between the feed stream and draw stream may be essentially constant. The system 200 includes a feed stream source 114 which supplies a feed stream 112, at least one FO element 110 including at least one FO membrane 130, and one or more downstream product components 118 configured to receive the concentrated feed stream 116, as described above. The system 200 includes draw stream source 124 which supplies a draw stream 122, and one or more downstream draw components 128 which contain the diluted draw stream 126. As shown, the direction of travel of the draw stream 122 through the second side 125 of the FO element 110 is in the opposite direction of the flow of the feed stream 112 through the first side 115 of the FO element 110. In some examples, an advantage to the countercurrent configuration may be that the initial draw stream 122 alcohol and/or other permeable solute(s) concentration may be equal to or not necessarily significantly exceed (e.g., only about 1% ABW to about 5% ABW) the feed stream 112 concentrate alcohol concentration. In some examples, a small excess in draw stream 122 alcohol and/or other permeable solute(s) content (over the amount for effective dewatering of the alcohol solution) may be used to replace or offset alcohol and/or other permeable solute(s) lost in draw stream recovery (nanofiltration (NF)/RO permeate or distillation for example).

In some examples, a small loss of alcohol (e.g., greater than 0% ABW to about 3% ABW) in the feed stream 112 and/or concentrated feed stream 116 may be used (e.g., tolerated) to avoid adding excess alcohol to the draw stream 122. In such examples, the amount of alcohol in the draw stream 122 can be equal to or slightly less than (e.g., 0% ABW to 3% ABW less than) the alcohol content in the feed stream 112 and/or concentrated feed stream 116.

During use, the feed solution (e.g., 5% ABW at 12 gpm) may be pressurized by a pump (e.g., feed stream source 114) to form a low-pressure feed stream 112. The FO element 110 may receive the feed stream 112 and dispense concentrated feed stream 116 (e.g., 30% ABW at 2 gpm). The draw solution (e.g., 30% ABW at 2 gpm) may be pressurized by a second pump (e.g., draw stream source 124) to form a low-pressure draw stream 122. The FO element 110 may receive the low-pressure draw stream 122 and dispense diluted draw stream 126 (e.g., 5% ABW at 12 gpm). Water may permeate from the feed stream 112 to the draw stream 122 via the FO membrane 130 therebetween.

In some embodiments, the FO system can include more than one FO element. In some embodiments, the at least one FO element or array (e.g., parallel and/or series array) of FO elements may be plumbed in a countercurrent configuration with intermediate injection of high concentration draw solution or pure permeable and/or impermeable solutes (e.g., alcohol) at intermediate stages along the array. Such configurations can allow permeable and impermeable solute(s) to be added to a system, increasing the driving force (e.g., osmotic pressure induced by chemical potential) while balancing the permeable and impermeable solute (e.g., ethanol) concentration in the draw solution(s) along the FO membrane array.

Figure 3:
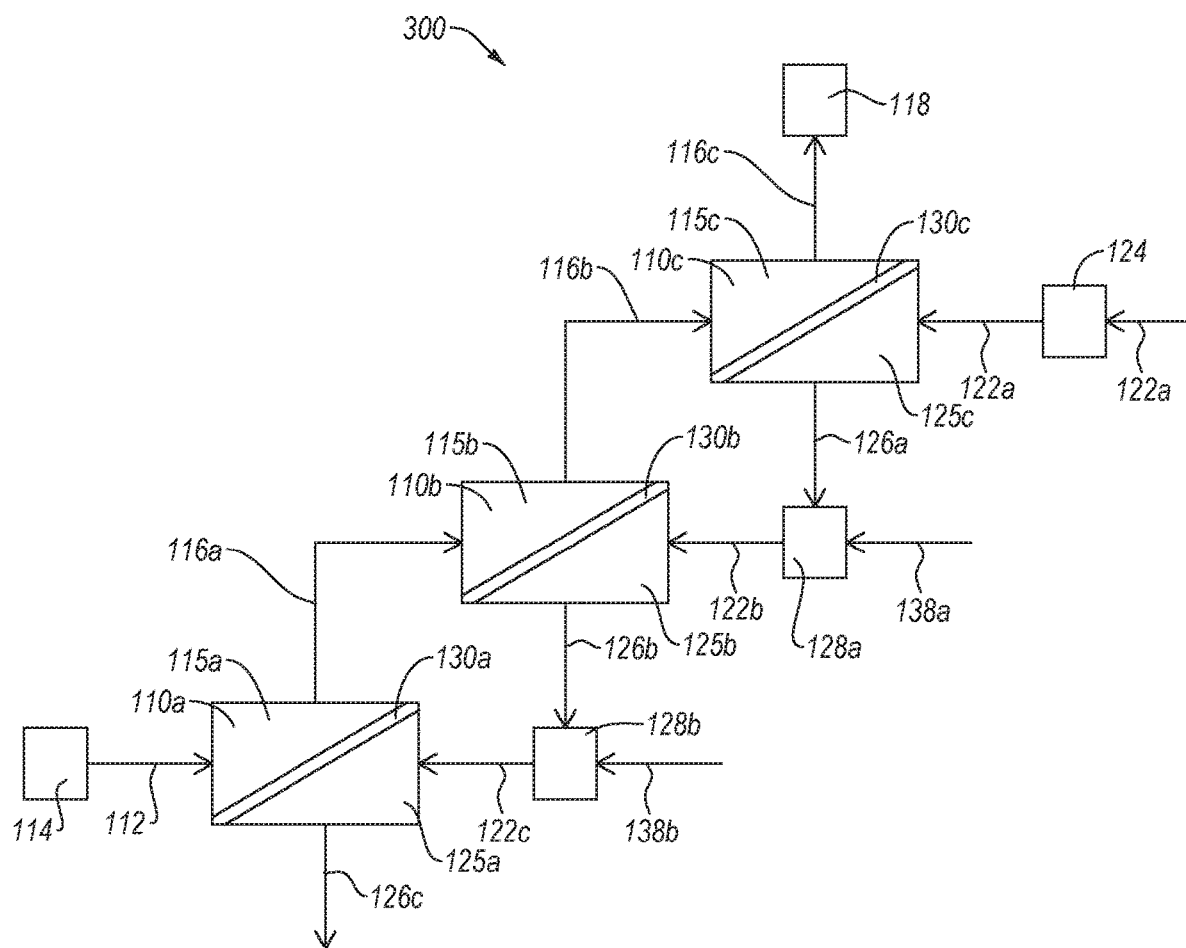
FIG. 3 is a block diagram of a countercurrent forward osmosis system for dewatering of alcoholic solutions, according to examples described herein.

FIG. 3 is a block diagram of a countercurrent FO system 300 for dewatering of alcoholic solutions. The countercurrent FO system 300 includes one or more (ports for) intermediate injections of alcohol (or high concentration alcohol solutions) into the diluted draw stream. The system 300 includes a plurality of FO elements 110a-110c fluidly coupled (e.g., plumbed) in series. The system 300 includes a feed stream source 114 operably coupled to a first FO element 110a. The first FO element 110a includes a first FO membrane 130a at least partially defining a first side 115a and a second side 125a therein. The first side 115a of the first FO element 110a is fluidly coupled to a second FO element 110b. The second FO element 110b includes a second FO membrane 130b at least partially defining a first side 115b and a second side 125b therein. The first side 115b of the second FO element 110b is fluidly coupled to a third FO element 110c. The third FO element 110c includes a second FO membrane 130c at least partially defining a first side 115c and a second side 125c therein. The first sides 115a-115c of the FO elements 110a-110c are coupled together to form a collective first side of the system 300. The first side of the system 300 can include one or more components in fluid communication with the first sides 115a-115c of the FO elements 110a-110c, such as the feed stream source 114.

As the feed stream 112 passes through the series of FO elements 110a-110c, the feed stream 112 becomes more and more concentrated. For example, as the feed stream 112 passes through the first side 115a of the first FO element 110a, the feed stream 112 is dewatered (e.g., concentrated) to form concentrated feed stream 116a having a higher concentration of alcohol than the feed stream 112. As the concentrated feed stream 116a is passed through the first side 115b of the second FO element 110b, the concentrated feed stream 116a is further concentrated (e.g., dewatered) to form second concentrated feed stream 116b having a higher concentration of alcohol than one or both of feed stream 112 and concentrated feed stream 116a. As the second concentrated feed stream 116b is passed through the first side 115c of the third FO element 110c, the second concentrated feed stream 116b is further concentrated to form third concentrated feed stream 116c having a higher concentration of alcohol than one or all of feed stream 112 and concentrated feed stream(s) 116a and/or 116b. The third concentrated feed stream 116c can be directed to one or more downstream product components 118, such as any of those disclosed herein.

On the second side of the system 300, a draw stream source 124 configured to provide a draw stream 122 to the system 300. The draw stream source 124 is operably coupled to the second side 125c of the third FO element 110c. As the draw solution is passed through the second side 125c, the draw stream 122a is diluted to form diluted draw stream 126a. Diluted draw stream 126a is directed to downstream draw components 128a. Downstream draw components 128a can include one or more of at least one conduit (e.g., pipe), a pump, a valve, a tank, an injection port, a mixing apparatus, etc. For example, the downstream draw components 128a can include a conduit having an injection port wherein an injection of one or more components (e.g., alcohol and/or glycerol) of the draw stream 122a may be added to the diluted draw stream 126a to form a first reconstituted draw stream 122b. The alcohol injection port can be configured to provide an injection, titer, or stream of alcohol (or other draw stream component(s)) sufficient to selectively control (e.g., raise) the concentration of alcohol (or other draw stream component(s)) in the diluted draw stream 126a. For example, the alcohol injection port can be used to provide an injection 138a configured to raise the concentration of alcohol at least about 5% ABW over the diluted draw stream 126a, such as raise the concentration to at least about 10% ABW more than the alcohol content of the diluted draw stream 126a, at least about 5% ABW over the concentrated feed stream 116a or 116b, at least about 10% ABW more than the alcohol content of the second concentrated feed stream 116a or 116b, or at least as high as the draw stream 122a. The downstream draw components 128a are operably coupled to the second side 125b of the second FO element 110b.

The first reconstituted draw stream 122b can be directed through the second side 125b of the second FO element 110b to draw one or more components out of the feed stream present in the first side 115b thereof. As the first reconstituted draw stream 122b absorbs components (e.g., water) from the feed solution in the second FO element 110b, the reconstituted draw stream 122b is diluted to form a second diluted draw stream 126b. The second side 125b of the second FO element 110b can be fluidly coupled to one or more downstream draw components 128b. The one or more downstream draw components 128b can be similar or identical to one or more downstream draw components 128a disclosed above. For example, the second diluted draw stream 126b can be directed from the second side 125b through one or more of a conduit a pump, or mixing tank. The one or more downstream draw components 128b can include a second alcohol injection port wherein alcohol (or any other draw stream component) can be added to the second diluted draw-stream 126b to control the concentration of the alcohol therein. The second alcohol injection port can be configured to provide an injection, titer, or stream of alcohol (or other draw solution components) to the second diluted draw stream 126b sufficient to selectively control the concentration of alcohol in the second diluted draw stream 126*b*. For example, the alcohol injection port can be used to provide a second injection 138*b* configured to raise the concentration of alcohol (or other component(s)) of the draw solution) by at least about 5% ABW over the second diluted draw stream 126*b*, such as at least about 10% ABW more than the alcohol content of the second diluted draw stream 126*b*, at least about 5% ABW over the concentrated feed stream 116*a*, at least about 10% ABW more than the alcohol content of the second concentrated feed stream 116*b*, at least about 5% ABW over the feed stream 112, at least about 10% ABW more than the alcohol content of the feed stream 112, at least as high as the feed stream 112, or at least as high as the draw stream 122*a*, The downstream draw components 128*b* are operably coupled to the second side 125*a* of the first FO element 110*a*.

The second reconstituted draw stream 122*c* can be directed through the second side 125*a* of the first FO element 110*a* to draw one or more components out of the feed stream 112 present in the first side 115*a* thereof. As the second reconstituted draw stream 122*c* absorbs components (e.g., water) from the feed solution in the first FO element 110*a*, the second reconstituted draw stream 122*c* is diluted to form a third diluted draw stream 126*c*. The second side 125*a* of the first FO element 110*a* can be fluidly coupled to one or more downstream draw components 128*c*, such as any downstream draw components disclosed herein. For example, the third diluted draw stream 126*c* can be directed from the second side 125*a* through one or more of a conduit, a pump, or a storage tank.

The second sides 125*a*-125*c* (and portions of the system 300 in fluid communication therewith) can collectively form a second side of the system 300. The second side of the system is separated from the first side of the system by the FO membrane(s) and only has contact therewith via the FO membrane(s). As used in some examples herein, the first side can be a feed side and the second side can be a draw side.

As shown in FIG. 3, in some examples there may be multiple intermediate injection stages, while in other examples there may only be one intermediate injection stage (e.g., port). In some embodiments, the system 300 can include one or more outputs between any of the FO elements on one or both of the first (feed) side or second (draw) side. For example, an output such as a valve and drain line can be disposed between the first FO element 110*a* and the second FO element 110*b*, and the second FO element 110*b* and the third FO element 110*c*. The output(s) can allow selective capture of the concentrated feed streams 116*a* and 116*b* prior to the end of the system 300 (e.g., the one or more downstream product components 118). In some embodiments, the system 300 can include one or more pumps between any of the FO elements on one or both of the first (feed) side or second (draw) side such as to control pressure or flow rates at any of the components of the system 300. In some embodiments, rather than reconstituting the draw solution(s), the diluted draw solutions can be removed from the system at each FO element and a new draw solution can be introduced to the second side of each respective FO element via a new, distinct draw stream source.

In some examples, feed solution may be pressurized by a pump (e.g., feed stream source 114) to form low-pressure feed stream 112 (e.g., 5% ABW at 12 gpm). The first FO element 110*a* may receive low-pressure feed stream 112 and dispense concentrated feed stream 116*a* (e.g., 6.7% ABW at 8.7 gpm). The second FO element 110*b* may receive the concentrated feed stream 116*a* and dispense the second further concentrated feed stream 116*b* (e.g., 11.3% ABW at 5.3 gpm). The third FO element 110*c* may receive the second concentrated feed stream 116*b* and dispense the third, further concentrated feed stream 116*c* (e.g., 30% ABW at 2 gpm). Draw solution may be pressured by pump (e.g., draw stream source 124) to form low pressure draw stream 122*a* (e.g., greater than 30% ABW, 15% glycerol by weight (GBW), at 12 gpm). The third FO element 110*c* may receive low-pressure draw stream 122*a* and dispense diluted draw stream 126*a* (e.g., 23.5% ABW, 11.7% GBW, 15.3 gpm). An injection 138*a* of concentrated glycerol and water (e.g., 30% GBW at 16.7 gpm) may be combined with diluted draw stream 126*a* via an injection port, valve, and/or pump (e.g., downstream draw component 128*a*) to form a first reconstituted draw stream 122*b* (e.g., 11.25% ABW, 21.2% GBW, at 32 gpm). The second FO element 110*b* may receive the first reconstituted draw stream 122*b* and dispense diluted draw stream 126*b* (e.g., 10.2% ABW, 19.2% GBW, at 35.3 gpm). A second injection 138*b* of concentrated glycerol and water (e.g., 30% GBW at 17 gpm) may be combined with the second diluted draw stream 126*b*, such as by an injection port, valve, or a pump (e.g., downstream draw component 128*b*) to form second reconstituted draw stream 122*c* (e.g., 6.9% ABW, 22.7% GBW, at 52.3 gpm). The first FO element 110*a* may receive the second reconstituted draw stream 122*c* and dispense the third diluted draw stream 126*c* (e.g., 6.5% ABW, 21.4% GBW, at 55.7 gpm). The third diluted draw stream 126*c* may can be directed to one or more downstream draw components 128*c*. The third diluted draw stream 126*c* may be processed by any one of several draw solution recovery/regeneration techniques described herein.

Figure 4:
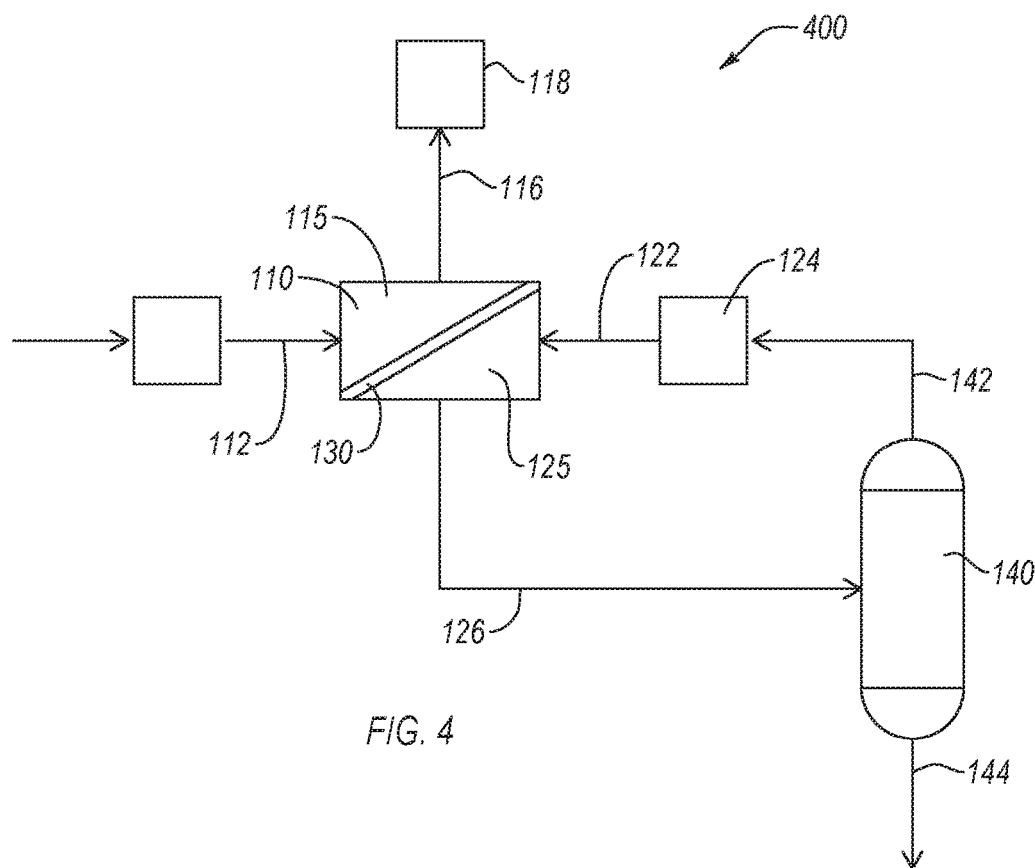
FIG. 4 is a block diagram of forward osmosis system for dewatering alcoholic solutions including a distillation apparatus for recovery of the draw solution by distillation, according to examples described herein.

In some examples, the draw solution may be recovered (e.g., regenerated or reconstituted) by distillation. FIG. 4 is a block diagram of FO system 400 for dewatering alcoholic solutions, the system 400 including a distillation apparatus 140 for recovery (e.g., regeneration) of the draw solution by distillation. The system 400 includes a feed stream source 114 configured to supply the feed stream 112 to the first side 115 of at least one FO element 110 having at least one FO membrane 130 therein. The system 400 includes a draw stream source 124 configured to supply the draw stream 122 to the second side 125 of the FO element 110. The system includes at least one downstream product component 118 fluidly coupled to the first side 115 of the FO element 110. The system 400 further includes at least one regeneration apparatus fluidly coupled to the output orifice of the second side 125 of the FO element 110.

The at least one regeneration apparatus may be provided to at least partially restore the diluted draw stream 126 to the same composition (e.g., relative amounts) as the draw solution of draw stream 122. As shown, the at least one regeneration apparatus can include distillation apparatus 140. The distillation apparatus 140 can be fluidly coupled to and configured to receive the diluted draw stream 126 from the second side 125 of the FO element 110 and concentrate at least one solute (e.g., permeable and/or impermeable solute) in the same via distillation. For example, the distillation apparatus 140 can be configured to produce a distillate stream 142 which may be used as or to augment the draw solution of draw stream 122. The distillation apparatus 140 can include a distillation column or array (e.g., in series, in parallel, or both) of distillation columns. The distillation apparatus 140 may include one or more membrane distillation or pervaporation apparatuses, and distillation may include membrane distillation or pervaporation. The distillation apparatus 140 may receive the diluted draw stream 126 and produce distillate stream 142 (e.g., ethanol distillate) and draw permeate 144 (e.g., 10 gpm) stream. The distillate stream 142 can be directed (e.g., recirculated via one or more conduits and/or pumps) to the draw stream source 124. The draw permeate 144 (e.g., still bottoms, such as water) stream can be removed from the system 400 via one or more conduits, valves, and/or pumps operably coupled to the distillation apparatus. In embodiments, the draw permeate 144 may be recycled in the system such as redirected to the diluted draw stream 126, directed to waste, or one or more reverse osmosis elements. In examples, where the draw permeate 144 is directed to a reverse osmosis element, the reverse osmosis element may remove any residual solutes such as alcohol or glycerol form the draw permeate 144 and produce an RO permeate that is substantially pure water and an RO concentrate that includes the solutes. The RO permeate may be directed to waste such as a waste water outlet and the RO concentrate (e.g., alcohol and/or glycerol) can be directed back to the diluted draw stream 126.

In some examples, feed solution may be pressurized by a pump (e.g., feed stream source 114) to form low-pressure feed stream 112 (e.g., 5% ABW, 12 gpm). The FO element 110 may receive low-pressure feed stream 112 and output concentrated feed stream 116 (e.g., 30 ABW at 2 gpm). Draw solution (e.g. at least about 30% ABW at 2 gpm) may be pressurized by a pump (e.g., draw stream source 124) forming low-pressure draw stream 122. The draw solution may include water and alcohol (e.g., ethanol). FO element 110 may receive low-pressure draw stream 122 and dispense diluted draw stream 126 (e.g., 5% ABW at 12 gpm). The distillation apparatus 140 (e.g., column or array of distillation columns) may receive diluted draw stream 126 and produce distillate stream 142 (e.g., ethanol distillate) and draw permeate 144 (e.g., reduced-ethanol permeate at 10 gpm). In some examples, portions of diluted draw stream 126 are received by the draw stream source 124 (e.g., a pump) in combination with distillate stream 142 (e.g., ethanol) to produce a draw solution of desired water and solute(s) (e.g., alcohol and dissolved sugar(s)) composition. In some embodiments, the output of the second side 125 is operably coupled to the downstream draw components 128. The draw permeate 144 may be directed out of the system via the one or more downstream draw components 128.

Figure 5:
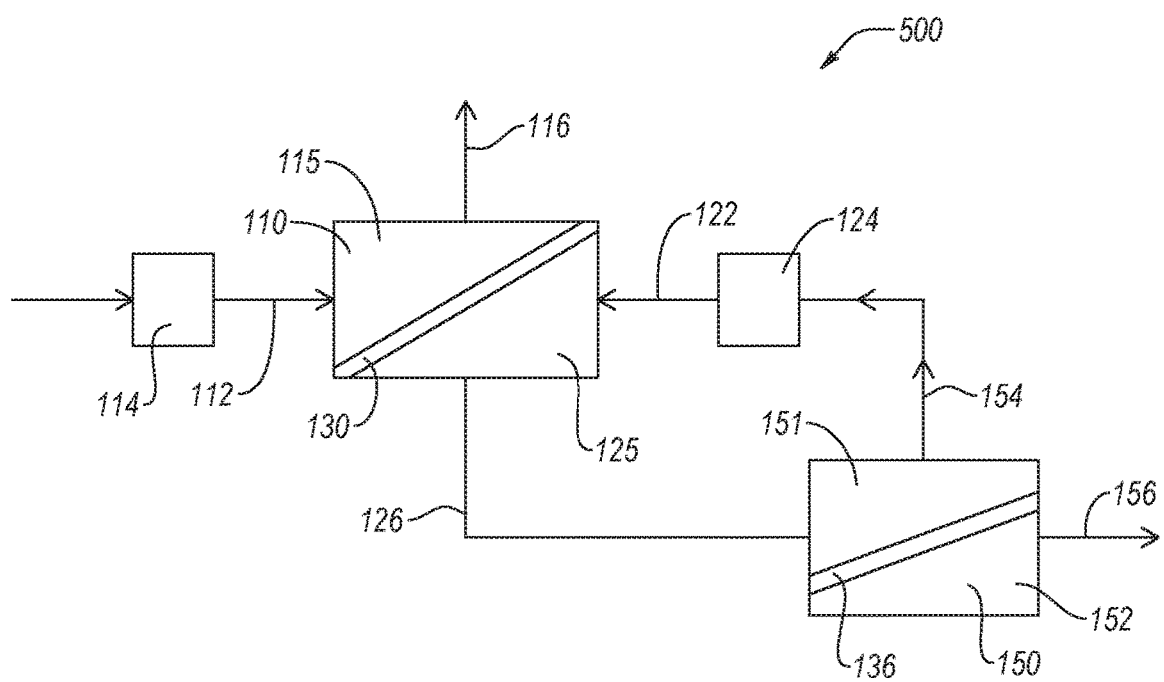
FIG. 5 is a block diagram of a countercurrent forward osmosis system for dewatering alcoholic solutions with a reverse osmosis element for recovery of the draw solution via reverse osmosis, according to examples described herein.

In some embodiments, a regeneration apparatus can include at least one reverse osmosis (RO) element having at least one RO membrane therein. In some embodiments, the draw solution may be at least partially recovered (e.g., regenerated) by RO. FIG. 5 is a block diagram of a countercurrent FO system 500 for dewatering an alcohol solution, the system 500 including an RO element 150 for recovery of the draw solution via RO. The system 500 includes a feed stream source 114 configured to provide a feed stream 112 to an FO element 110. The FO element 110 includes FO membrane 130 dividing a first side 115 from a second side 125 of the FO element 110. The first side 115 can be operably coupled to one or more downstream product components as described herein. The second side 125 can be operably coupled to a draw stream source 124 configured to supply a draw stream 122 into the second side 125 of the FO element 110. As the draw stream 122 is diluted in the FO element 110, a diluted draw stream 126 is produced therefrom. The diluted draw stream 126 can be directed (e.g., via one or more conduits, pumps, valves, etc.) to the RO element 150. The RO element 150 can include a housing containing an RO membrane 136 disposed therein. The housing (e.g., vessel or assembly) can be fluid tight and configured to hold the RO membrane 136 effective to at least partially define a first side 151 and second side 152 therein. The first side 151 and the second side 152 of the RO membrane can be at least partially chemically separated by the RO membrane 136, thereby defining two distinct volumes within the housing. The first side 151 and the second side 152 of the RO element 150 can be similar or analogous to the first side 115 and second side 125 of the FO element 110 described herein. The RO membrane 136 can include any membrane suitable for RO (e.g., a standard RO membrane or a low rejection RO membrane). For example, the RO membrane 136 may separate at least some water, alcohol or other permeable solutes, and impermeable solutes, from a solution having water, alcohol, and permeable and impermeable solutes therein. A single stage of RO may increase the ABW (or other permeable or impermeable solutes content) by as much as 5 wt %, such as about 1 wt % to about 3 wt %, or less than 3 wt %.

The diluted draw stream 126 can be directed to the first side 151 of the RO element 150 where the RO membrane 136 separates at least some of the permeable solutes such as alcohol from the other solutes (e.g., (permeable and/or impermeable solutes such as glucose, fructose, glycerol, dissolved salts, etc.) and at least some of the water to form an RO concentrate in RO concentrate 154. The RO concentrate may also be referred to as an RO reject herein. Such separation can be carried out in a stream or batch. The RO concentrate 154 may contain mostly water and permeable and impermeable solutes. For example, the RO concentrate 154 may contain at least some alcohol therein. At least some of the RO concentrate 154 can be directed back to the draw stream source 124. In some embodiments, the RO concentrate 154 can be combined with one or more components of the draw solution to form (e.g., reform) the draw stream 122. For example, the RO concentrate 154 can be combined with at least alcohol to regenerate draw stream 122. The RO element 150 can also produce an RO permeate 156 from the second side 152 thereof. The RO permeate 156 can include water, alcohol, and one or more other permeable solutes therein. The RO permeate 156 can be further processed to regenerate (e.g., concentrate or more fully recover) at least some of the components thereof (e.g., one or both of permeable solutes or impermeable solutes) such as alcohol or glycerol, via distillation or further RO operations. In some embodiments, the RO permeate 156 can include or can be further processed to be substantially pure water. In some embodiments, one or more pumps (not shown) can be used to control pressure of the diluted draw stream 126 prior to entry into the RO element 150.

In some embodiments, the RO element(s) 150 can be configured as low rejection RO element(s) and/or spiral wound reverse osmosis element(s). In some examples, such as in low rejection RO elements, an element with reduced solute rejection may be used. Low rejection RO elements (e.g., RO elements having low rejection RO membranes) may be used to concentrate solutions with higher osmotic pressures than standard RO elements. In some embodiments, low rejection RO elements can be used to concentrate one or more impermeable solutes, such as sodium chloride, magnesium chloride, glycerol, sucrose, fructose, glucose, one or more dissolved salts, etc. The RO element(s) 150 may be configured as arrays of elements in parallel or in series. The elements or arrays of elements may be operated in a continuous system or in a batch system with buffer tanks.

Figure 6:
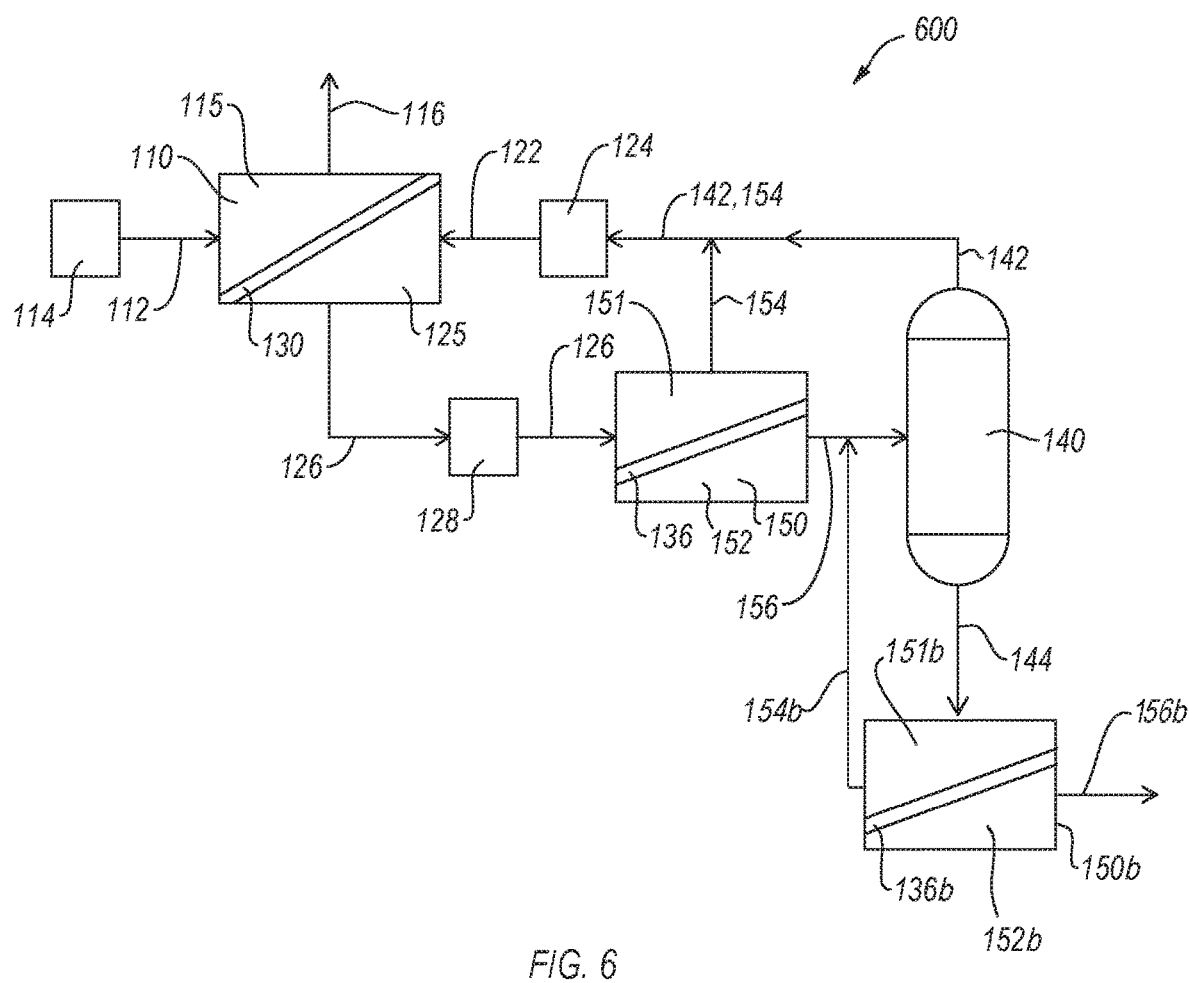
FIG. 6 is a block diagram of a forward osmosis system for dewatering alcoholic solutions configured for recovery of the draw solution by reverse osmosis and distillation, according to examples described herein.

In some embodiments, an FO system for removing one or more components of a fluid mixture can include more than one draw stream regeneration apparatus. FIG. 6 is a block diagram of an FO system 600 configured for recovery of the draw solution by reverse osmosis and distillation. The system 600 can be configured as a countercurrent system as shown. The system 600 includes a feed stream source 114 configured to deliver a feed stream 112 to an FO element 110. The FO element 110 includes an FO membrane 130 separating the first side 115 of the FO element 110 from the second side 125 of the FO element and is configured to selectively allow transport of one or more components from the feed stream 112 in first side 115 into the draw stream 122 in the second side 125. The system 600 can include a draw stream source 124 operably coupled to and configured to provide the draw stream 122 to the second side 125. The feed stream 112 is concentrated via FO as the draw stream 122 draws some of the components therefrom forming concentrated feed stream 116 (e.g., dewatered alcoholic solution). The concentrated feed stream 116 exits the first side 115 and is directed to downstream product components (not shown).

The draw stream 122 is diluted as one or more components of the feed stream 112 migrate across the FO membrane 130 to form diluted draw stream 126. The diluted draw stream 126 can include one or more components (e.g., water) of the feed stream 112 as at least one diluent therein. The diluted draw stream 126 exits the second side 125 and is directed to one or more downstream draw components 128. The one or more downstream draw components can include a pump configured to control pressure of the diluted draw stream 126. The one or more downstream draw components 128 can be operably coupled to one or more regeneration apparatuses, such as at least one RO element 150.

The at least one RO element 150 can include an RO membrane 136 configured to separate one or more components of the diluted draw stream 126. The first side 151 of the RO element 150 can include the diluted draw stream 126 which is converted to RO concentrate 154 therein via RO. The RO concentrate 154 can primarily include a mixture of water and impermeable solute(s). In some embodiments, the RO concentrate 154 can include at least some permeable solutes therein. At least a portion of the RO concentrate 154 can be directed to (e.g., recycled back to) the draw stream source 124. The second side 152 includes an RO permeate 156 therein. The RO permeate 156 may primarily include a mixture of water and permeable solute(s) (e.g., ethanol). In some embodiments, the RO permeate 156 can include at least some impermeable solutes therein. The RO permeate 156 is directed to a distillation apparatus 140.

The distillation apparatus 140 can include one or more distillation columns. The RO permeate 156 is distilled in the distillation apparatus 140 effective to produce a distillate stream 142 which can be directed back to the draw stream source 124. The distillate stream 142 can include predominantly one or more permeable concentrates (e.g., entirely alcohol) therein. The distillation apparatus 140 also produces a draw permeate 144 (e.g., still bottoms containing one or more permeable and/or impermeable solutes) which can be directed to one or more downstream components (not shown), such as waste storage or treatment, delivery apparatuses, or for further treatment. In some embodiments, the draw permeate 144 can include a permeate having a lower amount of alcohol than the distillate stream 142, such as a reduced ethanol distillate or even substantially pure water.

The distillate stream 142 (e.g., high alcohol content fluid) can be directed back to the draw stream source 124. At least a portion of the distillate stream 142 can be combined with at least a portion of the RO concentrate 154 to form the draw stream 122. One or more pumps can be disposed between any of the components of the system 600 to regulate pressure or speed of the fluids therein.

In some examples, an alcoholic solution may be pressurized by a pump (e.g., feed stream source 114) to form low-pressure feed stream 112 (e.g., about 5% ABW at 12 gpm). The FO element 110 receives the low-pressure feed stream 112 and dispenses concentrated feed stream 116 (e.g., 30% ABW at 2 gpm). The draw solution (e.g. 30% ABW at 2 gpm) may be pressurized by a pump (e.g., draw stream source 124) forming low-pressure draw stream 122. The draw solution includes a mixture of water, permeable solute(s) (e.g., ethanol), and impermeable solute(s) (e.g., glucose, fructose, glycerol, sodium chloride, magnesium chloride, other dissolved salts, etc.). The FO element 110 receives low-pressure draw stream 122 and dispenses diluted draw stream 126 (e.g., 5% ABW at 12 gpm). A downstream draw component 128, such as a pump, receives diluted draw stream 126 and produces high-pressure diluted draw stream 126 (e.g., 500-800 psi). At least one RO element 150 receives high-pressure diluted draw stream 126 and dispenses RO concentrate 154 (e.g., an RO reject stream) and RO permeate 156. The RO concentrate 154 may be a mixture of water and impermeable solute(s) such as glycerol. At least some permeable solute(s) such as ethanol may be present in the RO concentrate 154. The RO permeate 156 may be a mixture of water and permeable solute (e.g., ethanol). Distillation apparatus 140 receives RO permeate 156 and produces ethanol distillate in the distillate stream 142, and also produces reduced-ethanol permeate in the draw permeate 144. The ethanol distillate stream 142 may be plumbed to the RO concentrate 154 to reform draw stream 122. In some examples, distillation of the RO permeate 156 may be used. In other examples, distillation of the diluted draw stream 126 to produce a diluted draw solution with reduced alcohol, followed by RO to concentrate additional permeable and impermeable solute(s) may be used. Accordingly, in some embodiments, the distillation apparatus 140 can be disposed "upstream" from the RO element 150.

In some embodiments, the draw permeate 144 exiting the distillation apparatus 140 may include at least some permeable solute (e.g., ethanol) therein, such as 2 wt % or less (e.g., 1 wt % or less) of the draw permeate 144. At least an additional or second RO element 150b may be operably coupled to the distillation apparatus 140 and may be configured to receive the draw permeate 144. For example, the at least a second RO element 150b may be located downstream from the at least one distillation apparatus 140 on the draw permeate 144 side thereof. The at least a second RO element 150b may remove (e.g., polish) any remaining solutes (e.g., alcohol) from the draw permeate 144 (e.g., bottoms) exiting the distillation apparatus 140. For example, the RO element 150 may remove most of the glycerin from the diluted draw stream 126, the distillation apparatus 140 may remove most of the ethanol from the RO permeate 156, and the at least a second RO element 150b may remove any residual solutes (e.g., ethanol, VOCs, and/or glycerin) from the draw permeate 144, to provide substantially pure water stream and as solute stream. For example, the draw permeate 144 may be 2% ABW or less (e.g., less than 1% ABW or less than 0.5 wt % ABW) after distillation and the at least a second RO element 150b may remove substantially all of the alcohol therefrom. The RO permeate 156b (e.g., substantially pure water) may be removed from the system 600 such as directed to a waste outlet (e.g., drain or gray water supply) or may be directed back to the feed side of the system 600 prior to the FO element 110. The RO concentrate 154b (e.g., alcohol) may be recirculated back to distillation apparatus 140, such as by combining the (second) RO concentrate 154b with the (first) RO permeate 156 prior to introducing the RO concentrate 154 into the distillation apparatus 140. Accordingly, the draw permeate 144 may be further polished to recover any residual permeable solutes therefrom. The distillation apparatus 140 may be used to recover (e.g., distill) the residual permeable solutes and recycle the same for use in the draw stream or provide a substantially pure permeable solute stream (e.g., ethanol waste stream).

The countercurrent FO system 600 may be arranged and operated to remove a selected amount of permeable solute(s) from the feed stream or at a selected rate. For example, the draw stream flow rate may be relatively high (e.g., at least 10 times higher or faster) compared to the feed stream flow rate in order to remove a selected amount of permeable solute(s) from the feed stream in the FO membrane or at a selected rate. Such countercurrent flow configurations may allow for the removal of a selected amount of permeable solute from the feed stream by the time the feed stream exits the FO element 110 and maintaining a relatively low permeable solute content in the draw stream throughout the FO element 110. In examples, the flow rate of one or more of the draw-stream or the feed stream may be selected to provide a selected amount of permeate flow into the draw stream (in the FO element). For example, the flow rate of the draw stream may be relatively high to limit the permeate flow rate from the feed stream to the draw stream to one tenth of the flow rate of the draw stream or less (e.g., 10%, 8%, 5%, 3%, 1%, or ranges between any of the foregoing). Put another way, the flow rate of the draw stream may be selected to limit the amount of the permeate flow from the feed stream to the draw stream to one tenth of the volume of the draw stream or less (e.g., 10%, 8%, 5%, 3%, 1%, or ranges between any of the foregoing) per unit volume of the draw stream present in the FO element 110. Such countercurrent configurations and flow rates may keep the permeable solute (e.g., permeate) content as low as possible in the draw solution despite having received the permeable solute from the feed solution.

Figure 7:
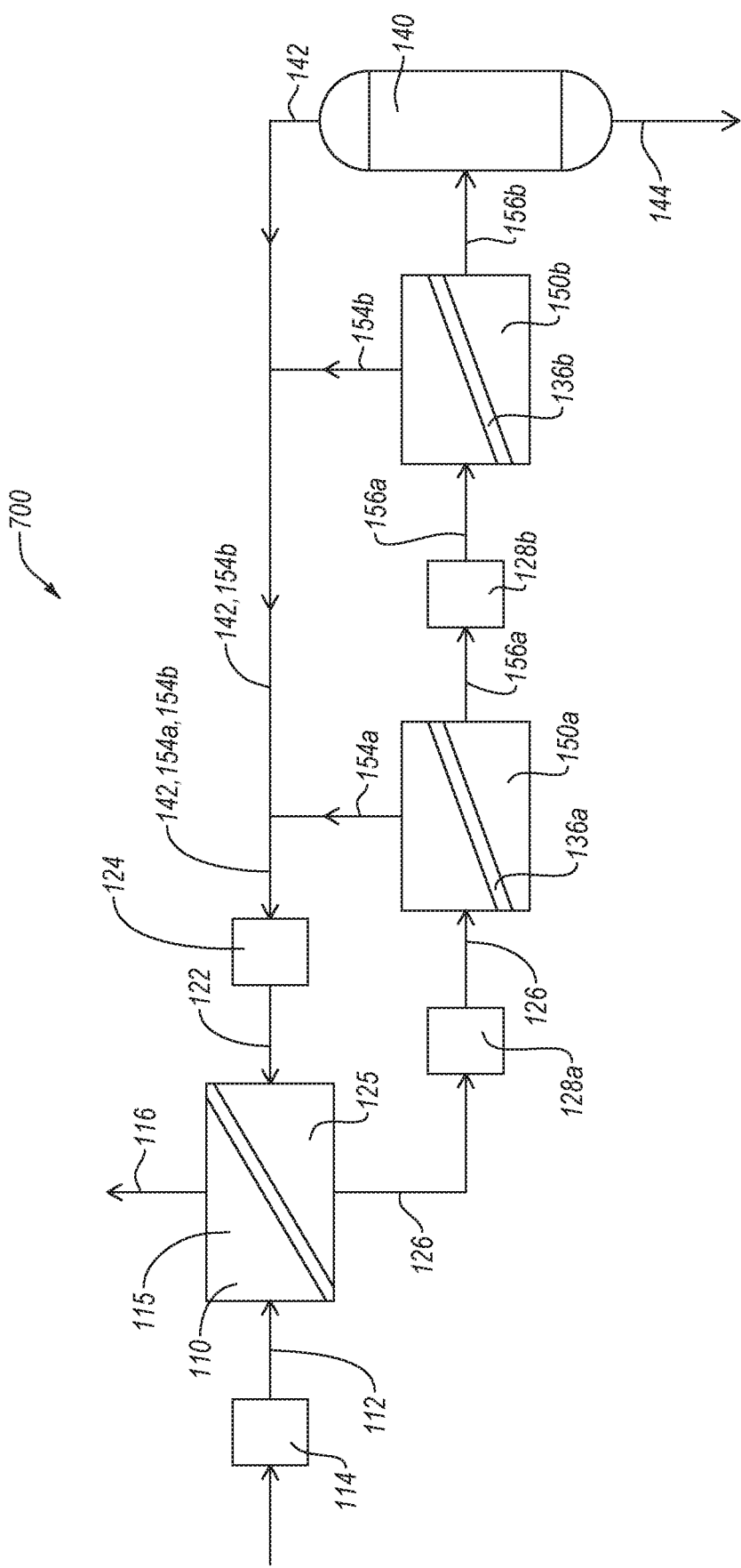
FIG. 7 is a block diagram of a forward osmosis system for dewatering an alcoholic solution, according to examples described herein.

In some embodiments, multiple RO elements can be used to provide step wise regeneration of a draw solution. FIG. 7 is a block diagram of an FO system 700 for dewatering an alcoholic solution. The system 700 includes one or more components configured for recovery of the draw solution by low rejection RO, reverse osmosis, and distillation. The system includes a feed stream source 114 configured to deliver a feed stream 112 to the FO element 110. The FO element includes a first side 115, a second side 125, and FO membrane 130 therein. The feed stream 112 is concentrated in the FO element to produce concentrated feed stream 116 as disclosed herein. The system 700 includes a draw stream source 124 configured to provide draw stream 122 into the FO element 110. As the draw stream 122 travels through the FO element 110, the draw stream 122 is diluted to form diluted draw stream 126. Diluted draw stream 126 is directed through a plurality of draw stream regeneration apparatuses via one or more downstream draw components 128.

The diluted draw stream 126 is initially directed to a first RO element 150a where a first RO concentrate 154a is formed. The first RO element 150a can be configured as a low rejection RO element, that is, an RO element that having a low rejection RO membrane which has a relatively high flux and low rejection rate (e.g., relative to a standard RO element with greater than 99% impermeable solute rejection). For example, a low rejection RO membrane 136a may have a rejection rate of 50% of impermeable solutes and can promote a flux therethrough at least 50% higher than a standard RO membrane 136b at a given hydrostatic pressure. The low rejection rate of the low rejection RO element may allow the concentration of solutions with impermeable solute species concentrations at osmotic pressures exceeding the hydrostatic limit (e.g., 1000 psi) by allowing impermeable solute species through the membrane, thereby reducing the concentration difference across the membrane. In some embodiments, low rejection RO membranes 136a and elements having the same may have a solute rejection rate between about 20 to about 80 percent, such as about 30 to about 70 percent, or about 40 to about 60 percent. The first RO concentrate 154a can have a higher concentration of one or more components of the draw stream 122 than the diluted draw stream 126. For example, the first RO concentrate 154a can include a mixture of alcohol and water having a higher concentration of alcohol and/or other solutes than the diluted draw stream 126. The RO concentrate 154a is directed back (e.g., recycled) to the draw stream source 124, such as via one or more conduits, valves, or pumps. The first RO element 150a produces a first RO permeate 156a which is primarily a mixture of water, impermeable solute, and alcohol. The concentration of impermeable solute(s) in the first RO permeate 156a is lower than in the diluted draw stream 126. The first RO permeate 156a can be directed to a second RO element 150b via one or more downstream draw components 128b (e.g., a pressurized pump).

The second RO element 150b can be configured as a standard RO element, that is, an RO element including an RO membrane 136b having a lower flux and higher rejection rate than the low rejection RO membrane 136a. As the first RO permeate 156a travels through the second RO element 150b, a second RO concentrate 154b and second RO permeate 156b are produced. The second RO concentrate 154b can primarily include one or more concentrated impermeable solutes (e.g., dissolved salts, glucose, fructose, at least some alcohol, etc.) and water, while the second RO permeate 156b can include primarily a mixture of alcohol and water. The second RO concentrate 154b is directed back to the draw stream source 124 via one or more conduits, pumps, valves, etc. The second RO permeate 156b is directed to distillation apparatus 140. Distillation apparatus 140 can receive the second RO permeate 156b and distill the same to produce distillate stream 142 and draw permeate 144 (e.g., RO permeate still bottoms). The distillate stream 142 can include primarily alcohol (e.g., concentrated alcohol) and the draw permeate 144 can include water and alcohol, such as in a highly diluted ethanol solution. The distillate stream 142 can be directed to the draw stream source 124. The distillation apparatus 140 can be plumbed to the draw stream source 124 via one or more conduits. At least some of the distillate stream 142 can be combined with one or more of at least some of the first RO concentrate 154a or at least some of the second RO concentrate 154b to reconstitute (e.g., regenerate) the draw solution or draw stream 122.

In some examples, an alcoholic beverage feed solution may be pressurized by a pump to form low-pressure feed stream 112 (e.g., 5 ABW at 12 gpm). The FO element 110 (or array of elements) may receive low-pressure feed stream 112 and dispense concentrated feed stream 116 (e.g., 30% ABW at 2 gpm). Draw solution (e.g., 30% ABW at 2 gpm) may be pressurized by a pump (e.g., draw stream source 124) to form low-pressure draw stream 122. The draw solution may be a mixture of water, permeable solutes such as ethanol, and impermeable solute(s) such as glycerol. The draw solution can be composed to have a higher concentration of one or more components of the alcoholic beverage feed solution to cause the feed solution to at least partially retain the one or more components therein. FO element 110 may receive low-pressure draw stream 122 and dispense diluted draw stream 126 (e.g., 5% ABW at 12 gpm). The diluted draw stream 126 can be routed through a pump (e.g., downstream draw component 128a) to produce high-pressure diluted draw stream 126 (e.g., about 800 psi). The (low rejection) first RO element 150a receives the high-pressure diluted draw stream 126 and dispenses a mixture of water and impermeable solute(s) (the first RO concentrate 154a) at a higher concentration than in the diluted draw stream 126 and may include an alcohol (e.g., ethanol) at a similar concentration (e.g., within about 5% ABW) to the diluted draw stream 126. The (low rejection) first RO element 150a may also dispense a mixture of water, impermeable solute(s), and ethanol (e.g., first RO permeate 156a) the impermeable solute(s) being present at a lower concentration than in the diluted draw stream 126. The (low rejection) first RO element 150a may produce ethanol at a similar concentration to the diluted draw stream 126 in the first RO permeate. In some examples, the ethanol concentration may be similar (e.g., less than about 5% ABW, such as about 1% ABW) in the feed stream, RO concentrate stream, and RO permeate stream of the (low rejection) first RO element. In some examples, negative rejection (e.g., increased permeation of ethanol) may change the concentration in the RO concentrate stream and RO permeate stream by as much as 5% ABW each.

The first RO permeate 156a is directed through a pump (e.g., downstream draw component 128b) to produce high pressure RO permeate 156a. The second RO element 150b receives the high pressure RO permeate 156a and produces a second RO concentrate 154b and a second RO permeate 156b. The second RO concentrate 154b is primarily concentrated impermeable solute(s), permeable solute(s) (e.g., ethanol) and water. The second RO permeate 156b is primarily a mixture of permeable solute(s) in solvent (e.g., ethanol in water). The second RO permeate stream is directed to a distillation column (e.g., distillation apparatus 140). The distillation column produces concentrated ethanol (e.g., distillate stream 142) and a very diluted ethanol stream (e.g., draw permeate 144). The distillate stream 142 may be plumbed to combine with the second RO concentrate 154b to form a pre-draw stream comprising both the distillate stream 142 and RO concentrate 154b. Pre-draw stream may be plumbed to combine with and the first RO concentrate 154a to form draw stream 122.

In some embodiments, the draw solution can be recovered using a plurality of RO elements. For example, the draw solution or draw stream 122 may be recovered by a first RO stage and a second RO stage. The RO elements in the first and second (recovery) stages may be the same, or may be different, providing different levels of rejection of solutes. In an example, an FO system can include a brackish water RO element in the first stage and a seawater RO element in the second stage. In some embodiments, an FO system can include a low rejection RO element in conjunction with (e.g., prior to) the first and second RO elements.

Figure 8:
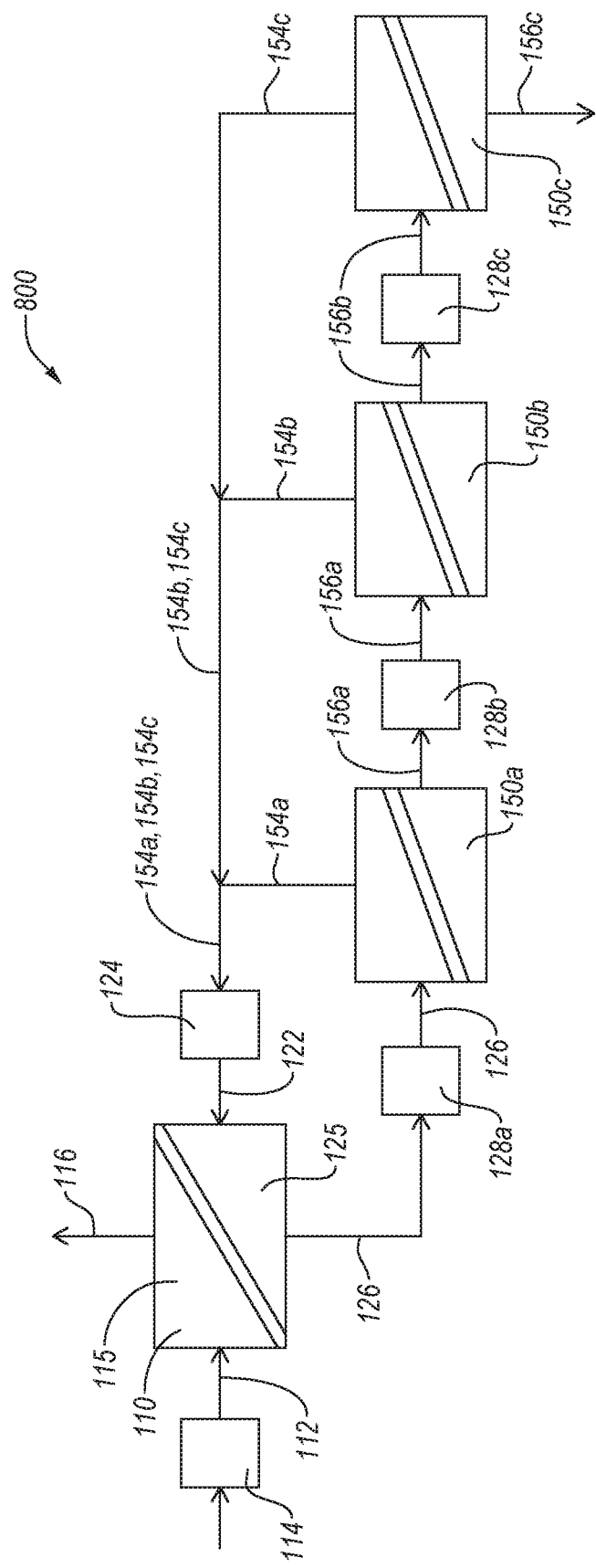
FIG. 8 is a block diagram of a forward osmosis system for dewatering an alcoholic solution and configured for recovery of a draw solution via multiple reverse osmosis operations, according to examples described herein.

FIG. 8 is a block diagram of an FO system 800 for dewatering an alcoholic solution and configured for recovery of a draw solution via multiple reverse osmosis operations. The FO system 800 for dewatering an alcoholic solution is configured for recovery of a draw solution via low rejection RO element 150a, a first reverse RO element 150b, and a second RO element 150c. The system 800 includes a feed stream source 114 configured to deliver a feed stream 112 to the FO element 110. The FO element includes a first side 115, second side 125, and FO membrane 130 separating the first side 115 from the second side 125. The feed stream 112 is concentrated in the FO element to produce concentrated feed stream 116 as disclosed herein. The system 800 includes a draw stream source 124 configured to provide draw stream 122 into the FO element 110. As the draw stream 122 travels through the FO element 110, the draw stream 122 is diluted to form diluted draw stream 126. Diluted draw stream 126 is directed through a plurality of draw stream regeneration apparatuses via one or more downstream draw components 128.

The diluted draw stream is directed through a low rejection RO element 150a. The diluted draw stream 126 is processed in the low rejection RO element 150a to produce a first RO concentrate 154a having a higher concentration of impermeable solutes than the diluted draw stream 126; and to produce a first RO permeate 156a. The first RO concentrate 154a includes water, impermeable solute(s), and at least some permeable solutes (e.g., alcohol). In some embodiments, the concentration of alcohol in the first RO permeate 156a may be similar to the concentration of alcohol in the diluted draw stream 126 and the first RO concentrate 154a. In some embodiments, the concentration of impermeable solutes may be higher in the first RO concentrate 154a than in the diluted draw stream 126. The first RO permeate 156a may include water, at least some alcohol, and at least some impermeable solute(s). The first RO permeate 156a may have a lower concentration of alcohol and/or impermeable solute(s) than the diluted draw stream 126. The first RO concentrate 154a is directed back to the draw stream source 124 and the first RO permeate is directed to second RO element 150b via the one or more downstream draw-components 128b (e.g., one or more conduits and a pump).

The first RO permeate 156a is processed in the first RO element 150b by RO to produce a second RO concentrate 154b and a second RO permeate 156b. The second RO concentrate 154b may have a higher concentration of impermeable solutes than the first RO permeate 156a. The second RO concentrate is directed to the draw stream source 124 via one or more conduits, valves, pumps, etc. The second RO permeate 156b primarily includes water, at least some alcohol, and at least some impermeable solute(s). The second RO permeate 156b may have a lower concentration of alcohol and impermeable solute(s) than the first RO permeate 156a. The second RO permeate 156b is directed to a second RO element 150c via one or more downstream draw component 128c (e.g., one or more conduits, pumps, valves, etc.)

The second RO permeate 156b is processed in the second RO element 150c by RO to produce a third RO concentrate 154c and a third RO permeate 156c. The third RO concentrate 154c may have a higher concentration of alcohol and/or impermeable solutes than the second RO permeate 156b. In some embodiments, the third RO concentrate 154c includes one or more concentrated permeable solutes such as alcohol (e.g., ethanol). The third RO concentrate 154c is directed to the draw stream source 124 via one or more conduits, valves, pumps, etc. The third RO permeate 156c primarily includes one or more of water, at least some alcohol, or at least some impermeable solute(s). The third RO permeate 156c may have a lower concentration of alcohol (and other permeable solutes) and impermeable solute(s) than the second RO permeate 156b. In some embodiments, the third RO permeate 156c can include substantially pure water. The third RO permeate 156c is directed to out of the system 800 or may be further processed by additional downstream components (not shown), including conduits, pumps compressors, distillation apparatuses, RO elements, etc.

The third RO concentrate 154c can be combined with the second RO concentrate 154b at a point intermediate to the draw stream source 124 and the first and second RO elements 150b and 150c. The combined second and third RO concentrates 154b and 154c can be combined with the first RO concentrate 154a to reform (e.g., form a reconstituted or regenerated) draw stream 122. The combined second and third RO concentrates 154b and 154c can be combined with the first RO concentrate 154a at a point intermediate to the draw stream source 124 and the low rejection RO element 150a.

In some embodiments, the order of any of the RO elements may vary. For example, diluted draw stream 126 can be concentrated by a first RO element followed by a low rejection RO element and the second RO element. In some examples, the low rejection RO and the reverse osmosis may be staged in any order. In some embodiments, the systems herein can be arranged to recover one or more specific impermeable or permeable solutes prior to recovering on or more additional permeable or impermeable solutes. For example, regeneration apparatuses can be arranged to recover glycerol from a diluted draw stream prior to recovering ethanol therefrom.

In some examples, an alcoholic beverage feed solution (e.g., beer) may be pressurized by a pump to form low-pressure feed stream 112 (e.g., about 5% ABW at 12 gpm). The FO element 110 receives low-pressure feed stream 112 and dispenses concentrated feed stream 116 (e.g., 30% ABW at 2 gpm). Draw solution (e.g., 30% ABW) may be pressurized by a pump forming low-pressure draw stream 122. The draw solution may be a mixture of water, ethanol, and impermeable solute(s). FO element 110 may receive low-pressure draw stream 122 and dispense diluted draw stream 126. A pump may receive diluted draw stream 126 and produce high-pressure diluted draw stream 126 (e.g., about 500 to about 1000 psi). The low rejection RO element 150a receives the high-pressure diluted draw stream 126 and dispenses the first RO concentrate 154a primarily including impermeable solute(s) at a higher concentration than in the diluted draw stream 126, at least some water, and may include at least some ethanol. The low rejection RO element 150a also dispenses the first RO permeate 156a primarily including water, ethanol, and impermeable solute(s) having a concentration lower than the concentration of impermeable solute(s) in the diluted draw stream 126 and the RO concentrate 154a.

The first RO permeate can be routed through a pump to produce high pressure in the first RO permeate 156a. A first RO element 150b (as differentiated from to the low rejection RO element) receives the high pressure first RO permeate 156b and produces a second RO concentrate 154b and a second RO permeate 156b. The second RO concentrate 154b may include at least some water, impermeable solute(s) at a concentration higher than in first RO permeate 156a, and at least some ethanol. The second RO permeate 156b may include a mixture of alcohol (e.g., ethanol) in water at a concentration lower than the first RO permeate 156a.

The second RO permeate 156b can be routed through a pump to produce high pressure (e.g., 800 psi) in the second RO permeate 156b. A second RO element 150c is configured to receive the high pressure second RO permeate 156b and produce third RO permeate 156c and third RO concentrate 154c. The third RO permeate 156c may include highly diluted ethanol in water. The third RO concentrate 154c may include concentrated ethanol (and/or impermeable solutes) in water at concentration higher than in second RO permeate 156b. The third RO concentrate 154c may be plumbed to combine with second RO concentrate 154b to form a pre-draw stream. The pre-draw stream may be plumbed to combine with first RO concentrate 154a to reform draw stream 122. Additional RO stages may be added to increase the total ethanol (other permeable solute or impermeable solute) recovery as needed.

In some embodiments, one or more permeable solutes and one or more substantially impermeable solutes can be recovered or regenerated from a diluted draw solution separately (e.g., a predominant recovered permeable solute is a specific species) in a system. For example, a first permeable solute may be recovered in a first recovery apparatus (or array thereof) and at least a second impermeable solute may be recovered by at least a second recovery apparatus (or array thereof). After separately recovering the permeable solutes, at least some of the first and second solutes can be admixed with or recombined to form a recovered/regenerated draw solution.

Figure 9:
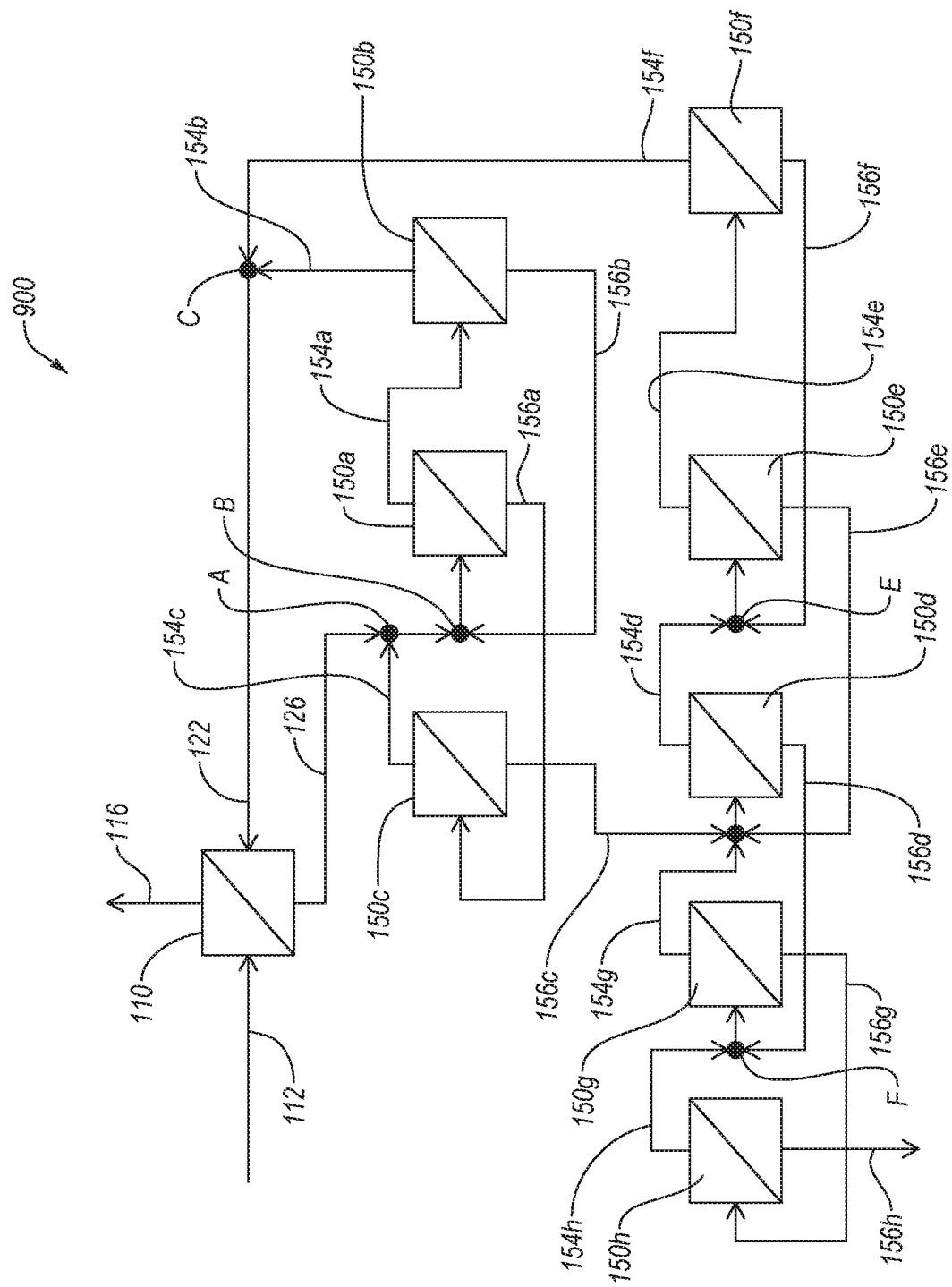
FIG. 9 is a block diagram of a forward osmosis system for dewatering a solution and configured for recovery of a draw solution via multiple reverse osmosis operations, according to examples described herein.

FIG. 9 is a block diagram of an FO system 900 for dewatering a solution and recovery of a draw solution via multiple reverse osmosis operations. The system 900 includes a first array of RO elements arranged to recover a first impermeable solute (e.g., glycerol) from a diluted draw solution and a second array of RO elements arranged to recover a first permeable solute (e.g., ethanol) from the diluted draw solution. The arrays of RO elements can be arranged in parallel, in series, or any combination(s) thereof.

The system 900 includes an FO element 110 as disclosed herein. The feed stream 112 and a draw stream 122 are fed into the FO element 110, such as in countercurrent operation as shown. The draw stream 122 includes a higher concentration of one or more permeable solutes than the feed stream 112 and/or concentrated feed stream 116, and may include additional impermeable solutes (such as in solutions where the sum of the permeable and impermeable solutes collectively provide a greater osmotic pressure in the draw stream than the solute(s) in the feed stream). The FO element 110 outputs a concentrated feed stream 116 having a higher concentration of one or more permeable solutes (e.g., ethanol) than the feed stream 112. The FO element 110 also outputs a diluted draw stream 126 having a lower concentration of at least one species of the one or more permeable solutes (e.g., ethanol) and of the one or more impermeable solutes (e.g. glycerol) than the draw stream 122 due to at least some solvent (e.g., water) crossing the FO membrane. The total amounts of permeable solutes and impermeable solutes in the draw stream may remain essentially static (ignoring some negligible amounts of loss or gain) while the concentration(s) of each are lowered due to dilution by the solvent (water) crossing the FO membrane. The diluted draw stream 126 can be directed to one or more draw solution regeneration apparatuses each configured to regenerate (e.g., concentrate or recover) at least one draw solute from the diluted draw stream 126. The one or more draw solution regeneration apparatuses can include any of the RO elements, distillation apparatuses, or other regeneration apparatuses disclosed herein.

The one or more draw solution regeneration apparatuses may include a first plurality of RO elements 150a-150c and at least a second plurality of RO elements 150d-150h. The first plurality of RO elements may primarily separate a first solute (e.g., impermeable solute) such as glycerol from the diluted draw stream 126 (e.g., selectively isolate one or more major species while additionally isolating minor amounts of additional species), and the at least a second plurality of RO elements 150d-150h may primarily separate at least a second solute (e.g., permeable solute) such as ethanol from the diluted draw stream 126. As the diluted draw solution (to be regenerated) passes through the array (e.g., series) of RO elements one or more solutes therein can be steadily concentrated until a desired concentration is reached.

In some examples, a first RO element 150a can be fluidly coupled to the FO element 110. The first RO element 150a can receive the diluted draw stream 126 and output an RO concentrate 154a and an RO permeate 156a (e.g., in a streams or batches). The first RO concentrate 154a can include a mixture of at least a first impermeable solute (e.g., a plurality of impermeable solutes) and a first permeable solute and water having a higher concentration of at least the first impermeable solute and/or other impermeable solutes than the diluted draw stream 126. The concentration of the first impermeable solute in the first RO permeate 156a may be lower than in the diluted draw stream 126 and/or the first RO concentrate 154a. The first RO concentrate 154a can be directed to a second RO element 150b and the first RO permeate can be directed to a third RO element 150c.

The second RO element 150b is fluidly coupled to the first RO element 150a. The first RO concentrate 154a is received by the second RO element 150b and is at least partially separated (e.g., filtered) therein. The second RO element 150b outputs a second RO concentrate 154b and a second RO permeate 156b. The second RO concentrate 154b can include a mixture of at least the first impermeable solute (e.g., a plurality of impermeable solutes) and the first permeable solute (e.g. alcohol) and water having a higher concentration of at least the first impermeable solute and/or other impermeable solutes and alcohol than the diluted draw stream 126 and the first RO concentrate 154a. The concentration of the first impermeable solute in the second RO permeate 156b may be lower than in one or more of the diluted draw stream 126, the first RO concentrate 154a, and/or the second RO concentrate 154b. The second RO concentrate 154b may include a greater amount of the first impermeable solute (e.g., glycerol) than any of the other RO concentrates in the system 900. The second RO concentrate 154b can be directed back to the FO element 110 (or a downstream apparatus intermediate the second RO element 150b and the FO element 110) and the second RO permeate can be directed back to the first RO element 150a (e.g., recycled therethrough). The second RO concentrate 154b can be combined with one or more additional solutions (e.g., additional concentrate streams) at a point C intermediate to the FO element 110.

In some examples of the system 900, the second RO element 150b can be a low rejection RO membrane, which can be operated at a higher osmotic pressure than a standard RO membrane (e.g., membrane that is less permeable, having higher rejection rates than the low rejection RO membranes). The low rejection RO membrane can be operated at a high pressure which may concentrate the one or more impermeable solutes (e.g., glycerol) in the solution therein at a higher rate than in a standard RO system. In some examples, the second RO element 150b can include a plurality of RO elements (e.g., an array of RO elements arranged in series and/or in parallel) and the RO concentrate 154a may be cycled through each of the plurality of RO elements progressively concentrating at least the first impermeable solute therein upon each successive RO operation. In such examples, the plurality of RO elements in the position of the second RO element 150b can include at least 2 RO elements, such as 20 to 100, 2 to 50, 5 to 40, 10 to 30, 2 to 20, 15 to 25, 30 to 50, 2 to 10, 3 to 8, 2 to 5, 3 to 6, or 5 to 10, more than 10, more than 20, more than 30, less than 50, less than 40, less than 30, less than 20, or less than 10 RO elements.

In some examples, the system 900 includes an additional, third RO element 150c to further remove at least the first impermeable solute from the diluted draw stream (as it is found after at least two RO operations). In such examples, the third RO element 150c can ensure that at least a major portion of one or more undesirable impermeable or permeable solutes (e.g., species of impermeable or permeable solutes that interfere with further regeneration or recovery of other solutes) are isolated or recovered from the in-process solution (e.g., solution being processed for recovery of further, different solutes) such that further regeneration/recovery of the draw solution progresses without interference therefrom. The third RO element 150c is fluidly coupled to the second RO element 150b and receives the second RO permeate 156b which is at least partially separated therein. The third RO element 150c outputs a third RO concentrate 154c and a third RO permeate 156c. The third RO concentrate 154c can include a mixture of at least the first impermeable solute (e.g., a plurality of impermeable solutes) and water having a higher concentration of at least the first impermeable solute (e.g., glycerol) and/or permeable solutes than the diluted draw stream 126, or the first RO permeate 156a. In some embodiments, the third RO concentrate 154c can include a mixture of at least the first permeable solute and water having a concentration similar to the diluted draw stream 126 and the second RO permeate 156b. The third RO element 150c and operation can ensure that essentially no undesirable impermeable solutes are present when the third RO permeate 156c is further subjected to recovery of at least a first permeable solute (e.g., ethanol). The third RO concentrate 154c may be directed back to the first RO element 150a for further solute recover therein (e.g., recycled therethrough). The third RO concentrate 154c can be combined with diluted draw stream 126 at point A (e.g., one or more of a valve, a pipeline, a tank, etc.) and the combined diluted draw stream 126 and third RO concentrate 154c can be further combined with the second RO permeate 156b at point B (e.g., one or more of a valve, a pipeline, a tank, etc.) prior to entering the first RO element 150a.

The concentration of the first impermeable solute in the third RO permeate 156c may be lower than in one or more of the diluted draw stream 126, the first RO concentrate 154a, and/or the second RO concentrate 154b, such as negligible amounts of the first impermeable solute (e.g., amounts that do not interfere with further recovery/regeneration operations). For example, the third RO permeate 156c can include less than about 2 wt % of the first impermeable solute, such as about 0.1 wt % to about 2 wt %, or greater than 0 wt % to about 1 wt % of the first impermeable solute. The concentration of at least the first permeable solute (e.g., ethanol) can be substantially constant throughout the RO elements 150a-150c. In some examples, the concentration of one or more permeable solutes (e.g., ethanol) can remain steady, such as by varying by less than 5 wt % between each RO element or operation, such as by less than about 3 wt %, less than about 2 wt %, or about 1 wt % to about 3 wt % between at least two of the RO elements 150a-150c.

The third RO permeate 156c can be directed through a second set of draw stream regeneration apparatuses. Each of the second set of draw stream regeneration apparatuses may recover (e.g., concentrate) at least the first permeable solute (e.g., ethanol) therefrom (e.g., regenerate at least a portion of the draw solution). For example, the third RO permeate 156c can be directed to a fourth RO element 150d, where one or more permeable solutes are recovered. The fourth RO element 150d can be fluidly coupled to the third RO element 150c.

The fourth RO element 150d outputs a fourth RO concentrate 154d and a fourth RO permeate 156d. The fourth RO concentrate 154d can include a mixture of at least the first permeable solute (e.g., a plurality of permeable solutes which can also include residual amounts of the impermeable solute(s)) and water having a higher concentration of at least the first permeable solute and/or other permeable solutes than the diluted draw stream 126 and the third RO permeate 156c. The concentration of the first permeable solute (e.g., ethanol) in the fourth RO permeate 156d may be lower than in fourth RO concentrate 154d or the third RO permeate 156c. The substantial lack of the first impermeable solute (e.g., glycerol) in the third RO permeate 156c may allow for a more straightforward recovery process for at least the first permeable solute (e.g., undesirable chemical interactions between the first permeable solute and the RO membrane and/or chemical components if the feed and draw solutions are absent). The fourth RO concentrate 154d may include a greater amount of at least the first permeable solute than the third RO permeate 156c. The fourth RO concentrate 154d can be directed to a fifth RO element 150e and the fourth RO permeate 156d can be directed to a seventh RO element 150g.

The fifth RO element 150e can be fluidly coupled to the fourth RO element 150d and can receive the RO concentrate 154d and at least partially separate (e.g., filter) at least some of the components therein. The fifth RO element 150e outputs a fifth RO concentrate 154e and a fifth RO permeate 156e. The fifth RO concentrate 154e can include a mixture of at least the first permeable solute (e.g., a plurality of permeable solutes that may include residual amounts of the first impermeable solute) and water having a higher concentration of at least the first permeable solute and/or other permeable solutes than the diluted draw stream 126, the fourth RO concentrate 154d, and the fourth RO permeate 156d. The concentration of the first permeable solute (e.g., ethanol) in the fifth RO permeate 156e may be lower than in fifth RO concentrate 154e or the fourth RO concentrate 154d. The fifth RO concentrate 154e can be directed to a sixth RO element 150f and the fifth RO permeate 156e can be directed back to the fourth RO element 150d.

In some examples, the fifth RO element 150e can include a plurality of RO elements (e.g., at least two RO elements arranged in parallel and/or in series) to progressively concentrate at least the first permeable solute (e.g., ethanol) to a desired concentration prior to reaching the sixth RO element 150f. In such examples, the plurality of RO elements in position of the fifth RO element 150d can include at least 2 RO elements, such as 2 to 100, 2 to 50, 5 to 40, 10 to 30, 2 to 20, 15 to 35, 20 to 40, 30 to 50, 35 to 45, 2 to 10, 3 to 8, 2 to 5, 3 to 6, or 5 to 10, more than 10, more than 20, more than 30, less than 50, less than 40, less than 30, less than 20, or less than 10 RO elements.

The output of the fifth RO element 150e is fluidly coupled to at least the sixth RO element 150f and the fourth RO element 150d (e.g., at least the second side of the fifth RO element 150e is fluidly coupled to feed the first side of the fourth RO element 150d to recycle the fifth RO permeate 156e through the fourth RO element 150d). The fifth RO permeate 156e can be combined with at least the third RO permeate 156c at a point D prior to the fourth RO element 150d.

The fifth RO concentrate 154e is received and at least partially separated by the sixth RO element 150f. The sixth RO element 150f outputs a sixth RO concentrate 154f and a sixth RO permeate 156f. The sixth RO concentrate 154f can include a mixture of at least the first permeable solute (e.g., a plurality of permeable solutes that may include residual amounts of the first impermeable solute) and water having a higher concentration of at least the first permeable solute and/or other permeable solutes than the diluted draw stream 126, the fifth RO concentrate 154e, the fifth RO permeate 156e, and the sixth RO permeate 156f. The sixth RO concentrate 154f may include a greater concentration of at least the first permeable solute than any other concentrate or permeate in the system 900. The concentration of the first permeable solute (e.g., ethanol) in the sixth RO permeate 156f may be lower than in the sixth RO concentrate 154f or the fifth RO concentrate 154e. The sixth RO concentrate 154f can be directed back to the FO element 110 to at least partially reconstitute the draw stream 122 and the sixth RO permeate 156f can be directed back to the fifth RO element 150e (e.g., for further RO operations).

The sixth RO concentrate 154f, having the highest concentration of at least the first permeable solute (e.g., ethanol) in the system 900 can be combined with the third RO concentrate 154c having the highest concentration of at least the first impermeable solute (e.g., glycerol) in the system 900 at point C prior to the FO element 110. The combination of the two RO concentrates 154c and 154f can at least partially reconstitute (e.g., regenerate) the draw stream 122, such that the solute(s) concentration(s) (e.g., permeable and impermeable solutes) therein is near or identical to the concentration(s) in the draw stream 122 prior to FO treatment.

The sixth RO permeate 156f is directed back to the first side of the fifth RO element 150e, where it undergoes additional RO operation(s) to further remove the first permeable solute therefrom. The sixth RO permeate 156f can be combined with the fourth RO concentrate 154d at a point E prior to the fifth RO element 150e.

Returning to the fourth RO permeate 156d stream, the output of the second side of the fourth RO element 150d is fluidly coupled to the first side of the seventh RO element. The fourth RO permeate 156d enters the seventh RO element 150g where one or more components therein are separated. The seventh RO element 150g outputs a seventh RO concentrate 154g and a seventh RO permeate 156g. The seventh RO concentrate 154g can include a mixture of at least the first permeable solute and water having a higher concentration of at least the first permeable solute and/or other permeable solutes than an eighth RO concentrate 154h and eighth RO permeate 156h (and in some examples may be substantially equal (e.g., within about 1-2% ABW) to the concentration in the fourth RO permeate 156d). The concentration of the first permeable solute (e.g., ethanol) in the seventh RO permeate 156g may be lower than the concentration in fourth RO permeate 156d and/or the seventh RO concentrate 154g.

The seventh RO concentrate 154g can be directed back to the fourth RO element 150d for further RO operations and the seventh RO permeate 156g can be directed to an eighth RO element 150g. The seventh RO concentrate 154g can be combined with one or more of the third RO permeate 156c and the fifth RO permeate 156e at point D. The seventh RO permeate is directed to the eighth RO element 150h.

In some examples, the seventh RO element 150g can include a plurality of RO elements (e.g., at least two RO elements arranged in series and/or in parallel) to progressively concentrate at least the first permeable solute to a desired concentration prior to recycling back to the fourth RO element 150d. In such examples, the plurality of RO elements in position of the seventh RO element 150g can include at least 2 RO elements, such as 2 to 100, 2 to 50, 5 to 40, 10 to 30, 2 to 10, 3 to 8, 2 to 5, 3 to 6, or 5 to 10, more than 10, more than 20, more than 30, less than 50, or less than 10 RO elements.

The seventh RO concentrate 154g can be directed back to the fourth RO element 150d for further RO operations and the seventh RO permeate 156g can be directed to an eighth RO element 150g. The seventh RO concentrate 154g can be combined with one or more of the third RO permeate 156c and the fifth RO permeate 156e at point D. The seventh RO permeate is received at the eighth RO element 150h where one or more components therein are at least partially separated.

The eighth RO element 150h outputs an eighth RO concentrate 154h and an eighth RO permeate 156h. The eighth RO concentrate 154h can include a mixture of at least the first permeable solute and water having a higher concentration of at least the first permeable solute and/or other permeable solutes than the eighth RO permeate 156h. The concentration of the first permeable solute (e.g., ethanol) in the eighth RO permeate 156g may be lower than the concentration in seventh RO permeate 156g and/or the eighth RO concentrate 154h. In examples, the eighth RO permeate 156h may include the lowest concentration of one or both of the first impermeable solute and at least the first permeable solute in the system 900. For example, the eighth RO permeate can be free (excepting residual amounts of less than about 1 wt %) of one or more of the first impermeable solute and at least the first permeable solute. Accordingly, essentially all of the first RO permeate is removed from the third RO permeate 156c (derived from the diluted draw stream 126) entering the second set of regeneration apparatuses.

The eighth RO concentrate 154h can be directed back to the seventh RO element 150g for further RO operation(s). The eighth RO concentrate 154h can be combined with the fourth RO permeate 156d at a point F prior to the seventh RO element 150g. The eighth RO permeate 156h may be removed from the system 900 as it exits the eighth RO element 150h. For example, the eighth RO permeate 156h can be directed to a tank, pipe, wastewater repository, or further water treatment apparatuses, outside of the system 900.

Points A, B, C, D, E, F may include one or more of pipeline(s), valve(s), tank(s), mixing vessel(s) or apparatuses, pump(s), or other equipment configured to mix, control movement, and/or contain a liquid therein. While points A, B, C, D, E, F are described as positions in the system 900, points A, B, C, D, E, F can indicate an operation of combining the streams converging thereat.

Any of the RO elements in the system 900 can include any of the RO membranes disclosed herein, such as a standard RO membrane or a low rejection RO membrane. Accordingly, any of the RO elements in the system 900 can be operated at any of the pressures disclosed herein. The operations and regeneration apparatuses disclosed above can be carried out in different orders, such as recovering a first permeable solute prior to recovering a first impermeable solute. In some embodiments, a system can include at least a first set of draw regeneration apparatuses to recover a first permeable concentrate (or impermeable concentrate) and a second set of draw regeneration apparatuses to recover a second permeable concentrate (or impermeable concentrate). Draw recovery of one or more permeable concentrates or impermeable concentrates may be carried out in any order using the techniques and systems disclosed herein.

In some examples, the system 900 can dewater the feed stream 112 having a volume of about 900 liters and an ethanol content of about 7% ABW. The feed stream can be dewatered in the FO element 110 using the draw stream 122 having a volume of about 685 liters, an ethanol concentration (e.g., first permeable solute) of about 27.4% ABW and a glycerol concentration (e.g., first impermeable solute) of about 10 wt %. The resulting concentrated feed stream 116 includes a volume of about 335 liters and an ethanol content of about 18.8% ABW. The resulting diluted draw stream 126 can include a volume of about 1250 liters, a glycerol concentration of about 5.5 wt %, and an ethanol concentration of about 15 wt %.

The diluted draw stream 126 is combined with the third RO permeate 156c and second RO permeate 156b prior to the first RO element 150a. The combined flow into the first RO element 150a includes a volume of about 2145 liters having an ethanol concentration of about 17% ABW and glycerol concentration of about 5 wt %. The first RO element 150a outputs a first RO concentrate 154a having a volume of about 750 liters, an ethanol concentration of about 19% ABW and a glycerol content of about 12 wt %. The first RO element 150a outputs the first RO permeate 156a having a volume of about 1395 liters, ethanol content of about 16% ABW, and glycerol content of about 2 wt %. In some examples, the first RO element 150a can include an array of RO elements, such as at least 2 RO elements, about 2 to about 40, or about 2 to 5 RO elements.

The first RO concentrate 154a is directed to the second RO element 150b, where the concentrate is further processed and the first RO permeate 156a is directed to the third RO element 150c for further processing. The second RO element 150b is configured as a low rejection RO element (e.g., operably at high pressures such as about 800 psi). The second RO element 150b outputs a second RO concentrate 154b having a volume of about 345 liters, an ethanol concentration of about 19% ABW, and a glycerol concentration of about 19 wt %. The second RO concentrate 154b is directed back to the FO element 110. The second RO element 150b outputs the second RO permeate 156b having a volume of about 405 liters, an ethanol concentration of about 19% ABW, and a glycerol content of about 5 wt %. The second RO permeate 156b is directed back to the first RO element 150a where it is combined with diluted draw stream 126 and third RO concentrate 154c for further RO processing.

The first RO permeate 156a is received in the third RO element 150c and separated into the third RO concentrate 154c and third RO permeate 156c. The third RO concentrate 154c includes a volume of about 905 liters, ethanol concentration of about 19% ABW, and glycerol concentration of about 4 wt %. The third RO concentrate is combined with the diluted draw stream 126 and second RO permeate 156b at point A. The third RO permeate includes a volume of about 905 liters, an ethanol concentration of about 19% ABW and a glycerol concentration of about 3 wt % or less (e.g., less than about 1 wt %). At this point in processing, most of the glycerol is removed from the diluted draw stream 126 (as processed through RO elements 150a-150c) which may be further processed via RO to recover (e.g., concentrate) the ethanol therein.

The third RO permeate 156c is combined with the seventh RO concentrate 154g and the fifth RO permeate at point D prior to entering the fourth RO element 150d to form a combined solution. The combined solution includes a volume of about 3110 liters and ethanol concentration of about 14% ABW (with negligible amounts of glycerol therein). In the fourth RO element 150d the combined solution is separated into the fourth RO concentrate 154d and fourth RO permeate 156d. The fourth RO concentrate 154d has a volume of about 1385 liters and ethanol content of about 20% ABW. The fourth RO concentrate 154d is directed to the fifth RO element 150e, where it is combined with the sixth RO permeate 156f prior to reaching the fifth RO element 150e. The fourth RO permeate 156d has a volume of about 1725 liters and ethanol content of about 10% ABW. The fourth RO permeate 156d is directed to the seventh RO element 150g where it is combined with the eighth RO concentrate 154h prior to reaching the eighth RO element 150h.

The volume of solution of the combination of the fourth RO concentrate 154d and the sixth RO permeate 156f is about 1720 liters and the ethanol content is about 19% ABW. In the fifth RO element 150e, the solution is separated into the fifth RO concentrate 154e having a volume of about 675 liters and ethanol concentration of about 32% ABW, and the fifth RO permeate 156e having a volume of about 1045 liters and ethanol concentration of about 15% ABW. The fifth RO concentrate 154e is directed to the sixth RO element 150f and the fifth RO permeate 156e is directed to the fourth RO element 150d for combination with additional streams as described above. In some examples, the fifth RO element 150e can include an array of RO elements, such as about 2 to 7 RO elements.

The sixth RO element 150f receives the fifth RO concentrate 154e and separates it into the sixth RO concentrate 154f and the sixth RO permeate 156f. The sixth RO concentrate 154f has a volume of about 335 liters and ethanol concentration of about 37% ABW. At this point the ethanol concentration may be at its highest point in the system. The sixth RO permeate 156f includes a volume of about 335 liters and ethanol concentration of about 27% ABW. The sixth RO concentrate 154f is directed back to the FO element 110 where it is combined with the second RO concentrate 154b at point C prior to the FO element 110 to at least partially reform the draw stream 122. The sixth RO permeate 156f is directed back to the fifth RO element 150e where it is combined with the fourth RO concentrate 154d prior to the fifth RO element 150d.

Returning to the fourth RO permeate 156d, the combination of the eighth RO concentrate 154h and the fourth RO permeate 156d having a volume of about 2190 liters and ethanol concentration of about 8% ABW is separated in the seventh RO element 150g. The seventh RO element 150g outputs the seventh RO concentrate 154g and the seventh RO permeate 156g. The seventh RO concentrate 154g includes a volume of about 845 liters and an ethanol concentration of about 9% ABW. The seventh RO permeate 156g includes a volume of about 1035 liters and ethanol concentration of about 3% ABW. In some examples, the seventh RO element 150g can include an array of RO elements, such as about 2 to 7 RO elements (e.g., in series, each producing a progressively more concentrated RO concentrate and progressively more diluted permeate; and/or in parallel, each producing a similarly concentrated RO concentrate and diluted permeate). The seventh RO concentrate 154g is directed to the fourth RO element 150d as disclosed above and the seventh RO permeate is directed to the eighth RO element 150h.

The eighth RO element 150h separates the seventh RO permeate 156g into the eighth RO concentrate 154h and the eighth RO permeate 156h. The eighth RO concentrate includes a volume of about 465 liters and an ethanol concentration of about 6% ABW. The eighth RO concentrate 154h is directed back to the seventh RO element 150g for further processing. The eighth RO permeate includes a volume of about 560 liters and an ethanol concentration less than about 1% ABW (about 0.6% ABW). The eighth RO permeate 156h is substantially free of both glycerol and ethanol from the draw stream 122. Accordingly, essentially all of the ethanol and glycerol are recycled to the draw stream 122, thereby reducing material costs. The eighth RO permeate 156h can be removed from the system 900.

While ethanol and glycerol are used as the first permeable solute and first impermeable solute, respectively, in the above examples, it should be understood that any of the other permeable and/or impermeable solutes disclosed herein may be used alternatively or in addition to ethanol or glycerol, without limitation.

The volumes and concentrations disclosed in the above examples are merely some examples, variations of larger and smaller volumes and/or concentrations are considered. Volumes and concentrations can vary depending on the species of the permeable and/or impermeable solutes, desired final concentration of the permeable and/or impermeable solutes, number of RO elements, etc. Volumes can be scaled, or adjusted as needed. For example, the volumes noted above can be increased or decreased by a factor of about 0.1 or more, such as about 0.1 to about 1000, about 1 to about 100, about 5 to about 50, about 10 to about 25, about 1 to about 10, about 3 to about 15, or less than about 20.

The above examples may include one or more distillation apparatuses, more RO elements, less RO elements, one or more sets or combinations of any of the foregoing to remove or concentrate one or more permeable solutes from a diluted draw solution, or combinations of any of the foregoing. In some embodiments, the RO elements include an array of RO membranes that may be in arranged parallel or in series, or in any combination of parallel and series.

In embodiments, at least some of the RO elements in the system 900 can be replaced by one or more distillation apparatuses. For example, the RO elements 150d-150h can be replaced by at least one distillation apparatus (e.g., an array of distillation apparatuses plumbed in parallel and/or series) configured to separate one or more components of the diluted draw stream 126 or derivatives thereof such as the third RO permeate 156c. In such embodiments, the at least one distillation apparatus can be operably coupled to the third RO element 150c and receive the third RO permeate therefrom. The distillation apparatus can separate the third RO permeate 156c into distillate(s) and permeate(s) (e.g., still bottoms or source liquid for the distillates). The distillate can include ethanol or any other permeable solute and the permeate can include water. The distillate (e.g., ethanol) can be operably coupled to the draw stream supply to at least partially regenerate the draw stream 122. For example, ethanol distillate from the at least one distillation apparatus can be combined with the second RO concentrate 154b to at least partially regenerate draw stream 122. The permeate can be directed to one or more downstream apparatuses such as a waste supply. Such embodiments can be used to concentrate an alcoholic solution, such as an alcoholic beverage, and regenerate the draw stream from the diluted draw stream back to a higher alcohol concentration than the feed stream.

Block diagram of FIG. 9 is described as a system above and may also be considered as a block diagram of exemplary methods. Such methods can be accomplished in a continuous series of operations as described above or in a batch wise manner (e.g., each FO or RO element operation is carried out separately).

Any of the systems disclosed herein can be configured as a countercurrent system or a co-current system. The systems disclosed herein can be used to dewater (e.g., concentrate) solutions containing one or more permeable and/or impermeable solutes, such as alcoholic beverages. Solutions can be concentrated via one or more techniques disclosed below.

Figure 10:
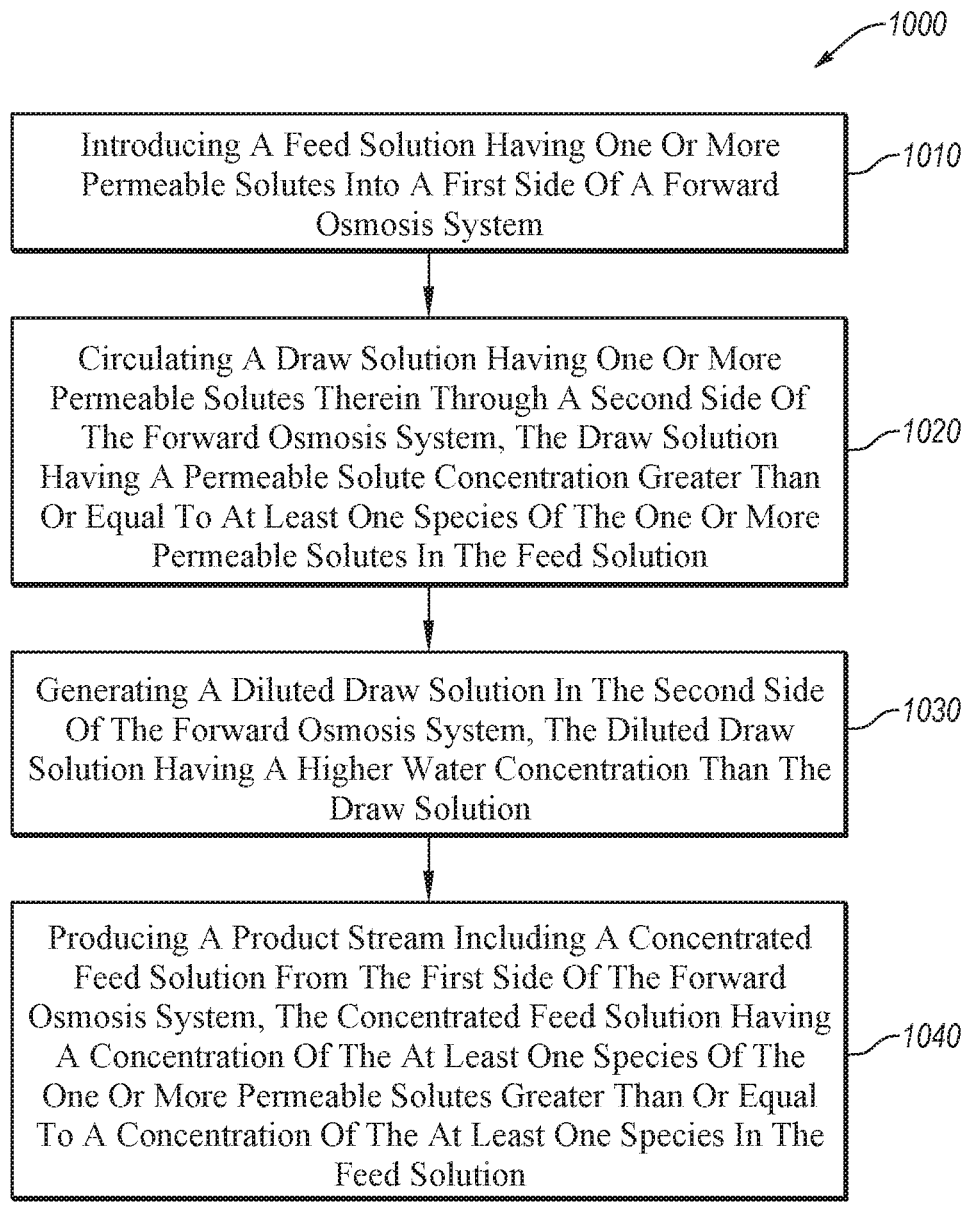
FIG. 10 is a flow diagram of a method for dewatering a solution, according to examples described herein.

FIG. 10 is a flow diagram of a method 1000 for dewatering a solution. The method 1000 includes an act 1010 of introducing a feed solution having one or more permeable solutes into a first side of a forward osmosis system; an act 1020 of circulating a draw solution having one or more permeable solutes therein through a second side of the forward osmosis system, the draw solution having a permeable solute concentration greater than or equal to at least one species of the one or more permeable solutes than the feed solution; an act 1030 of generating a diluted draw solution in the second side of the forward osmosis system, the diluted draw solution having a higher water concentration than the draw solution; and an act 1040 of producing a product stream including a concentrated feed solution from the first side of the forward osmosis system, the concentrated feed solution having a concentration of the at least one species of the one or more permeable solutes greater than or equal to a concentration of the at least one species in the feed solution.

The act 1010 of introducing a feed solution having one or more permeable solutes into a first side of a forward osmosis system can include introducing a solution having at least alcohol therein into a forward osmosis system. The feed solution can include an alcohol containing solution or a beverage containing alcohol such as malt beverages, beer, wine, distilled liquor or spirits; a flavor extract; a dye extract, or a fermentation broth (e.g., for ethanol production). The feed solution can include one or more permeable solutes therein (methanol, ethanol, isopropanol, ethylene glycol, lithium, lactic acid, acetic acid, citric acid, boron and boron oxides, hydroxide salts, ammonia, etc.), and optionally, one or more impermeable solutes such as sugars (e.g., glucose, fructose, glycerol, etc.), VOCs, dissolved salts (e.g., an inorganic salt such as sodium chloride), proteins (e.g., flavor or color enhancing proteins). In some embodiments, one or more impermeable solutes can include one or more sugar alcohols or dissolved derivatives thereof, such as sorbitol, mannitol, maltitol, glycerol, erythritol, etc., or hydrogenated starch hydrolysates. The feed solution may have a first concentration of the one or more permeable solutes (and/or impermeable solutes) effective to create a first osmotic pressure therein.

While in some embodiments, alcohol is described as a component of the feed solution separately, it should be understood that alcohol is a permeable solute of an alcohol containing solution (e.g., beverage) having less than 50% ABW, and for the purposes herein may be a permeable solute for solutions having greater than 50% ABW (e.g., include less than 50 wt % water). In some embodiments, prior to processing in the FO element(s), the feed solution can include an alcohol (e.g., ethanol) content of at least about 1% ABW, such as about 1% ABW to about 50% ABW, about 1% ABW to about 10% ABW, about 1% ABW to about 5% ABW, about 3% ABW to about 10% ABW, about 5% ABW to about 15% ABW, about 10% ABW to about 20 ABW, about 15% ABW to about 30% ABW, about 25% ABW to about 40% ABW, or less than about 50% ABW. In some embodiments, prior to processing in the FO element(s), the feed solution can include a permeable (and/or impermeable) solute(s) content or concentration (other than alcohol) of about 1 wt % (e.g., solute by weight) or more, such as about 1 wt % to about 50 wt %, about 5 wt % to about 40 wt %, about 10 wt % to about 35 wt %, about 15 wt % to about 30 wt %, about 5 wt % to about 20 wt %, less than about 30 wt %, less than about 40 wt %, about 1 wt % to about 20 wt %, about 20 wt % to about 40 wt %, or less than about 50 wt %. Individual solutes of multiple solute solutions (e.g., one or more permeable solutes and/or one or more impermeable solute containing solutions) can individually or collectively comprise any portion of the above noted wt % ranges.

Introducing a feed solution having one or more permeable solutes into a first side of a forward osmosis system can include introducing an alcohol containing solution into any of the FO systems or components thereof disclosed herein. For example, introducing a feed solution having one or more permeable solutes into a first side of a forward osmosis system can include using at least one FO element including at least one FO membrane having a polyamide support to separate the first side from the second side. Introducing a feed solution having one or more permeable solutes into a first side of a forward osmosis system can include using one or more of a pump, conduit, or valve. Introducing a feed solution having one or more permeable solutes into a first side of a forward osmosis system can include introducing the alcohol solution at a specific rate, such as about 1 gpm or more, or 1 gpm to about 30 gpm, about 3 gpm to about 20 gpm, about 5 gpm to about 15 gpm, or less than about 50 gpm. Introducing a feed solution having one or more permeable solutes into a first side of a forward osmosis system can include introducing the alcohol solution therein at a specific pressure, such as about 1 psi or higher, about 1 psi to about 100 psi, about 5 psi to about 50 psi, about 10 psi to about 20 psi, about 5 psi to about 10 psi, about 1 psi to about 50 psi, about 1 psi to about 5 psi, about 1 psi to about 10 psi, about 1 psi to about 15 psi, about 10 psi to about 20 psi, about 15 psi to about 50 psi, less than about 50 psi, or less than about 10 psi. The pressure can be supplied or regulated by one or more pumps.

Introducing a feed solution having one or more permeable solutes into a first side of a forward osmosis system can include circulating the feed solution through an FO element one time, more than one time, or through more than one FO element (e.g., a plurality of FO elements in parallel and/or series).

The act 1020 of circulating a draw solution having one or more permeable solutes therein through a second side of the forward osmosis system, the draw solution having a permeable solute concentration greater than or equal to at least one species of the one or more permeable solutes than the feed solution can include circulating a draw solution configured to allow/cause selective removal of one or more components of the feed solution. For example, the draw solution can include at least one permeable solute therein (e.g., methanol, ethanol, isopropanol, ethylene glycol, lithium, lactic acid, acetic acid, citric acid, boron and boron oxides, hydroxide salts, ammonia, etc.) in an amount such that the concentration differential between the first side and second side of the FO membrane on the permeable solute in the feed solution at least partially prevents the at least one permeable solute from crossing the FO membrane. If the concentration of the permeable solute in the feed solution is the same as the concentration of the same solute (and/or combination of solutes including one or more permeable solutes and/or one or more impermeable solutes) in the draw solution, and there is no water transfer from the feed stream to the draw stream (e.g., water flux less than about 0.1 LMH), the permeation of the permeable solute will be reduced. If the concentration of the permeable solute (and/or combination of solutes including one or more permeable solutes and/or one or more impermeable solutes) in the draw stream is less than the concentration in the feed stream, the permeable solute will transfer from the feed stream to the draw stream. If the concentration of the permeable solute in the feed solution is less than the concentration in the draw solution, the permeable solute will transfer from the draw stream to the feed stream. In some embodiments, a draw solution having a higher permeable solute content (and/or impermeable solute content, or combination thereof) of at least one species of the one or more permeable solutes (and/or impermeable solutes, or combination thereof) than the feed solution can be circulated through the second side. The concentration of permeable solute(s) (and/or combination of solutes including one or more permeable solutes and/or one or more impermeable solutes) in the draw stream can be used to control the permeation rate and therefore the concentration of the permeable solute in the feed stream concentrate. In some examples, water transfer from the feed stream to the draw stream (about 1 LMH or greater) will reduce the permeable solute concentration at the membrane surface, so an excess of permeable solute (and/or impermeable solutes) may be used (at least about 5% ABW more permeable solute in the draw stream for example). In some examples, the permeable solute(s) may hydrogen bond with water and the permeation may be related to water transfer, so an additional excess of permeable solute(s) (and/or impermeable solutes) may be used (at least about 10% for example). The amount of excess permeable solute(s) in the draw stream/solution may be experimentally determined by dewatering a feed stream/solution and measuring the concentration of the permeable solute in the feed stream concentrate as a function of concentration in the draw stream. The rate of transfer of the permeable solute may be dependent on one or more of the chemical species of the permeable solute(s), temperature, water flux, membrane materials and properties, turbulence and mixing at the membrane surface, pressure, flow rates, and the concentration of other species (counter ions and co-solvents). For example, increasing the draw stream flow rate with respect to the permeate stream flow rate while maintaining the draw stream permeable solute concentration will decrease the dilution of the draw stream and increase the net transfer of permeable solute from the feed stream to the draw stream.

In some embodiments, the draw solution can include at least the same concentration of or an excess of one or more permeable solutes (e.g., ethanol) in the feed solution. For example, the draw solution (either prior to or after cycling through the FO element) can include an alcohol content at least equal to the alcohol content of the feed solution, such as at least 1% ABW more than the feed solution, at least about 5% ABW more, at least about 10% ABW more, at least about 15% ABW more, about 1% ABW more to about 45% ABW more, about 5% ABW more to about 35% ABW more, about 10% ABW more to about 20% ABW more, about 1% ABW more to about 20% ABW more, about 5% ABW more to about 25% ABW more, or less than about 40% ABW more than the feed solution. It is to be understood, that % ABW is commensurate with wt % and can be used interchangeably. In some embodiments, circulating the draw solution can include using a draw solution having a permeable solute(s) content therein configured to maintain the permeable solute(s) content in the feed solution (stream).

In some embodiments, circulating the draw solution can include using a draw solution having a content of one or more permeable solutes (e.g., species and amount) and/or impermeable solutes other than alcohol configured to maintain the content (e.g., species and amount) of the one or more permeable solutes in the feed solution. For example, the draw solution can include about 10 wt % more ethylene glycol than the feed solution, and during FO the ethylene glycol in the feed solution is retained therein due at least in part to the osmotic pressure (from the chemical potential) induced by the excess of ethylene glycol in the draw stream. In some embodiments, the draw stream has a lower amount of the one or more permeable solutes and/or impermeable solutes to induce the one or more permeable solutes in the feed solution to cross the FO membrane into the draw solution.

In some embodiments, in addition to alcohol, at least one more permeable or impermeable solute may be added to or present in the draw solution (e.g., draw stream) to generate additional osmotic pressure and driving force to dewater the feed solution (e.g., feed stream) to a desired concentration. The impermeable solute(s) may be implemented using at least one compound that may be a food safe additive that is soluble in water, capable of generating adequate osmotic pressure with a selected flux (e.g., at least about 1 liters/m$^2$/h (LMH)), well-rejected (non-permeable or substantially impermeable) by FO, RO or NF membranes to reduce draw loss into the feed and NF or RO permeate, or combinations thereof. The at least one more impermeable solute may include one or more inorganic salts, for example sodium chloride, magnesium chloride, or magnesium sulfate. The at least one more impermeable solute may include one or more sugar alcohols, for example sorbitol, mannitol, maltitol, glycerol, erythritol, etc. In some embodiments, the at least one more impermeable solute may include one or more hydrogenated starch hydrolysates. In some embodiments, the at least one more impermeable solute may include one or more proteins. In some embodiments, the at least one more impermeable solute may include one or more VOCs. Identical ranges of excess amounts of impermeable solutes as those disclosed herein for alcohol contents in the draw solution can be used for dissolved sugars, salts, or any other solutes in the draw solution in any combination and/or ranges thereof.

Circulating a draw solution having one or more permeable solutes therein through a second side of the forward osmosis system, the draw solution having a permeable solute concentration greater than or equal to at least one species of the one or more permeable solutes in the feed solution can include circulating the draw solution through any of the FO systems or components thereof disclosed herein. Circulating a draw solution having one or more permeable solutes therein through a second side of the forward osmosis system, the draw solution having a permeable solute concentration greater than or equal to at least one species of the one or more permeable solutes in the feed solution can include circulating the draw solution in either a countercurrent configuration or a co-current configuration to the feed solution. Circulating a draw solution having one or more permeable solutes therein through a second side of the forward osmosis system, the draw solution having a permeable solute concentration greater than or equal to at least one species of the one or more permeable solutes than the feed solution can include circulating the draw solution into the FO element using one or more of a pump, a conduit, a valve, etc. Circulating a draw solution having one or more permeable solutes therein through a second side of the forward osmosis system, the draw solution having a permeable solute concentration greater than or equal to at least one species of the one or more permeable solutes than the feed solution can include circulating the draw solution at a specific pressure, such as at least about 1 psi, about 1 psi to about 100 psi, about 10 psi to about 50 psi, about 15 psi to about 100 psi, about 10 psi to about 25 psi, about 25 psi to about 50 psi, about 75 psi to about 100 psi, less than about 100 psi, about 1 psi to about 10 psi, about 1 psi to about 15 psi, about 10 psi to about 20 psi, about 15 psi to about 50 psi, less than about 50 psi, or less than about 10 psi. Circulating a draw solution having one or more permeable solutes therein through a second side of the forward osmosis system, the draw solution having a permeable solute concentration greater than or equal to at least one species of the one or more permeable solutes in the feed solution can include circulating a regenerated, reconstituted, or recirculated draw solution through the FO system.

The act 1030 of generating a diluted draw solution in the second side of the forward osmosis system, the diluted draw solution having a higher water concentration than the draw solution can include using an FO membrane in the FO element capable of allowing at least some water to cross from the first side to the second side of the FO element via the membrane. Generating a diluted draw solution in the second side of the forward osmosis system can include outputting the diluted draw solution to one or more downstream draw components, such as any of those disclosed herein (e.g., regeneration apparatus(es), pumps, tanks, conduits, valves, etc.). In some embodiments, generating a diluted draw solution includes removing at least some water from the alcohol solution while leaving at least some or all of the alcohol therein, via the FO membrane.

The act 1040 of producing a product stream including a concentrated feed solution from the first side of the forward osmosis system, the concentrated feed solution having a concentration of the at least one species of the one or more permeable solutes greater than or equal to a concentration of the at least one species in the feed solution can include producing a product stream (e.g., concentrated feed stream) having a higher concentration of one or more permeable solutes (e.g., alcohol) and/or lower concentration of water therein than the feed stream. For example, producing a product stream including a concentrated feed solution from the first side of the forward osmosis system, the concentrated feed solution having a concentration of the at least one species of the one or more permeable solutes greater than or equal to a concentration of the at least one species in the feed solution can include producing a product stream having at least about 5% ABW more alcohol therein than the feed stream, such as about 5% ABW to about 50% ABW more, about 10% ABW to about 40% ABW more, about 15% ABW to about 35% ABW more, or about 20% ABW to about 300% ABW more alcohol therein than the feed stream. Producing a product stream including a concentrated feed solution from the first side of the forward osmosis system, the concentrated feed solution having a concentration of the at least one species of the one or more permeable solutes greater than or equal to a concentration of the at least one species in the feed solution can include outputting the concentrated feed solution (stream) to one or more downstream product components, such as one or more conduits, pumps, valves, refrigerators, distribution apparatuses, storage mediums (e.g., storage tanks), point of sale packaging (e.g., packaged concentrated alcoholic beverages), or a delivery means, such as a truck, pipeline, tank, etc. In some embodiments, producing a product stream can include retaining at least some of the one or more permeable solutes (e.g., alcohol) and/or one or more impermeable solutes (e.g., sugars, etc.) in the feed stream.

In some embodiments, the method 1000 can further include maintaining the permeable solute (e.g., alcohol, ethylene glycol, etc.) content and/or impermeable solute content of the draw solution. For example, the method 1000 can further include regenerating the draw solution from the diluted draw solution. Regenerating the draw solution from the diluted draw solution can include reconstituting (e.g., regenerating the draw solution) via one or more of at least one distillation apparatus or at least one RO element (e.g., low rejection RO and/or standard RO), or at least one addition of permeable solute(s) (e.g., alcohol) and/or impermeable solutes (e.g., glycerol or fructose) from at least a second source into the diluted draw solution. In some embodiments, the method 1000 can further include producing a permeate stream or distillate from the diluted draw solution. In some embodiments, producing the permeate stream or distillate from the diluted draw solution can include producing the permeate stream via reverse osmosis or distillation. In some embodiments, the permeate stream or distillate includes substantially pure water.

In some embodiments, the feed stream permeable solute(s) content can be slightly higher than a target feed stream concentrate permeable solute(s) content (e.g., target % ABW), accounting for concentration, to avoid distillation or the addition of permeable solute(s) (e.g., ethanol) to the draw solution or diluted draw stream. In some examples, the permeable solute(s) (e.g., ethanol) lost in the permeate (not retained in the feed stream concentrate) may be distilled and used as fuel.

In some embodiments, the feed solution may be introduced to the FO element (e.g., concentrated) at low temperatures (e.g., −5° C. to 15° C.) which may improve retention of VOCs and small molecules to preserve the nutrients and flavors of the feed stream concentrate. In some embodiments, the feed solution may be concentrated at ambient (e.g., 15° C. to 35° C.) or higher temperature (e.g., 35° C. to 80° C.) to improve rejection and reduce costs of cooling the feed solution or concentrate thereof. In some embodiments, a temperature gradient across the FO membrane (e.g., a colder first side, or hotter first side) may increase the efficiency of the FO membrane or reduce costs of cooling or heating the feed solution or concentrate thereof. In some embodiments, the feed solution may be concentrated at a temperature and draw composition where the ratio of water permeation to ethanol permeation is highest.

The methods disclosed herein can be employed to provide concentrated alcoholic beverages suitable for reconstitution (e.g., rehydration) by addition of water at a selected time. In an example, an alcoholic solution having about 5% ABW is introduced into an FO element as an initial feed solution (e.g., feed stream). The desired final concentration of the dewatered alcoholic solution in this example is 30% ABW (e.g., 6X concentration). The primary outputs of some systems and/or methods disclosed herein could include the concentrated feed stream having about 30% ABW, and permeate stream including nearly pure water stream (approximately <1% ABW). The concentrated feed stream (concentrated feed solution) may then be sold as a 30% ABW concentrate for dilution by the consumer (or retail outlet, etc.) to produce a 5% ABW product upon reconstitution. In some examples, the system may be operated to produce a concentrated product (e.g., feed stream) of 15% ABW to produce a 2.5% ABW product after dilution by a consumer. In some examples, the system may be operated to produce a reject stream of 2.5% ABW to produce a 0.4% ABW product after dilution. In some examples, the system may be operated to produce a concentrated feed stream of any % ABW product. In some embodiments, the methods herein can be used to concentrate an alcoholic solution by 2X or more over the initial concentration of alcohol therein, such as about 2× to about 10×, about 3× to about 8×, about 4× to about 6×, about 2× to about 5×, more than about 5×, or less than about 10×.

In some embodiments, the method 1000 can include reconstituting the concentrated feed solution, such as by adding an amount of water corresponding to the level of concentration of the concentrated feed solution. For example, a concentrated feed solution having a 5× concentration of alcohol and other solutes therein can be diluted by combining about 5× the weight of the concentrated feed solution in water, with the concentrated feed solution.

Figure 11:
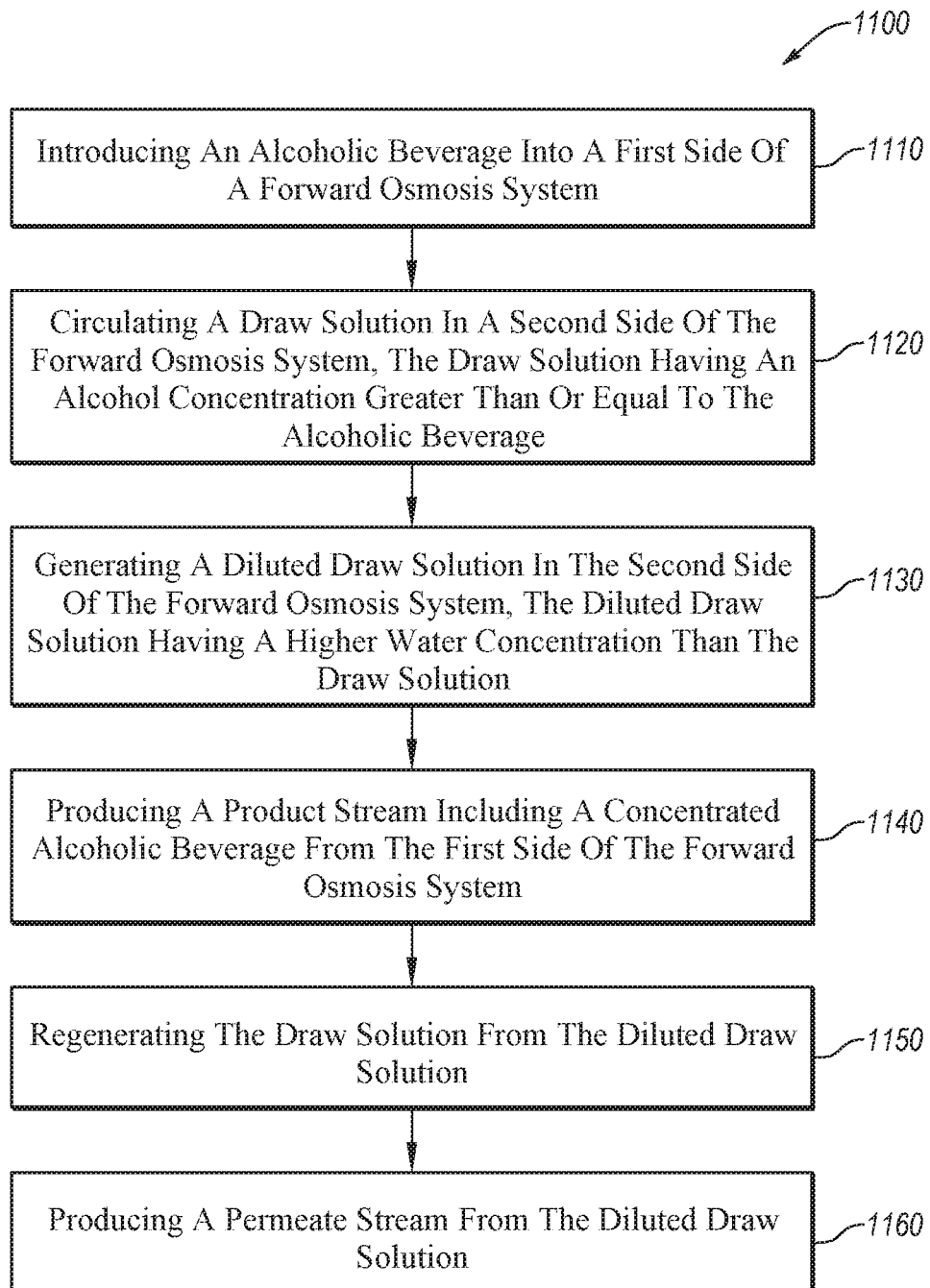
FIG. 11 is a flow diagram of a method for dewatering an alcoholic solution via forward osmosis, according to examples described herein.

FIG. 11 is a flow diagram of a method 1100 for dewatering an alcoholic solution using forward osmosis. The method 1100 includes an act 1110 of introducing an alcoholic beverage into a first side of a forward osmosis system; an act 1120 of circulating a draw solution in a second side of the forward osmosis system, the draw solution having an alcohol concentration greater than or equal to the alcoholic beverage; an act 1130 of generating a diluted draw solution in the second side of the forward osmosis system, the diluted draw solution having a higher water concentration than the draw solution; an act 1140 of producing a product stream including a concentrated alcoholic beverage from the first side of the forward osmosis system; an act 1050 of regenerating the draw solution from the diluted draw solution; and an act 1050 of producing a permeate stream from the diluted draw solution.

The act 1110 of introducing an alcoholic beverage into a first side of a forward osmosis system can include introducing one or more of beer, wine, distilled spirits (liquor), malt beverage, any other alcoholic solution, or combinations thereof into the first side of an FO system. The act 1110 of introducing an alcoholic beverage into a first side of an FO system can be similar or identical to the act 1010 described above in one or more aspects. For example, the act 1110 can include introducing an alcoholic beverage into any of the FO systems disclosed herein. In some embodiments, introducing an alcoholic beverage into a first side of a forward osmosis system may include using a forward osmosis membrane having a polyamide support to separate the first side from the second side.

The act 1120 circulating a draw solution in a second side of the forward osmosis system, the draw solution having an alcohol content greater than or equal to the alcoholic beverage can include circulating a draw solution configured to allow/cause selective removal of one or more components of the feed solution. The act 1120 circulating a draw solution in a second side of the forward osmosis system, the draw solution having an alcohol content greater than or equal to the alcoholic beverage can be similar or identical to the act 1020 described above in one or more aspects. For example, circulating a draw solution in a second side of the forward osmosis system, the draw solution having an alcohol content greater than or equal to the alcoholic beverage can include circulating a draw solution having an excess of one or more solutes in the feed solution including an alcohol content that is at least 1% ABW more than the feed solution, at least about 5% ABW more, at least about 10% ABW more, at least about 15% ABW more, about 1% ABW more to about 45% ABW more, about 5% ABW more to about 35% ABW more, about 10% ABW more to about 20% ABW more, about 1% ABW more to about 20% ABW more, about 5% ABW more to about 25% ABW more, or less than about 40% ABW more than the feed solution.

The act 1130 of generating a diluted draw solution in the second side of the forward osmosis system, the diluted draw solution having a higher water concentration than the draw solution can including using an FO membrane in the FO element capable of allowing at least some water to cross from the first side to the second side of the FO element via the membrane. Generating a diluted draw solution in the second side of the forward osmosis system can include outputting the diluted draw solution to one or more downstream draw components, such as any of those disclosed herein (e.g., regeneration apparatus(es), pumps, tanks, conduits, valves, etc.). In some embodiments, generating a diluted draw solution includes removing at least some water from the alcoholic beverage while leaving at least some of the alcohol therein, via the FO membrane.

The act 1140 of producing a product stream including a concentrated alcoholic beverage from the first side of the forward osmosis system can include producing a product stream (e.g., concentrated feed stream) having a higher concentration of alcohol and/or lower concentration of water therein than the feed stream 112. For example, producing a product stream including a concentrated alcoholic beverage can include producing a product stream having at least about 5% ABW more alcohol therein than the feed stream, such as about 5% ABW to about 50% ABW more, about 10% ABW to about 40% ABW more, about 15% ABW to about 35% ABW more, or about 20% ABW to about 30% ABW more alcohol therein than the feed stream. Producing a product stream including a concentrated alcoholic beverage can include outputting the concentrated alcohol stream to one or more downstream product components, such as one or more conduits, pumps, valves, refrigerators, distribution apparatuses, storage mediums (e.g., storage tanks), point of sale packaging (e.g., packaged concentrated alcoholic beverages), or a delivery means, such as a truck, pipeline, tank, etc. The acts 1130 and 1140 can be carried out contemporaneously or simultaneously.

The act 1150 of regenerating the draw solution from the diluted draw solution can include directing the diluted draw solution through one or more regeneration apparatus, such as any of those disclosed herein. For example, regenerating the draw solution from the diluted draw solution can include directing the diluted draw solution through at least one RO element and/or at least one distillation apparatus. Regenerating the draw solution from the diluted draw solution can include reconstituting (e.g., regenerating) the draw solution via one or more of at least one distillation apparatus or at least one RO element (e.g., low rejection RO and/or standard RO), or at least one addition of alcohol from at least a second source into the diluted draw solution. In some embodiments, regenerating the draw solution includes distilling the diluted draw solution. In some embodiments, regenerating the draw solution includes performing reverse osmosis and distillation on the diluted draw solution. In some embodiments, regenerating the draw solution includes performing one or more of low-rejection reverse osmosis, reverse osmosis, or distillation on the diluted draw stream or a derivative thereof. In some embodiments, regenerating the draw solution includes cycling the diluted draw solution through a first reverse osmosis process followed by a second reverse osmosis process.

The act 1160 of producing a permeate stream from the diluted draw solution can include producing the permeate stream via reverse osmosis or distillation. In some embodiments, the permeate stream or distillate includes substantially pure water (e.g., <1% ABW). In some embodiments, producing a permeate stream from the diluted draw solution includes producing a substantially pure water permeate stream The method 1100 can further include recirculating the regenerated draw solution through the second side of the FO system. The method 1100 can include any acts and/or aspects thereof disclosed herein, such as with respect to method 1000.

In an embodiment, a method of dewatering a solution can include an act of introducing a feed solution having one or more permeable solutes into a first side of a forward osmosis system. The method of dewatering a solution can include an act circulating a draw solution having one or more permeable solutes and one or more impermeable solutes therein through a second side of the forward osmosis system. The method of dewatering a solution can include an act generating a diluted draw solution in the second side of the forward osmosis system, the diluted draw solution having a higher water concentration than the draw solution. The method of dewatering a solution can include an act of producing a product stream including a concentrated feed solution from the first side of the forward osmosis system, the concentrated feed solution having a desired concentration of the at least one species of the one or more permeable solutes; wherein a combined osmotic pressure of the one or more permeable solutes and the one or more impermeable solutes in the draw solution is greater than an osmotic pressure of the concentrated feed solution.

The one or more permeable solutes can includes any permeable solutes disclosed herein, such as ethanol, and the one or more impermeable solutes can include any of the impermeable solutes disclosed herein, such as glycerol. The feed solution may include any feed solution disclosed herein, such as beer, non-alcoholic beer, wine, malt beverage, distilled spirits, or combinations thereof. The at least one permeable solute in the feed stream can include any permeable solute(s) disclosed herein, such as an alcohol.

In some embodiments, the draw solution may have a combined concentration of the one or more permeable solutes and one or more impermeable solutes equal to or greater than a concentration of one or more permeable solutes in the feed solution, such as at least about 1 wt % greater, at least about 5 wt %, greater, or at least 10 wt % greater than a concentration of one or more permeable solutes in the feed solution. In some embodiments, the draw solution may have a combined concentration of the one or more permeable solutes and one or more impermeable solutes equal to or greater than a concentration of one or more permeable solutes in the concentrated feed solution, such as at least about 1 wt % greater, at least about 5 wt % greater, or at least 10 wt % greater than a concentration of one or more permeable solutes in the concentrated feed solution. The combined concentration of the one or more permeable solutes and the one or more impermeable solutes in the draw solution can induce a combined osmotic pressure that is greater than an osmotic pressure of the concentrated feed solution or feed solution.

In some embodiments, the method may further include regenerating the draw solution from the diluted draw solution, such as by any technique or combination of techniques disclosed herein. For example, regenerating the draw solution from the diluted draw solution may include separating at least some of the one or more permeable solutes (e.g., ethanol) in the diluted draw stream from at least some of the impermeable solutes (e.g., glycerol) in the diluted draw stream. In some embodiments, regenerating the draw solution from the diluted draw solution may further include concentrating the at least some of the one or more permeable solutes (e.g., ethanol) or at least some of the impermeable solutes (e.g., glycerol), such as by RO operations and/or distillation(s).

In some embodiments, a plurality of permeable solutes and/or water can be removed from the feed stream, such as to form a feed concentrate having a lower concentration of one or more of the plurality of permeable solutes and/or water than one or more of the draw stream, feed stream, and the diluted draw stream. For example, systems and methods disclosed herein can be used to remove water and alcohol from a feed stream to produce a reduced alcohol and/or non-alcoholic (e.g., less than about 0.5 wt % alcohol) feed concentrate. A reduced alcohol solution or beverage can include a non-alcoholic solution or beverage (e.g., having an alcohol concentration that is less than 0.5 wt %, less than 0.1 wt %). A reduced alcohol solution or beverage can include a non-alcoholic solution or beverage that is substantially free of alcohol, except a trace or residual amount.

Figure 12:
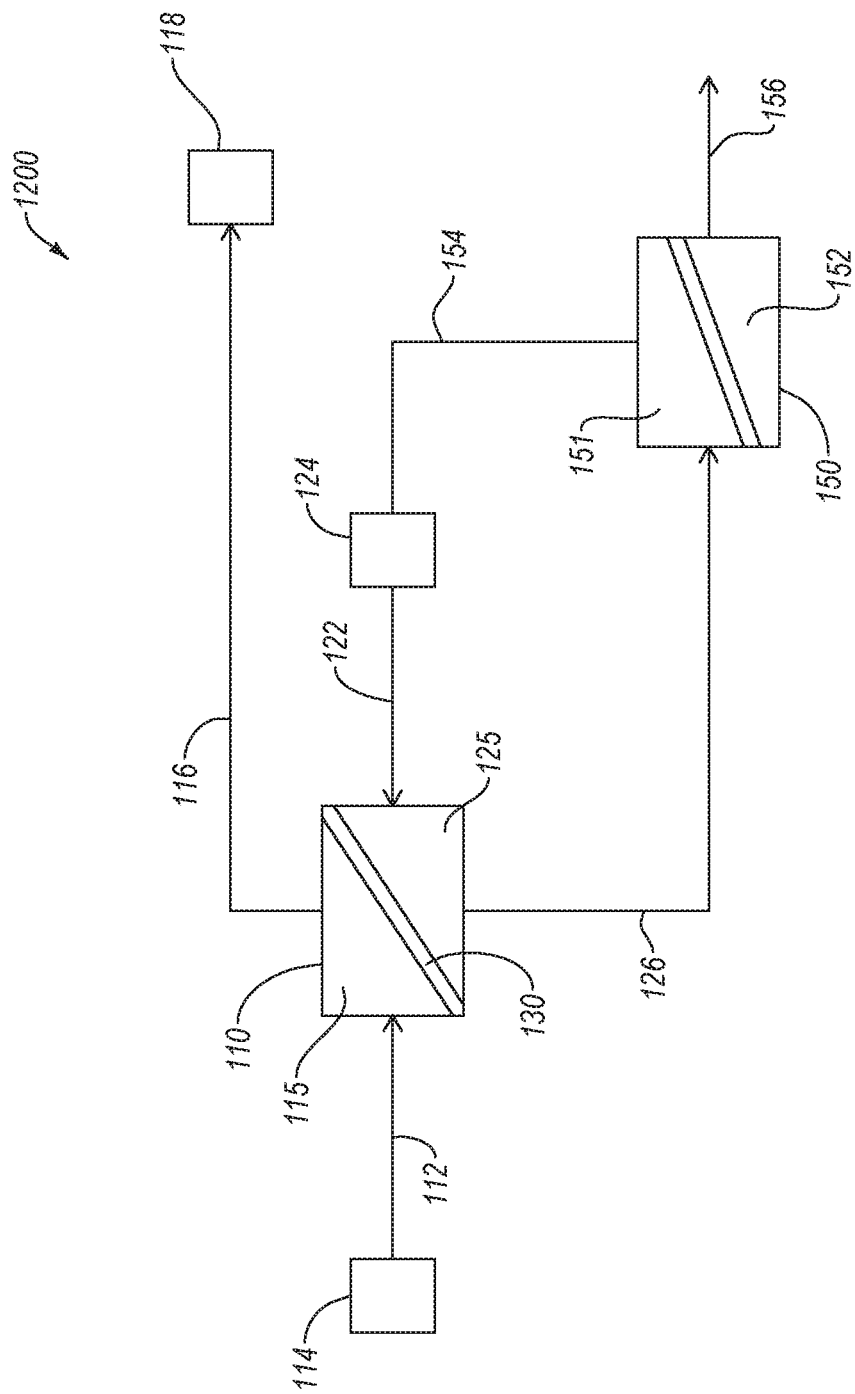
FIG. 12 is a block diagram of a forward osmosis system for concentrating a feed solution, according to examples described herein.

FIG. 12 is a block diagram of an FO system 1200 for concentrating a feed solution. The FO system 1200 includes at least one FO element 110 and at least one draw stream regeneration apparatus fluidly coupled to a draw stream source 124. The draw stream regeneration apparatus can include at least one RO element 150 as shown, or can include at least one distillation apparatus, or can include at least one low rejection RO element and at least one RO element. During use, a feed stream 112 is fed into (e.g., circulated through) a first side 115 of the FO element 110 from a feed stream source 114. Simultaneously, a draw stream 122 is fed into (e.g., circulated through) a second side 125 of the FO element 110, The FO system 1200 may be set up in co-current or countercurrent configuration. The FO element 110 can include an FO membrane 130 composed to allow one or more permeable solutes and/or water from the feed stream 112 to pass therethrough into the draw stream 122, responsive to hydrostatic and/or osmotic pressure differential(s) on the FO membrane 130. In embodiments, the systems and methods herein can include producing a product stream including a concentrated beverage having a higher alcohol content and reduced water content from the first side of the forward osmosis system.

The draw solution in the draw stream 122 can include two or more solutes (e.g., permeable and/or impermeable solute(s)), such as ethanol and glycerol. The feed stream 112 can have a higher permeable solute(s) concentration (e.g., total solutes or specific species thereof, such as permeable solutes) than the draw stream 122, while having a lower total solutes concentration (e.g., permeable and impermeable solutes) than the draw stream 122. For example, the feed stream 112 can have a higher permeable solute concentration (e.g., alcohol) than the draw stream 122, while the draw stream has a higher total solutes concentration (e.g., glycerol and alcohol). The draw stream 122 can have a higher impermeable solutes concentration than the feed stream 112. As the feed stream 112 passes through the FO element 110, at least one permeable solute (e.g., ethanol) and water are removed via the FO membrane 130, and passed into the draw stream 122. The removal of water from the feed stream 112 forms the concentrated feed stream 116, which may have a higher concentration of one or more species of solutes (e.g., impermeable solutes, such as glucose, etc.) than the feed stream 112. Such higher concentrations may be due at least in part to the removal of water from the feed stream 112. The removal of the at least one permeable solute from the feed stream 112 may cause the concentrated feed stream 116 to exhibit a lower concentration of the at least one permeable solute than the feed stream 112. The removal of water and the at least one permeable solute from the feed stream 112 into the draw stream 122 via the FO membrane 130 may cause the diluted draw stream 126 to exhibit a higher water content and a higher concentration of the at least one permeable solute than the draw stream 122 and the concentrated feed stream 116. The removal of water and the at least one permeable solute (e.g., ethanol) from the feed stream 112 into the draw stream 122 via the FO membrane 130 may cause the diluted draw stream 126 to exhibit a lower impermeable solute (e.g., glycerol) concentration than the draw stream 122.

The at least one permeable solute (e.g., ethanol) concentration of the draw stream 122 should remain less than the at least one permeable solute (e.g., ethanol) concentration of the feed stream 112 throughout the entirety of the FO element 110 and processes disclosed herein. For example, in a countercurrent operation, the draw stream 122 contacting the incoming feed stream 112 in the FO element 110 (e.g., draw stream that is at a tail end of the draw side of FO element/process) can have a higher concentration of the at least one permeable solute than the draw stream 122 entering the second side 125 (e.g., due to already absorbing some of the impermeable solute through the FO membrane 130), but still have a lower concentration of the at least one permeable solute than the feed stream 112 entering the FO element 150 (adjacent thereto) at the tail end of the draw side or beginning of the feed side. Such a countercurrent configuration ensures that the at least one permeable solute is continually removed from the feed stream 112 (feeds solution) throughout the FO element 110 at a selected rate.

The concentrated feed stream 116 can be directed to one or more downstream product components 118 (e.g., packaging or distribution apparatuses, reconstitution apparatuses, recirculation apparatuses, etc.). The concentrated feed stream 116 may include a concentrated beer or other alcoholic beverage that has had at least some of the alcohol removed therefrom, such as to make a non-alcoholic (e.g., less than 0.5 wt % alcohol) beverage concentrate. In embodiments, the concentrated feed stream 116 (e.g., non-alcoholic beverage concentrate) can be at least partially reconstituted (e.g., rehydrated) to form a non-alcoholic beverage, such as at a point of sale. The non-alcoholic beverage may have an alcohol content of less than about 0.5 wt % alcohol, or less than 0.1 wt % alcohol after reconstitution.

In embodiments, the diluted draw stream 126 can include a higher concentration of the at least one permeable solute (e.g., ethanol) and water content than the draw stream 122. The draw stream 122 can be at least partially regenerated by at least one draw stream regeneration apparatus. The draw stream regeneration apparatus can include at least one distillation apparatus. The diluted draw stream 126 can enter the distillation apparatus and produce a retained stream (e.g., water) and an alcoholic stream (e.g., an alcohol-containing distillate). As shown, the draw stream regeneration apparatus can include the at least one RO element 150. The RO element 150 can include a housing containing an RO membrane 136 separating a first side 151 from a second side 152. The diluted draw stream 126 can be circulated through the RO element 150 through the first side 151 thereof. The diluted draw stream 126 can be pressurized to a selected pressure (e.g., via one or more pumps (not shown)) to cause at least some of the water and/or solutes to pass therethrough. At least some of the water and/or permeable solutes can pass through the RO membrane 136 and into an RO permeate 156 (e.g., alcoholic or alcohol containing stream) on the second side 152 of the RO element 150. The diluted draw stream 126 passing through the first side 151 of the RO element 150 is concentrated into an RO concentrate 154, which may include an at least partially regenerated draw stream. For example, the draw regeneration system can be configured to produce and RO concentrate 154 having a composition identical to or near to the draw stream 122. The draw stream source 124 can include a pump configured to pressurize the draw stream 122 (e.g., RO concentrate 154 or a mixture containing at least some of the RO concentrate 154) to a hydrostatic pressure suitable for use in the FO element 110. In embodiments, the draw stream source 124 can include a fluid addition apparatus configured to add one or more components to the RO concentrate 154 effective to reconstitute the RO concentrate 154 to produce the composition of the draw stream 122, such as adding one or more of water, glycerol, or even ethanol. Accordingly, the draw stream 122 can be at least partially regenerated and recirculated back to the FO element 110 for reuse in the FO system 1200.

In embodiments, the RO permeate 156 (e.g., alcoholic stream) can be removed from the FO system 1200, or can be further processed to separate the at least one permeate (e.g., ethanol) from the water therein. The water and ethanol can be used for other, related processes, such as reconstitution of the draw stream 122, or the concentrated feed stream 116.

In a specific example, an alcoholic beverage feed stream 112 with a flow rate of 12 GPM and an alcohol content of 5 wt % is delivered to the first (e.g., feed) side 115 of the FO element 110 or array of FO elements 110 (e.g., a having an FO membrane 130 or array of FO membranes 130). The alcoholic beverage contains both alcohol and water, which are drawn from the feed stream 112 while the remainder of the components are retained, producing concentrated feed stream 116 with a flow rate of 2 GPM and an alcohol content of about 0.5 wt % to about 2.5 wt %, or less (e.g., at least about a 6× concentration factor). This concentrated feed stream 116 may later be rehydrated to the original volume with water, producing a reduced alcohol beverage with an alcohol content of about 0.1 wt % to about 0.5 wt %. This rehydration may occur immediately after removal of water and alcohol, or may happen at another location and/or time (e.g., after storage and/or transport).

The draw stream 122 can have a flow rate of 40 GPM, an alcohol content of 0.25 wt %, and glycerol content of 10 wt %. The draw stream 122 is circulated through the second (e.g., draw) side 125 the FO element 110 or array of FO elements 110 (e.g., a having an FO membrane 130 or array of FO membranes 130) in countercurrent with respect to the feed stream 112 (or co-current in some embodiments). As the ethanol and water are drawn through the FO membrane(s) 130 into the draw stream 122, the draw stream 122 is diluted by both water and alcohol. The alcohol content of the draw stream 122 is less than the alcohol content of the feed stream 112 throughout the entirety of the process (e.g., the alcohol content of a portion of the draw stream 122 adjacent to (e.g., across the membrane from) a portion of the feed stream 112 is less than the alcohol content of the portion of the feed stream 112, throughout all portions of the FO element(s) and related processes). The diluted draw stream 126 is produced with a flow rate of 50 GPM, alcohol content of about 1.38 wt % and glycerol content of about 8 wt %. This diluted draw stream 126 is fed to a draw recovery/regeneration apparatus which produces an at least partially regenerated draw stream as RO concentrate 154 and an alcoholic (waste) stream as RO permeate 156 with a flow rate of 10 GPM, alcohol content of about 5.9 wt % and glycerol content of less than about 0.1 wt %. The draw recovery process is further described with respect to FIGS. 15 and 16).

In embodiments, the systems disclosed herein, such as FO system 1200 can include a feed stream supply and a draw solution supply operably coupled to the system. For example, the system 1200 can include a supply of an alcohol solution fluidly coupled to the first side of the FO element 110 and a supply of a draw solution operably coupled to the second side of the FO element 110. In embodiments, the draw solution can include an at least one permeable solute (e.g., alcohol) concentration less than the permeable solute (e.g., alcohol) concentration of the feed stream (e.g., alcohol solution) and a total solutes (e.g., alcohol plus glycerol) concentration higher than a total solutes (e.g., ethanol and sugars) concentration of the feed stream (e.g., alcohol solution). For example, the draw solution can have a higher glycerol and ethanol concentration that the ethanol and sugars concentration of beer, while the ethanol concentration in the beer feed stream is higher than the ethanol concentration in the draw stream. Such draw and feed sources can provide a system that functions to concentrate (e.g., remove alcohol and/or water from) an alcoholic beverage. The systems disclosed herein can include at least one draw solution regenerating apparatus operably coupled to the second side of the FO element and configured to receive output therefrom. The at least one draw solution regenerating apparatus can be similar or identical to any of those disclosed herein, such as including at least one of a reverse osmosis apparatus, a low-rejection reverse osmosis apparatus, a distillation apparatus, or one or more series of any combinations of the foregoing.

Figure 13:
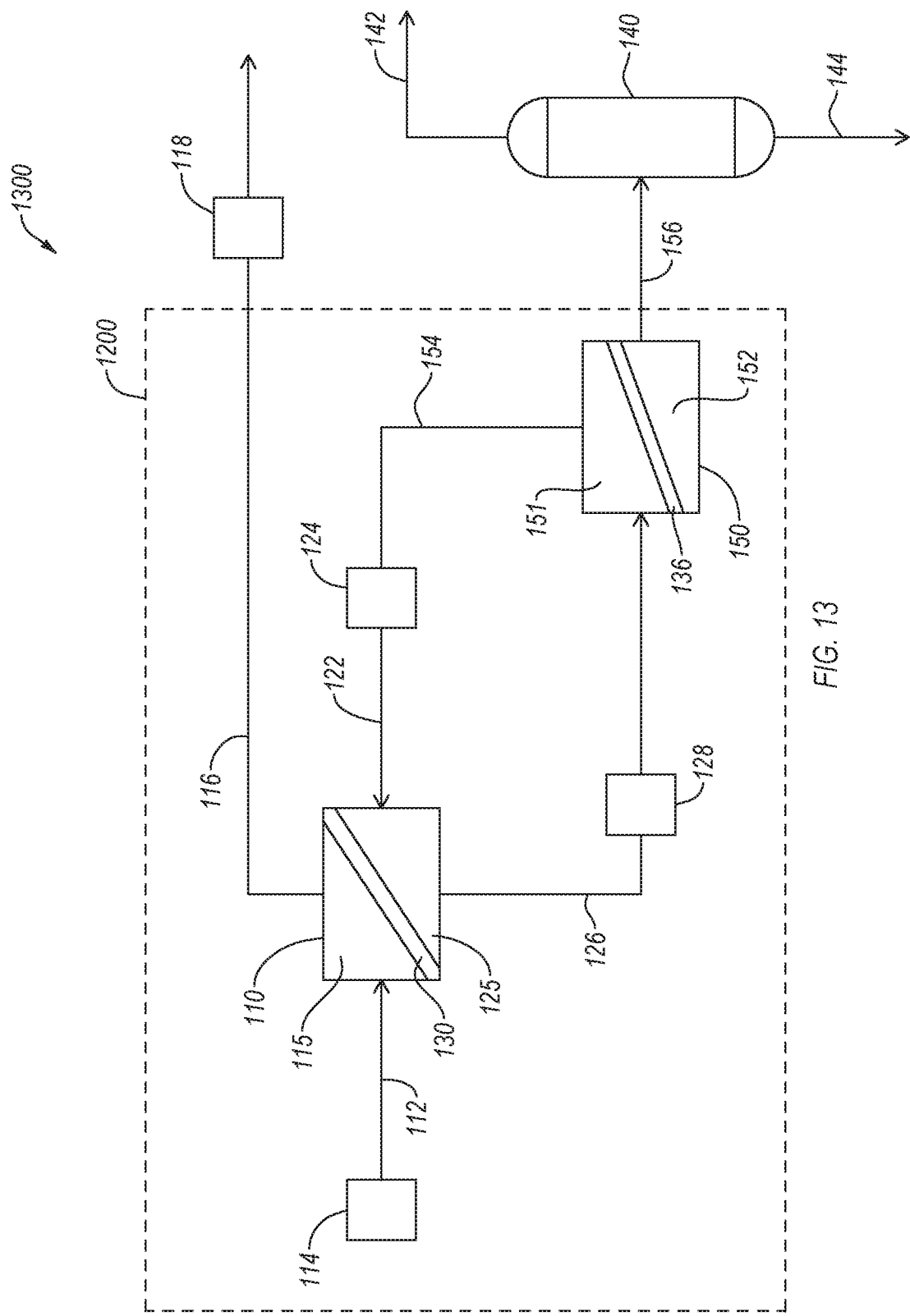
FIG. 13 is a block diagram of a forward osmosis system for concentrating a feed solution, according to examples described herein.

FIG. 13 is a block diagram of an FO system 1300 for concentrating a feed solution. The (countercurrent) FO system 1300 includes the counter current FO system 1200 as described herein, and further includes at least another separation apparatus, such as to further separate components of the RO permeate (e.g., alcoholic stream) from a draw stream regeneration apparatus. The at least another separation apparatus can include at least one distillation apparatus 140 (in addition to the RO element of the system 1200 already present). The at least another separation apparatus (e.g., at least one distillation apparatus 140) can be used to recover/regenerate the draw stream 122 or one or more portions thereof, such as to separate alcohol from water in the RO permeate 156 (e.g., alcoholic stream).

The input of the distillation apparatus 140 can be operably coupled to the output of the second (e.g., water) side 152 of the RO element 150. The distillation apparatus 140 receives the RO permeate 156 and outputs distillate stream 142 (e.g., alcoholic stream) and draw permeate 144 (e.g., still bottoms or retained stream). The distillation apparatus 140 outputs the draw permeate 144 to one or more downstream processes or apparatuses. The draw permeate 144 may include water (e.g., substantially pure water) and the distillate stream 142 may include alcohol.

As the RO permeate 156 leaves the RO element 150, the at least one distillation apparatus 140 can recover, recycle, or regenerate one or more components therein. For example, the at least one distillation apparatus 140 can separate ethanol from water in the RO permeate 156 to produce draw permeate 144 including water, and distillate stream 142 including alcohol. In embodiments, one or both of the draw permeate 144 (e.g., water) or draw distillate stream 142 (e.g., concentrated alcohol) can be used to regenerate the draw stream 122 (e.g., supplement a content of the at least partially regenerated draw solution), or reconstitute at least a portion of the feed stream 112 or concentrated feed stream 116.

The additional separation process at the at least one distillation apparatus 140 may be employed to further separate the waste stream (e.g., RO permeate 156) of the first RO element 150, producing a water stream (draw permeate 144) and an alcoholic stream (distillate stream 142) that may be recycled in various ways, including within the operation of the system. In an embodiment, RO permeate 156 is fed to the at least one distillation apparatus 140 to perform at least another separation process, thereby producing a water stream (draw permeate 144) with a flow rate of about 9.65 gpm, an alcohol content of less than about 0.1 wt % and a glycerol content of less than about 0.1 wt %, and produce a concentrated alcohol stream (distillate stream 142) with a flow rate of about 0.35 gpm, an alcohol content of 85 wt % and glycerol content<0.1 wt %. In some embodiments, the at least another separation apparatus may include or be an array of distillation columns. In some embodiments, the at least another separation apparatus may include or be an RO element or array of RO elements. The additional separation process associated with the use of at least another separation apparatus can be performed on-site or at a different facility than the initial concentration of the feed stream 112.

In embodiments, a raw feed stream entering the system can be augmented to control a concentration of one or more solutes therein, and/or to ensure that a selected amount of the one or more solutes are removed therefrom in the FO element(s) 110.

To allow the process of concentrating a feed stream to more closely suit a particular application (e.g., obtain a lower concentration of ethanol in concentrated feed stream than in other applications), chemical components may be combined with the feed stream to increase the FO resonance time and/or decrease a water to ethanol removal ratio (e.g., allowing more ethanol to be removed than in identical processes with different feed stream compositions). In such a manner, the water to alcohol (e.g., ethanol) removal ratio can be controlled. For example, the ratio of water to alcohol removed from the system can be at least 1:0.1, such as about 1:0.1 to about 1:50, or about 1:0.5 to about 1:20, or about 1:1 to about 1:10. In embodiments, at least a portion of the concentrated feed stream 116 can be recirculated back into the system to augment a solute content of a raw feed stream entering the system.

Figure 14:
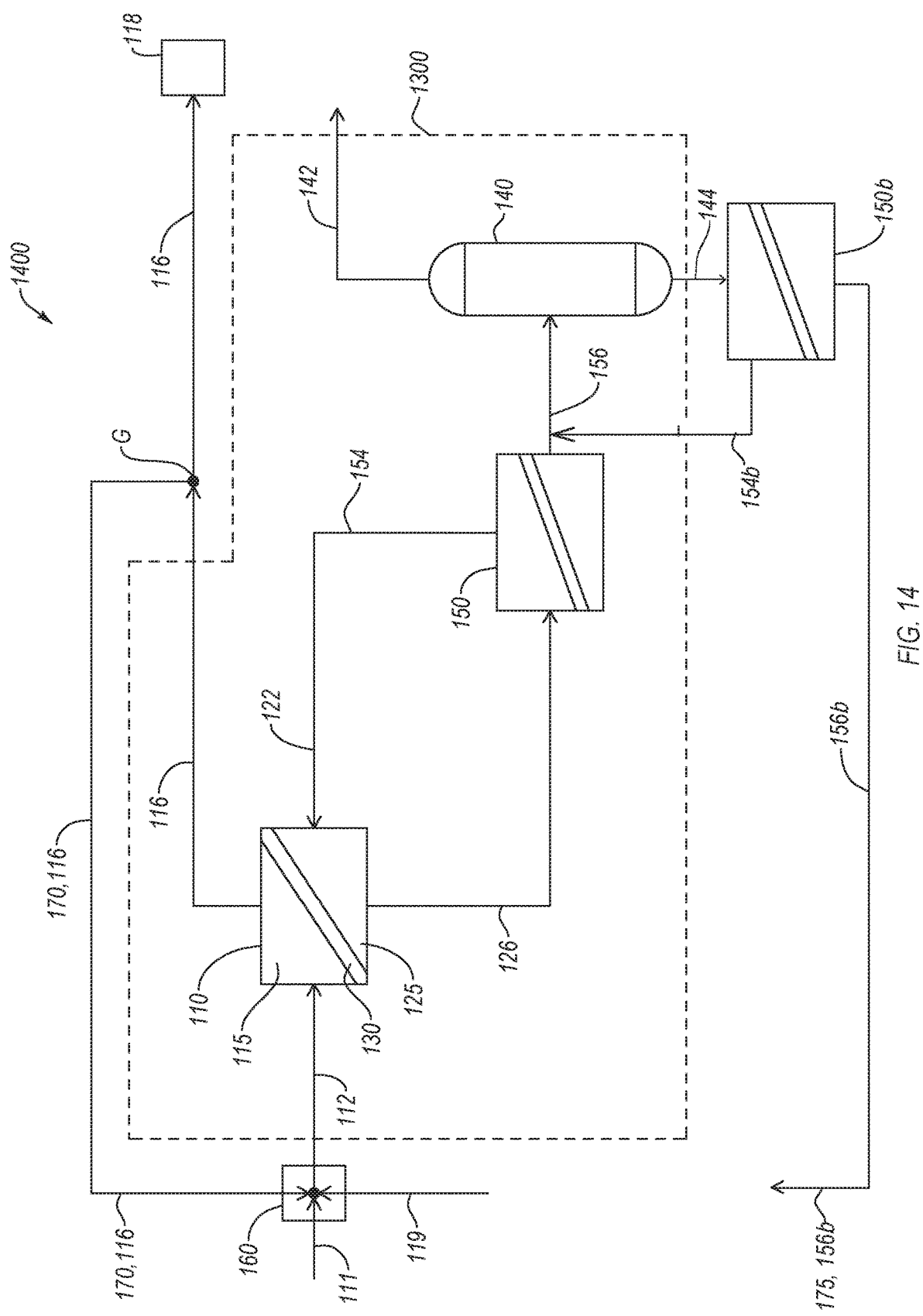
FIG. 14 is a block diagram of a forward osmosis system for concentrating a feed solution, according to examples described herein.

FIG. 14 is a block diagram of an FO system 1400 for concentrating a feed solution. The FO system 1400 includes the counter current FO system 1300 as described herein, and further includes at least one mixing apparatus 160, at least one recirculation line 170, at least a second RO element 150*b*, and at least one additional recirculation line 175. The at least one mixing apparatus 160 may be located upstream from the FO element 110 and provide the feed stream 112 thereto. The at least one recirculation line 170 may be located downstream of an outlet of the first side 115 of the FO element 110 and receive at least a portion of the concentrated feed stream 116 therefrom. The at least one recirculation line 170 may circulate a portion of the concentrated feed stream 116 (e.g., concentrated feed solution) to the at least one mixing apparatus 160. The at least one mixing apparatus 160 may combine a raw feed stream 111 with one or more of the portion of the concentrated feed stream 116 carried by the at least one recirculation line 170, or an additional component 119 supplied from another source (e.g., at least a second RO element 150*b*).

The system 1400 may include at least one draw solution regeneration apparatus. The at least one draw solution regeneration apparatus may include one or more of reverse osmosis modules, low-rejection reverse osmosis modules, or distillation apparatuses. For example and as described in more detail below, the system 1400 may include a first reverse osmosis element operably coupled to the second side of the forward osmosis element to receive a diluted draw stream therefrom and produce a first reverse osmosis permeate and a first osmosis reject; a distillation apparatus operably coupled to the first reverse osmosis element to receive the first reverse osmosis permeate therefrom and produce a distillate and draw permeate; and a second reverse osmosis element operably coupled to the distillation apparatus to receive the draw permeate therefrom and produce a second reverse osmosis permeate and a second reverse osmosis reject. In embodiments, the second draw concentrate may be operably coupled to the first draw permeate, such as via one or more conduits.

The at least a second RO element 150*b* may be located downstream from the at least one distillation apparatus 140 on the draw permeate 144 side thereof. The at least a second RO element 150*b* may remove (e.g., polish) any remaining solutes (e.g., alcohol) from the draw permeate 144 (e.g., bottoms) exiting the distillation apparatus 140. For example, the RO element 150 may remove most of the glycerin from the diluted draw stream 126, the distillation apparatus 140 may remove most of the ethanol from the RO permeate 156, and the at least a second RO element 150*b* may remove any residual solutes (e.g., ethanol, VOCs, and/or glycerin) from the draw permeate 144, to provide substantially pure water. The RO permeate 156*b* (e.g., substantially pure water) may be removed from the system 1400 or directed back to the at least one mixing apparatus 160, such as via the at least one additional recirculation line 175. The RO concentrate 154*b* (e.g., alcohol) may be recirculated back to the draw stream 122, such as by combining the RO concentrate 154*b* with the RO concentrate 154 prior to introducing the draw stream 122 into the FO element 110. In examples, the RO permeate 156*b* may form at least a portion of the at least one additional component 119. The additional component 119 can include water or another component of the feed solution. For example, the at least one additional component 119 can include substantially pure water, such as one or more of tap water or water that is recirculated to the mixing apparatus 160 from the at least a second RO element 150*b* via the at least one additional recirculation line 175. In embodiments, additional components 119 may be added without the addition of a recirculated concentrate (e.g., such as via the recirculation line 170), such as from an outside source, and may increase the FO resonance time, thereby increasing the total amount of alcohol removed from the feed stream.

The at least one mixing apparatus 160 can include one or more valves, a manifold, a container, or other structure(s) configured to allow one or more fluids to mix. For example, the at least one mixing apparatus can include a junction (e.g., confluence of fluid streams) wherein the raw feed stream 111, the at least one recirculation line 170, and the additional component 119 are converged to form the feed stream 112. Any of the raw feed stream 111, the at least one recirculation line 170, and the additional component 119 source can include one or more pumps configured to provide a selected flow rate and/or pressure of the raw feed stream 111 (e.g., beer), the concentrated feed stream 116 (e.g., concentrated beer), and the additional component 119 (e.g., recirculated pure water or tap water) effective to cause the feed stream 112 to have a selected concentration of the one or more solutes prior to entry into the FO element 110. For example, an alcohol content lower than that in the raw feed stream 111 may be selected to achieve a selected alcohol content in the concentrated feed stream 116, accordingly, the raw feed stream 111 can be supplemented with amounts of water and/or concentrated feed stream 116 (having a relatively minimal alcohol concentration of less than 0.5 wt %) can be mixed with the raw feed stream to provide the selected alcohol content in the resulting feed stream 112. Accordingly, the concentration of one or more solutes in the feed stream 112 can be customized to provide a selected effect/product. Such examples may be used to "tune" the concentration of one or more solutes in the feed stream 112 to achieve a selected target concentration of one or more solutes in the concentrated feed stream 116. The feed stream 112 can be tuned by adding water (e.g., tap water, softened water, distilled water, purified water, filtered water, ion exchanged water, deaerated water, municipal water, culinary water, boiled water, treated water, pH balanced water, water recycled from the distillation apparatus 140 and/or at least a second RO element 150*b*, or any other type of potable water) to the feed stream 112 at the additional component 119 such as via the mixing apparatus 160. Such tuning may be achieved by active monitoring of the solute(s) concentration in the concentrated feed stream 116 and responsive thereto, automatically altering the concentration of one or more of the raw feed stream, the at least one additional component, and the concentrated feed stream 116, such as with the mixing device. In examples, one or more sensors may be disposed in one or more circulation lines disposed between one or more elements of the system 1400. In examples, tuning the concentration of the one or more solutes in the feed stream 112 may be used to provide a selected concentration factor of one or more solutes in one or both of the feed stream 112 or the draw stream 122. For example, the concentration of the one or more solutes in the draw stream 122 may be at least 1.2 times (e.g., 1.5 times, 2 times, 2.5 times, or 3 times) the concentration of the one or more solutes in the feed stream 112 and may be higher than the concentration of the one or more solutes in the concentrated feed stream 116. In examples, tuning the concentration of the one or more solutes in the feed stream 112 may be used to maintain the concentration or total amount of one or more solutes in the feed stream 112 through the FO element 110 to the concentrated feed stream 116.

The at least one recirculation line 170 may include one or more of a valve, a syphon, a pump, or any other device configured to remove a fluid from a fluid supply. The at least one recirculation line 170 may remove a portion of the concentrated feed stream 116 prior to delivery to one or more downstream product components 118, such as at point G. For example a portion (e.g., about 1% to about 20%, 20% to about 40%, or about 40% to about 60%) of the concentrated feed stream 116 can be recirculated back through the FO element 110 to ensure that the resulting concentrated feed stream 116 has the selected concentration of the at least one permeable solute or a selected water content.

In embodiments, the at least one recirculation line 170 can be used to recirculate substantially all of the concentrated feed stream 116 back through the at least one FO element 110, such as to further remove any of the at least one permeable solute therein. In such embodiments, the concentrated feed stream 116 can be recirculated one or more times (e.g., 1-10 times) through the FO element 110 effective to produce a final product (e.g., concentrated feed stream 116)

having a selected concentration of the one or more permeable solutes (e.g., ethanol) or a selected water content. Accordingly, a discrete volume of the raw feed stream 111 or feed stream 112 may be run across the FO membrane of the FO element 110 multiple times to remove a selected amount of one or more solutes (e.g., alcohol) therein.

In examples, one or more of a water stream (additional component 119) or a portion of the concentrated feed stream 116 may be added, to the feed stream to achieve a concentrated feed stream 116 having a selected solutes content (e.g., 0.5 wt % or less of alcohol, and 0.1 wt % or less of glycerol). The additional component 119 can be substantially pure water (e.g., water having less than 0.1 wt % of alcohol and less than 0.1 wt % of glycerol) provided at a rate of about 5 gpm. The raw feed stream 111 can include about 5 wt % alcohol (e.g., ethanol) and can be provided at a rate of about 6 gpm. The concentrated feed stream 116 can be provided to the mixing apparatus 160 at a rate of about 1 gpm and have a concentration of about 0.5 wt % alcohol and 0.0 wt % glycerol. The combination the raw feed stream 111, the concentrated feed stream 116, and the water (e.g., additional component 119) can result in feed stream 112 having about 2.5 wt % alcohol and about 0.0 wt % glycerol, which can be provided to the at least one FO element 110 at a rate of about 12 gpm. As the feed stream 112 is concentrated in the at least one FO element 110 against the draw stream 122, the concentrated feed stream 116 is produced and the diluted draw stream 126 is produced. The draw stream initially includes about 0.25 wt % alcohol and about 10 wt % glycerol and a rate of about 40 gpm. As the draw stream 122 is circulated through the at least one FO element 110 (e.g., in a countercurrent flow against the feed stream 112), the draw stream 122 picks up water and permeable solute(s), such as ethanol, from the feed stream 112 to produce diluted draw stream 126. Diluted draw stream 126 may include an alcohol content of about 0.8 wt % alcohol, about 8 wt % glycerol, and may be provided at about 50 gpm.

The concentrated feed stream 116 exits the FO element 110 and is sent to one or more downstream product components 118, as disclosed herein. About 1 gpm of the concentrated feed stream 116 is recirculated back to the mixing apparatus 160 to reconstitute the feed stream 112. The portion of the concentrated feed stream 116 for recirculation back to the feed stream 112 is removed at point G, prior to delivery of the concentrated feed stream 116 to the one or more downstream product components 118.

The diluted draw stream 126 is provided to the RO element 150 such as through a pump to provide a selected pressure and rate thereof, where the diluted draw stream 126 is separated into RO concentrate 154 and RO permeate 156. RO concentrate 154 can include about 0.25 wt % alcohol, about 10 wt % glycerol, and be provided at a rate of about 40 gpm. RO concentrate 154 can be recycled through the second side of the FO system for reuse as draw stream 122. The RO permeate 156 (e.g., waste stream of the RO element 150) can include about 3 wt % alcohol, less than 0.1 wt % glycerol, and be provided at a rate of about 10 gpm. The RO permeate 156 can be processed through at least one distillation apparatus 140.

The RO permeate 156 can be separated into distillate stream 142 (e.g., alcoholic stream) and draw permeate 144 (e.g., water in a retained stream) in the at least one distillation apparatus 140. The draw permeate 144 can be substantially pure water having less than 0.1 wt % alcohol and less than 0.1 wt % of glycerol, and be provided at a rate of about 9.65 gpm. The distillate stream 142 (e.g., alcoholic waste) can include about 85 wt % alcohol (e.g., ethanol) and less than about 0.1 wt % glycerol, and be provided at a rate of about 0.35 gpm. The water of the draw permeate 144 can be used in other processes, such as to reconstitute to the concentrated feed stream 116 (e.g., make non-alcoholic beer having less than 0.1 wt % alcohol, alter the composition or concentration of the raw feed stream 111 by addition thereto as an additional component 119, or can be used in other processes or offsite. The distillate stream 142 can be further purified to a substantially pure permeable solute (e.g., pure ethanol), sold, recycled back into the draw stream 122, or used in other processes (e.g., burned).

The draw permeate 144 can be directed to at least a second RO element 150b to remove any residual solutes in the draw permeate 144. For example, the draw permeate 144 may be 2% ABW or less (e.g., less than 1% ABW or less than 0.5 wt % ABW) after distillation, and the at least a second RO element 150b may remove substantially all of the alcohol therefrom. The at least a second RO element 150b may receive as input the draw permeate 144 (e.g., bottoms from the distillation apparatus 140) and output RO concentrate 154b and RO permeate 156b. The RO concentrate 154b may be recirculated back to the RO permeate 156 stream prior to the distillation apparatus 140 or to the draw stream 122, further purified to a substantially pure permeable solute (e.g., pure ethanol), sold, or used in other processes (e.g., burned). The RO permeate 156b (e.g., pure water) may be recycled back to the mixing apparatus via the at least one additional recirculation line 175, such as for use in the at least one additional component 119, disposed, disposed of, or may be recycled for used in water systems (e.g., culinary water, irrigation water, gray water, or municipal water).

The FO systems disclosed herein can be run in countercurrent configuration to ensure that the one or more permeable solutes in the draw stream remain in a lower concentration than in the feed stream throughout the FO element 110. One or more pumps can be positioned at any point in the system (e.g., between elements) to provide a selected pressure for the corresponding fluid stream.

Figure 15:
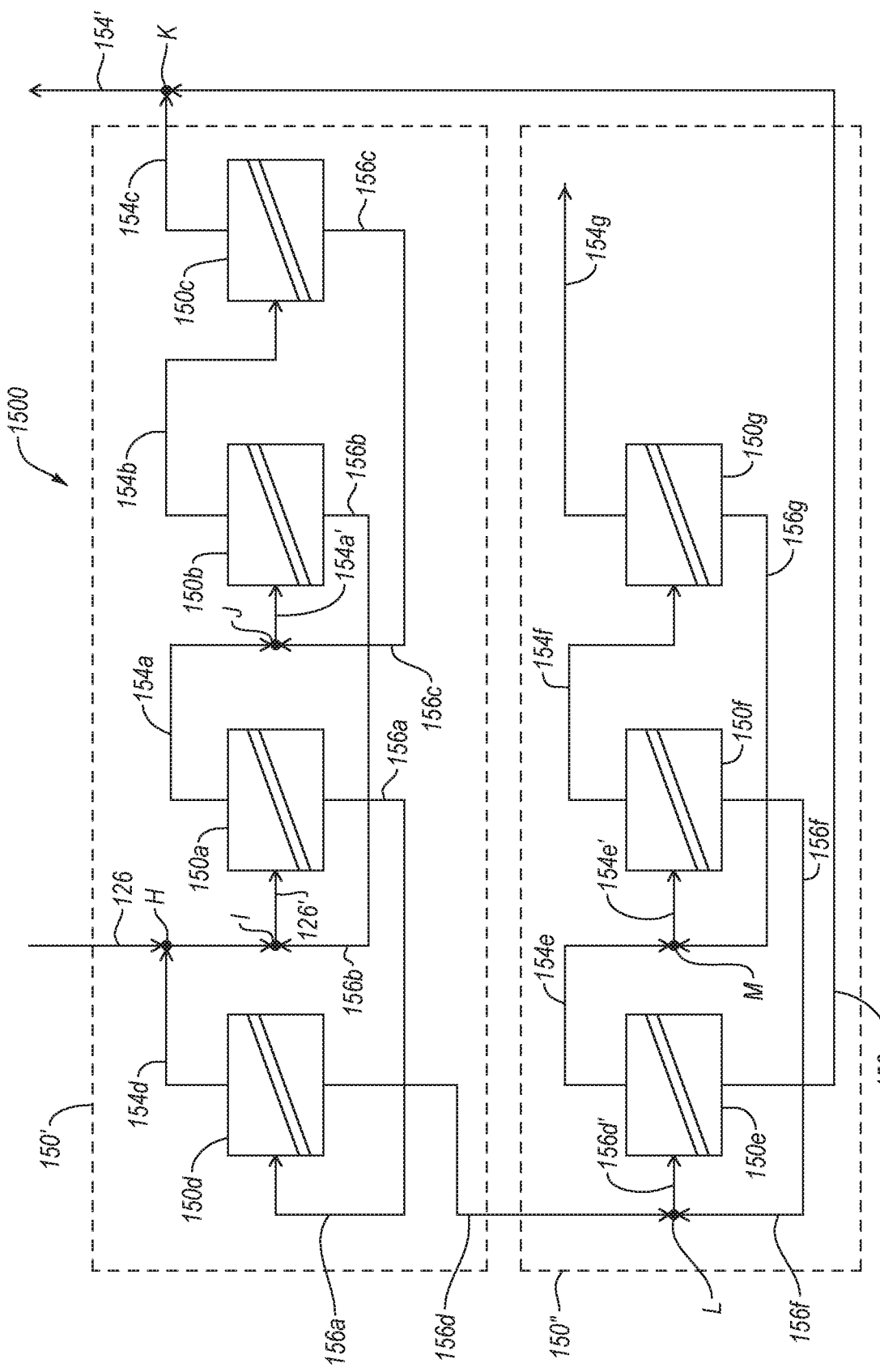
FIG. 15 is a block diagram of a draw recovery system, according to examples described herein.

FIG. 15 is a block diagram of a draw recovery system 1500. The draw recovery system 1500 includes a first plurality of draw recovery elements 150' (e.g., modules) and a second plurality of draw recovery elements 150". The individual draw recovery elements of the first plurality of draw recovery elements 150' and the second plurality of draw recovery elements 150" may include any number of one or more of an RO element, a low-rejection RO element, a nanoporous membrane element, or a distillation apparatus, arranged in any order.

In operation, the first plurality of draw recovery elements 150' can produce an RO concentrate 154c and an RO permeate 156d. The RO permeate 156d can be directed to the second plurality of draw recovery elements 150". The RO concentrate 154c can be combined with another fluid (e.g., second RO permeate 156ec and/or water) and/or can be recirculated back to the FO systems disclosed herein as a combined RO concentrate 154' (e.g., an at least partially regenerated draw solution) for further use. The second plurality of draw recovery elements 150" can receive the permeate 156d and produce an RO concentrate 154g and a RO permeate 156e. The RO concentrate 154g can be directed to a downstream distribution apparatus (e.g., storage tanks, distribution lines etc.). The RO permeate 156e can be combined with another fluid (e.g., RO concentrate 154c and/or water) and/or can be recirculated back to the FO systems disclosed herein as combined RO concentrate 154' (e.g., at least partially regenerated draw solution) for further use. For example, the RO concentrate 154c and the RO permeate 156e can be combined to form the at least partially regenerated draw solution (e.g., combined RO concentrate 154').

In embodiments, the first plurality of draw recovery elements 150' and the second plurality of draw recovery elements 150" can be configured to separate and collect different components of the diluted draw stream 126 to at least partially regenerate the draw stream 122. For example, the first plurality of draw recovery elements 150' can be configured to remove at least some alcohol from the diluted draw stream 126 and collect glycerol (and some alcohol) in the RO concentrate 154c, while the second plurality of draw recovery elements 150" can be configured to remove alcohol (e.g., ethanol) from the diluted draw stream 126 (e.g., from the first RO permeate made from the diluted draw stream 126) as RO concentrate 154g and collect water (e.g., substantially pure water) as the RO permeate 156e. The glycerol (and small amount of alcohol) of the RO concentrate 154c can be combined with the water of the RO permeate 156e to form the combined RO concentrate 154' to at least partially regenerate the draw stream 122.

In embodiments, the first plurality of draw recovery elements 150' can include a first RO element 150a, a second RO element 150b, a third RO element 150c, and a fourth RO element 150d, each fluidly coupled to one another in series. For example, an RO concentrate 154a from the first RO element 150a (e.g., a high rejection RO element) can be fluidly coupled to an input of the second RO element 150b (e.g., a low rejection RO element) and the first RO permeate 156a can be fluidly coupled to the input of the fourth RO element 150d (e.g., a high rejection RO element). An RO concentrate 154b of the second RO element 150b can be operably coupled to the input of the third RO element 150c (e.g., a low rejection RO element) and the RO permeate 156b can be recycled back to and operably coupled to the input of the first RO element 150a.

The RO permeate 156c of the third RO element 150c can be recycled back to the input of the second RO element 150b, such as mixing with the first RO concentrate 154a at point J prior to introduction into the second RO element 150b to form RO concentrate 154a'. The RO concentrate 154c can be output to the FO system (e.g., any FO system disclosed herein) for use as a draw stream or a portion thereof. For example, the RO concentrate 154c can be combined with an RO permeate 156e at point K to produce the combined RO concentrate 154' (e.g., at least partially regenerated or recovered draw solution). The combined RO concentrate 154' can have a solutes content (e.g., one or more permeable and one or more impermeable solutes content) similar or identical to the draw stream 122 (not shown).

The fourth RO element 150d can output RO concentrate 154d to the input of the first RO element 150a and output RO permeate 156d to the fifth RO element 150e located in the second plurality of draw recovery elements 150". The RO concentrate 154d can be combined with the diluted draw stream 126 at point H, and with the second RO permeate 156b at point I, to form the diluted draw stream 126' prior to introduction into the first RO element 150a. The fourth RO permeate 156d is directed to the second plurality of draw recovery elements 150".

The plurality of draw recovery elements 150" can include a fifth RO element 150e, a sixth RO element 150f, and a seventh RO element 150g. The fifth RO element 150e, sixth RO element 150f, and seventh RO element 150g can be operably coupled to one another and collectively be configured to output an RO concentrate 154g (e.g., an ethanol solution) and RO permeate 156e (e.g., substantially pure water). The fourth RO permeate 156d can be introduced into the fifth RO element 150e. The fifth RO element 150e (e.g., a high rejection RO element) can output a fifth RO concentrate 154e to the sixth RO element 150f and can output a fifth RO permeate 156e (e.g., substantially pure water) to one or more of an FO system for use in reconstituting the draw stream, to downstream components/processes such as reconstituting the concentrated feed stream (not shown), into the waste water system, or any other suitable use. For example, fifth RO permeate 156e can be mixed with the third RO concentrate 154c to form the combined RO concentrate 154', which may be used in or as a regenerated draw stream.

The sixth RO element 150f (e.g., a high rejection RO element) can output sixth RO concentrate 154f to the input of the seventh RO element 150g and can output sixth RO permeate 156f to the input of the fifth RO element 150e. For example, the sixth RO permeate 156f can be mixed with the fourth RO permeate 156d at point L to form the RO permeate 156d', prior to introducing the same into the fifth RO element 150e.

The seventh RO element (e.g., high rejection RO element) can output a seventh RO concentrate 154g (e.g., a waste stream having a relatively high amount (5 wt % or more) of ethanol) and output a seventh RO permeate 156g (e.g., water and ethanol of a concentration lower than a seventh RO concentrate 154g). The seventh RO concentrate 154g can be output to one or more downstream components for further processing (e.g., separation of the ethanol therefrom in a distillation apparatus) or disposal. The seventh RO permeate 156g can be output to the input of the sixth RO element 150f. For example, the seventh RO permeate 156g can be mixed with the fifth RO concentrate 154e at point M to form RO concentrate 154e' prior to introduction of the same into the sixth RO element 150f. Accordingly, the RO permeate from the first plurality of draw recovery elements 150' (e.g., apparatuses) can be further processed to remove one or more solutes therefrom and/or to at least partially recover/regenerate the draw stream form the diluted draw stream 126.

While 4 and 3 elements are shown respectively for each plurality of draw recovery elements 150' and 150", any number of elements can be used to provide a selected component content (e.g., concentration) in the respective permeates and concentrates.

In embodiments, the system 1500 and a process of using the same can be used to concentrate an alcoholic beverage solution (while simultaneously removing at least some of the alcohol therefrom), such as to produce a reduced-alcoholic beer concentrate. The process can include receiving a diluted draw stream 126 having a concentration of about 1.38 wt % ethanol and about 8 wt % glycerol at a rate of about 50 gpm at the first plurality of draw recovery elements 150'. The diluted draw stream 126 can be combined with fourth RO concentrate 154d at point H and with second RO permeate 156b at point I to form the diluted draw stream 126' having about 1.54 wt % ethanol and about 7.6 wt % glycerol, and provided to the first RO element 150a at a rate of about 101.5 gpm. The first RO element can be a high rejection RO element and output the first RO concentrate 154a having an ethanol concentration of 1.6 wt % and a glycerol concentration of about 18.3 wt %, at a rate of about 35.5 gpm. The first RO element 150a can output the first RO permeate 156a to the fourth RO element 150d, the first RO permeate having an ethanol content of about 1.5 wt % and a glycerol content of about 1.8 wt %, at a rate of about 66 gpm.

The first RO concentrate 154a can be mixed with third RO permeate 156c at point J to form the first RO concentrate 154a' having an ethanol concentration of 1.6 wt % and a glycerol content of about 17.8 wt %, at a rate of about 44 gpm. The first RO concentrate 154a can be introduced into the second RO element 150b, where the second RO element 150b outputs second RO concentrate 154b having an ethanol concentration of about 1.3 wt % and a glycerol concentration of about 34 wt %, at a rate of about 15.5 gpm. The second RO element 150b also outputs second RO permeate 156b having an ethanol concentration of about 1.7 wt % and a glycerol concentration of about 9.0 w %, at a rate of about 28.8 gpm. As noted above, the second RO permeate 156b can be combined with the combined diluted draw stream 126 and fourth RO concentrate 154d at point I to form the diluted draw stream 126'.

The second RO concentrate 154b is circulated through the third RO element 150c which outputs the third RO concentrate 154c and the third RO permeate 156c. The third RO concentrate 154c includes about 1.1 wt % ethanol and about 55.6 wt % glycerol, and is provided at a rate of about 7.1 gpm. The third RO concentrate 154c can be output to at least partially regenerate the draw stream used in FO systems as disclosed herein. For example, the third RO concentrate 154c can be combined with the fifth RO permeate 156e (e.g., substantially pure water) at point K to form the combined RO concentrate 154', which may be used as a regenerated draw stream. The third RO permeate 156c can include about 1.5 wt % ethanol and about 15.5 wt % glycerol, and can be provided at a rate of about 8.2 gpm. The third RO permeate 156c can be combined with the first RO concentrate 154a at the point J to form the first RO concentrate 154a' as disclosed above.

The fourth RO element 150d can output the fourth RO concentrate 154d and the fourth RO permeate 156d. The fourth RO concentrate 154d can include about 1.7 wt % ethanol and about 4.9 wt % glycerol, and be provided to the first RO element 150a via point H at a rate of about 23 gpm. As noted above the fourth RO concentrate 154d can be combined with the diluted draw stream 126 and the second RO permeate 156b to form the diluted draw stream 126' at points H and I respectively. The fourth RO permeate 156d can include about 1.4 wt % ethanol and about 0.2 wt % glycerol, and be provided to the second plurality of draw recovery elements 150" at a rate of about 43 gpm.

The fourth RO permeate 156d can be mixed with a sixth RO permeate at point L to form the RO permeate 156d'. The RO permeate 156d' can include about 1.1 wt % ethanol and less than about 0.1 wt % glycerol (e.g., a trace amount), and be provided to the fifth RO element 150e at a rate of about 81.5 gpm. The fifth RO element 150e of the second plurality of draw recovery elements 150" can receive the RO permeate 156d'. The fifth RO element 150e can output the fifth RO concentrate 154e having about 1.8 wt % alcohol and less than about 0.1 wt % glycerol, to the sixth RO element 150f at a rate of about 49 gpm. The fifth RO element 150e can output fifth RO permeate 156e having less than about 0.1 wt % alcohol and less than about 0.1 wt % glycerol (e.g., substantially pure water), to the one or more downstream processes, such as regenerating the draw stream at a rate of about 49 gpm. For example, the fifth RO permeate 156e can be combined with the third RO concentrate 154c to form the combined RO concentrate 154', which may be used as a regenerated draw stream in any of the FO systems disclosed herein.

The fifth RO concentrate 154e can be combined with the seventh RO permeate 156g at point M to form the RO concentrate 154e' prior to introduction of the same into the sixth RO element 150e. The RO concentrate 154e' can have an ethanol content of about 1.8 wt % and a glycerol content of about 0.13 wt %, and can be provided to the sixth RO element 150f at a rate of about 64.5 gpm. The sixth RO element 150f can output sixth RO concentrate 154f having an ethanol content of about 3.4 wt % and a glycerol content of about 0.3 wt %. The sixth RO concentrate 154f can be provided to the seventh RO element 150g at a rate of about 26 gpm. The sixth RO element 150e can output sixth RO permeate 156f having about 0.8 wt % alcohol and less than about 0.1 wt % glycerol, to the fifth RO element 150e at a rate of about 49 gpm. The sixth RO permeate 156f can be combined with the fourth RO permeate 156d at the point L as disclosed above.

The seventh RO element 150g can output seventh RO concentrate 154g having about 6 wt % ethanol and less than about 0.1 wt % glycerol, at a rate of about 10 gpm. The seventh RO concentrate 154g can be output to one or more downstream apparatuses, such as at least one distillation apparatus to separate the ethanol from the water therein. The seventh RO element 150g can output seventh RO permeate 156g having about 1.7 wt % ethanol and about 0.7 wt % glycerol, at a rate of about 15.5 gpm. The combined RO concentrate 154' can be used as a regenerated draw solution, as-is, or can be combined with further solutions (e.g., water, beer, glycerol, etc.) to form a regenerated draw solution for use with the FO systems and processes disclosed herein.

Figure 16:
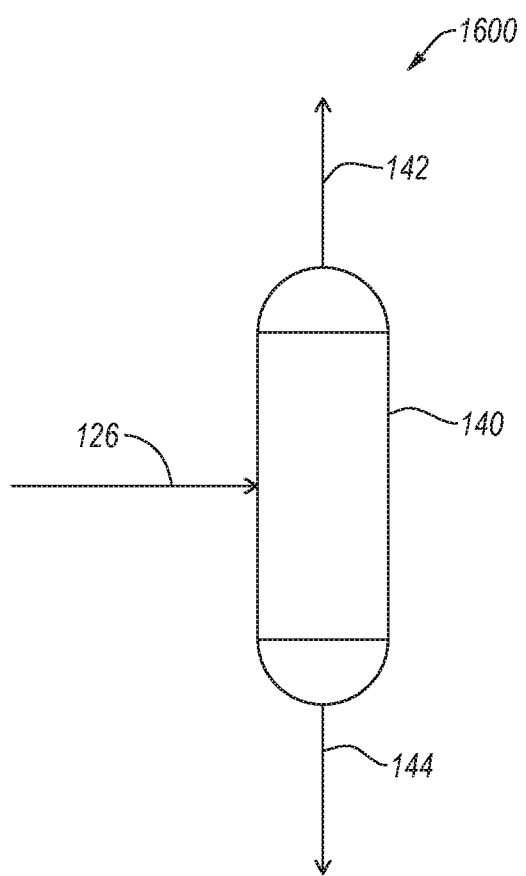
FIG. 16 is a block diagram of a distillation apparatus, according to examples described herein.

FIG. 16 is a block diagram of a distillation apparatus 140. The distillation apparatus 140 can be used with any of the systems and methods disclosed herein. The distillation apparatus 140 can include one or more stills. In embodiments, a plurality of distillation apparatuses 140 can be used with any of the systems or methods disclosed herein, such as to separate one or more components of a fluid stream (e.g., at least partially regenerate a draw solution from a diluted draw stream, separate components of an RO permeate, etc.). For example, the distillation apparatus can receive the diluted draw stream 126 and separate the diluted draw stream into distillate stream 142 and draw permeate 144. The distillate stream 142 can include a higher concentration of one or more permeable solutes therein that the diluted draw stream 126. For example, the distillate stream 142 can include a higher concentration of ethanol than the diluted draw stream 126. The draw permeate 144 (e.g., still bottoms) can include a lower concentration of at least one solute (e.g., ethanol) than the diluted draw stream 126. For example, the draw permeate 144 can have a lower concentration of ethanol therein, or can include water and one or more impermeable solutes (e.g., having less than about 0.1 wt % ethanol and about 10 wt % glycerol therein). In embodiments, the one or more of the draw permeate 144 or the distillate stream 142 can be further processed to separate one or more components thereof (e.g., purification). For example, the distillate stream 142 can be further processed to remove water from ethanol therein, such as to produce a substantially pure water and ethanol products for other uses. In embodiments, one or more of the draw permeate 144 or the distillate stream 142 can be processed in one or more distillation apparatuses, one or more RO elements, one or more FO elements, or combinations of any of the foregoing, to separate one or more components therein. Such processing of the diluted draw stream and derivatives thereof can ensure that the original solutions are utilized and recycled as much as possible.

While some of the fluidic components and connections between elements disclosed herein are referred to as "streams," it is understood that the "streams" includes a solution and/or a fluidic coupling (e.g., conduits) between elements. For example, a feed stream comprises a feed solution, a feed solution may comprise a feed stream, and each can include a conduit extending between a feed source and an FO element.

While FIGS. 12-16 are presented as systems, each of the flow diagrams of FIGS. 12-16 also depict processes of concentrating a solution and/or regenerating a draw solution used to concentrate the solution. Some embodiments, of the processes disclosed in FIGS. 12-16 are disclosed below, with respect to FIGS. 17 and 18.

Figure 17:
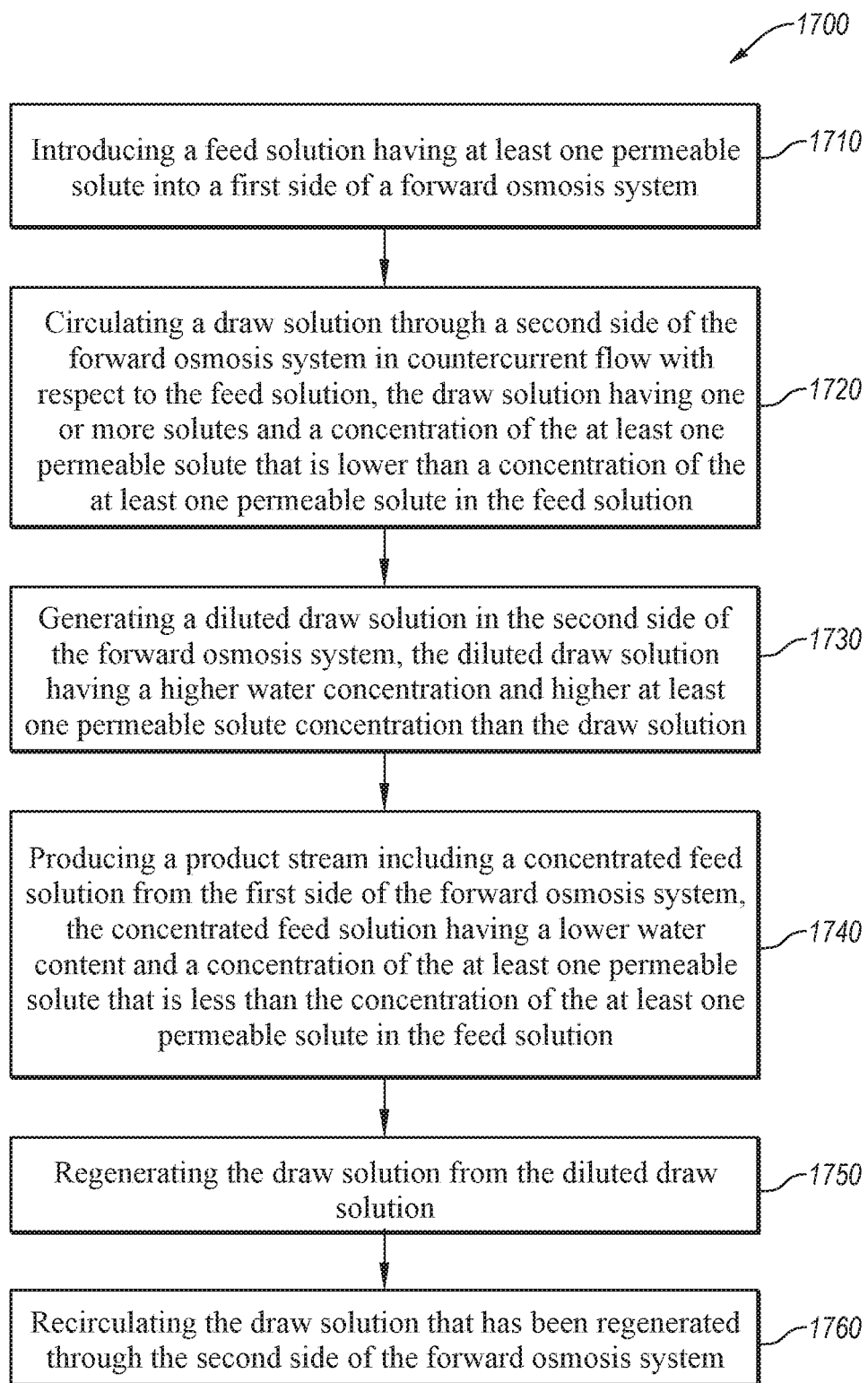
FIG. 17 is a flow diagram of a method for concentrating a solution, according to examples described herein.

FIG. 17 is a flow diagram of a method 1700 for concentrating a solution. The method 1700 can include the act 1710 of introducing a feed solution having at least one permeable solute into a first side of a forward osmosis system; the act 1720 of circulating a draw solution through a second side of the forward osmosis system in a countercurrent flow with respect to the feed solution, the draw solution having one or more solutes and a concentration of the at least one permeable solute that is lower than a concentration of the at least one permeable solute in the feed solution; the act 1730 of generating a diluted draw solution in the second side of the forward osmosis system, the diluted draw solution having a higher water concentration and higher at least one permeable solute concentration than the draw solution; the act 1740 of producing a product stream including a concentrated feed solution from the first side of the forward osmosis system, the concentrated feed solution having a lower water content and a concentration of the at least one permeable solute that is less than the concentration of the at least one permeable solute in the feed solution; the act 1750 of regenerating the draw solution from the diluted draw solution; and the act 1760 of recirculating the draw solution that has been regenerated through the second side of the forward osmosis system. In embodiments, one or more of the acts 1710-1760 can be performed in a different order than presented or may be omitted.

In embodiments, the act 1710 of introducing a feed solution having at least one permeable solute into a first side of an FO system can include introducing a feed solution that includes ethanol into a first side of the FO system. Introducing a feed solution having at least one permeable solute into a first side of an FO system can include introducing a feed solution that includes at least about 1 wt % greater concentration of the at least one permeable solute than the concentrated feed solution. In embodiments, introducing a feed solution having at least one permeable solute into a first side of an FO system can include introducing one or more of beer, wine, a malt beverage, distilled spirits, or combinations thereof. In such embodiments, the at least one permeable solute can include an alcohol (e.g., ethanol). In embodiments, introducing a feed solution having at least one permeable solute into a first side of an FO system can include using at least one forward osmosis membrane having a polyamide support to separate the first side from the second side. In embodiments, the FO system can include a plurality of FO elements disposed in one or more of series or in parallel. In embodiments, introducing a feed solution having at least one permeable solute into a first side of an FO system can include introducing the feed solution at rate of at least about 1 gpm, or between about 1 gpm to about 200 gpm. In embodiments, the act 1710 of introducing a feed solution having at least one permeable solute into a first side of an FO system can include introducing a feed solution into any of the systems disclosed herein.

In embodiments, the act 1720 of circulating a draw solution through a second side of the FO system in a countercurrent flow with respect to the feed solution, the draw solution having one or more solutes and a concentration of the at least one permeable solute that is lower than a concentration of the at least one permeable solute in the feed solution can include circulating a draw solution having about 0.5 wt % alcohol or less (e.g., about 0.25 wt % alcohol or less) through the second side of the FO system. In embodiments, the act 1720 of circulating a draw solution through a second side of the FO system includes circulating the draw stream in a countercurrent flow compared to the feed stream. In embodiments, the act 1720 of circulating a draw solution through a second side of the FO system in a countercurrent flow with respect to the feed solution can include circulating a draw solution having at least about 8 wt % glycerol (e.g., at least about 10 wt % glycerol) through the second side of the FO system.

In embodiments, the one or more solutes can include a mixture of permeable solutes and impermeable solutes in a (e.g., total) concentration selected to produce a concentrated feed solution having a selected permeable solute concentration. In embodiments, one of the one or more permeable solutes in the draw solution and the at least one permeable solute in the feed solution can be identical, such as both including ethanol. In embodiments, the one or more solutes in the draw solution can include alcohol (e.g., ethanol) and glycerol and circulating a draw solution through a second side of the FO system can include circulating a glycerin and ethanol draw solution through the FO membrane. The ethanol content of the draw solution can be less than about 0.5 wt %, and the glycerol content of the draw solution can be more than about 8 wt %, prior to introduction of the draw solution into the FO element. In embodiments, the draw solution may have an initial solute (e.g., alcohol) concentration that is at least 1 wt % less (e.g., at least 1 wt %, 2 wt %, 3 wt %, 4 wt %, 5 wt %, or 10 wt % less, or ranges between any of the foregoing) than the solute concentration of the feed solution. The solute may include a single solute such as ethanol or glycerol or the solute may include a total solutes content. For example, the draw solution entering the FO element may contain less than 0.25 wt % alcohol and the feed solution entering the FO element (e.g., on an opposite side thereof in counter current flow) may have an ethanol content of at least about 5 wt %.

In embodiments, the at least one permeable solute concentration of the draw stream is composed to have a concentration of the at least one permeable solute that is lower than the concentration of the permeable solute in the feed stream at single region of the FO element. For example, the ethanol concentration of the draw stream entering the FO element can be lower than the ethanol concentration of the feed stream exiting the FO element even though the ethanol concentration of the feed stream has been depleted by the time the feed stream exits the FO element.

In embodiments, the act 1730 of generating a diluted draw solution in the second side of the FO system, the diluted draw solution having a higher water concentration and higher at least one permeable solute concentration than the draw solution can include passing one or more permeable solutes and/or water through the FO membrane, such as via one or more of osmotic and/or hydrostatic force. For example, generating a diluted draw solution in the second side of the FO system (and/or producing a product stream) can include removing at least one of the one or more permeable solutes (e.g., ethanol) and/or water from the feed solution via an FO membrane. In embodiments, the at least one permeable solute can include an alcohol (e.g., ethanol) and generating a diluted draw solution (and/or producing a product stream) can include removing alcohol from the feed solution via the FO membrane. In embodiments, generating a diluted draw solution in the second side of the FO system can include generating a diluted draw solution having a higher ethanol concentration than the draw solution by a multiple of at least about 2, such as about 2 to about 20, or about 3 to about 10.

In embodiments, generating a diluted draw solution in the second side of the FO system can include generating a diluted draw solution having a total solutes concentration that is higher than the feed stream total solutes concentration, while the at least one permeable solute concentration (e.g., ethanol) remains lower than the at least one permeable solute concentration in the feed stream.

In embodiments, the act 1740 of producing a product stream including a concentrated feed solution from the first side of the forward osmosis system can include producing any of the feed concentrate streams disclosed herein. In embodiments, the act 1740 of producing a product stream including a concentrated feed solution from the first side of the forward osmosis system, the concentrated feed solution having a lower water content and a concentration of the at least one permeable solute that is less than the concentration of the at least one permeable solute in the feed solution can include producing an non-alcoholic beverage concentrate (e.g., beer having alcohol and water removed therefrom). In embodiments, the act 1740 of producing a product stream including a concentrated feed solution from the first side of the forward osmosis system can include producing an alcoholic beverage concentrate having a lower ethanol content than the feed stream. In embodiments, the act 1740 of producing a product stream including a concentrated feed solution from the first side of the forward osmosis system can include producing a beverage concentrate having an ethanol content of about 1 wt % or less, such as about 0.5 wt % or less.

In embodiments, the act 1750 of regenerating the draw solution from the diluted draw solution can include processing the diluted draw solution in a draw solution regeneration or recovery system, such as any of those disclosed herein. For example, regenerating the draw solution from the diluted draw solution can include performing one or more of low-rejection reverse osmosis, reverse osmosis, or distillation on the diluted draw solution. In embodiments, regenerating the draw solution from the diluted draw solution can include cycling the diluted draw solution through a first reverse osmosis process (e.g., high or low rejection RO) followed by at least a second reverse osmosis process (e.g., high or low rejection RO). In embodiments, regenerating the draw solution from the diluted draw solution can include cycling the diluted draw solution through a first series of reverse osmosis processes followed by at least a second series of reverse osmosis processes. In embodiments, regenerating the draw solution from the diluted draw solution can include performing at least one distillation process on the diluted draw stream or a derivative thereof (e.g., an RO concentrate or permeate). For example, regenerating the draw solution from the diluted draw solution can include cycling the diluted draw solution through at least one reverse osmosis process followed by at least one distillation process. In examples, the diluted draw solution may be polished to remove or recover substantially all non-water components therein. For example, the act 1750 may include cycling the draw solution (e.g., bottoms) through at least one additional reverse osmosis process after the at least one distillation process. In such examples, the diluted draw solution may be cycled through at least a first reverse osmosis process, the reverse osmosis permeate may be distilled, the bottoms from the distillation process (e.g., draw permeate) may be subjected to at least a second reverse osmosis process, and the reverse osmosis permeate (e.g., pure water) may be recycled for use in the feed solution (e.g., feed stream), sold, or used for other purposes. The one or more solutes removed in the first reverse osmosis process, the distillation process, and the second reverse osmosis process may be recycled to the draw solution to reconstitute the draw solution (e.g., draw stream). In embodiments, the second reverse osmosis concentrate may be recycled to the first reverse osmosis permeate stream prior to introducing the first reverse osmosis permeate into the distillation process. In embodiments, regenerating the draw solution from the diluted draw solution can include using any of the systems disclosed herein in any of the ways disclosed herein. In embodiments, regenerating the draw solution from the diluted draw solution can include forming a regenerated draw solution having a composition (e.g., chemical content and concentrations) similar or identical to the draw solution. In embodiments, regenerating the draw solution from the diluted draw solution can include adding one or more of water or at least one additional component to the at least partially regenerated draw solution to form the regenerated draw solution.

In embodiments, the act 1760 of recirculating the draw solution that has been regenerated through the second side of the forward osmosis system can include circulating the regenerated/recovered draw solution through the second side of the FO element. In embodiments, recirculating the draw solution that has been regenerated through the second side of the forward osmosis system can include pressuring the regenerated draw solution to a pressure and rate of delivery suitable for use in the second side of the FO system, such as any of those pressures or rates disclosed herein.

In embodiments, the method 1700 can further include producing a permeate stream from the diluted draw solution. In examples, the diluted draw solution may be polished to remove substantially all non-water components therefrom. For example, the method 1700 may include cycling the draw solution through at least one additional reverse osmosis process after the at least one distillation process. In such examples, the diluted draw solution may be cycled through at least the first reverse osmosis process, the reverse osmosis permeate may be distilled in a distillation process, the bottoms (e.g., water) from the distillation process may be subjected to at least the second reverse osmosis process, and the second reverse osmosis permeate (e.g., pure water) may be recycled for use in the feed solution, sold, or used for other purposes. In embodiments, the permeate stream (second reverse osmosis permeate) can be substantially pure water (e.g., water having less than about 0.1 wt % alcohol and less than about 0.1 wt % glycerol).

In embodiments, the method 1700 can further include at least partially reconstituting the concentrated feed solution. For example, at least partially reconstituting the concentrated feed solution can include adding water (e.g., from the second reverse osmosis permeate) to the concentrated feed solution (e.g., beer) to form a partially reconstituted feed solution (e.g., non-alcoholic beer). For example, at least partially reconstituting the concentrated feed solution can include adding water (e.g., tap water, softened water, distilled water, purified water, filtered water, ion exchanged water, deaerated water, municipal water, culinary water, boiled water, treated water, pH balanced water, water recycled from the distillation apparatus 140 and/or at least a second RO element 150b, or any other type of potable water) and at least one permeable solute to the concentrated feed solution (e.g., beer) to form an at least partially reconstituted feed solution (e.g., lower alcohol content beer, than the alcohol content of the feed solution). In embodiments, at least partially reconstituting the concentrated feed solution can include adding water to the concentrated feed solution from (e.g., that was recovered via one or more diluted draw solution recovery techniques, such as any of those disclosed herein). For example, water, such as a water RO permeate, can be combined with the feed solution or concentrated feed solution to at least partially reconstitute the feed solution or control the concentration of the one or more solutes (e.g., alcohol) in the feed solution. In examples, adding water to the feed solution may include adding any water disclosed herein to the feed solution such as recycling water obtained from the permeate stream of the diluted draw solution (e.g., an RO permeate, distillation bottoms or RO permeate produced therefrom) to the feed solution.

In examples, the method 1700 may include maintaining the concentration or total amount of alcohol in the feed solution. For example, when the maintenance of one or more solutes (e.g., alcohol) in any of the systems disclosed herein (e.g., in the feed solution or concentrated feed solution) is desired, the one or more solutes can be substantially completely recovered from the diluted draw solutions and permeate streams and may be recycled back to the feed solution entering the forward osmosis process. In such examples, the method 1700 may include using at least one additional reverse osmosis process after a distillation process to recover any residual amounts of the one or more solutes remaining in the bottoms of the distillation process (e.g., non-distillate liquid).

Figure 18:
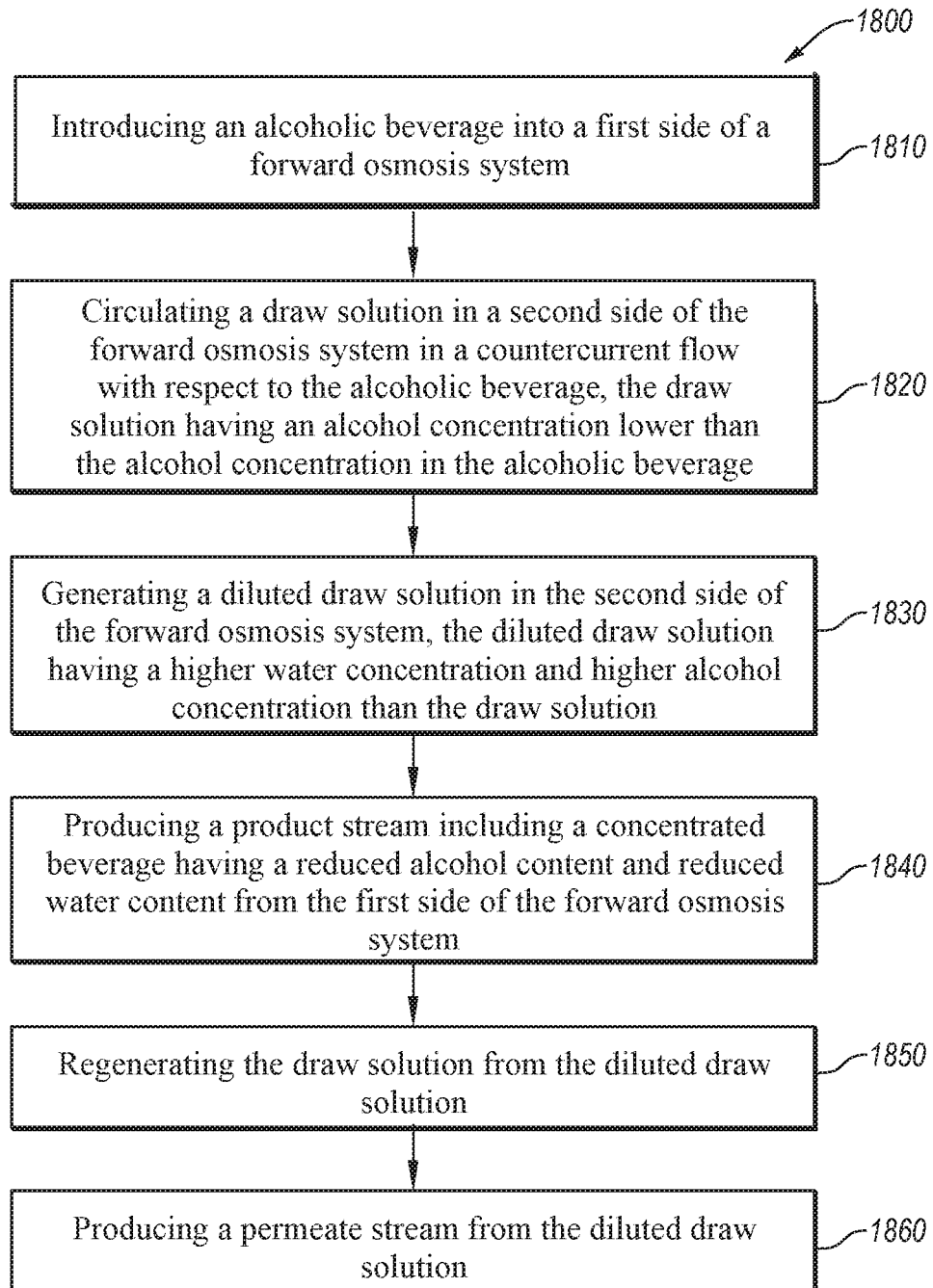
FIG. 18 is a flow diagram of a method for concentrating an alcoholic solution via forward osmosis, according to examples described herein.

FIG. 18 is a flow diagram of a method 1800 for concentrating an alcoholic solution via forward osmosis. The method 1800 can include an act 1810 of introducing an alcoholic beverage into a first side of a forward osmosis system; an act 1820 of circulating a draw solution in a second side of the forward osmosis system in a countercurrent flow with respect to the alcoholic beverage, the draw solution having an alcohol concentration lower than the alcohol concentration in the alcoholic beverage; an act 1830 of generating a diluted draw solution in the second side of the forward osmosis system, the diluted draw solution having a higher water concentration and higher alcohol concentration than the draw solution; an act 1840 of producing a product stream including a concentrated beverage having a reduced alcohol content and reduced water content from the first side of the forward osmosis system; an act 1850 of regenerating the draw solution from the diluted draw solution; and an act 1860 of producing a permeate stream from the diluted draw solution. In embodiments, one or more of the acts 1810-1860 can be performed in a different order than as presented above, or may be omitted.

The act 1810 of introducing an alcoholic beverage into a first side of an FO system can be similar or identical to the act 1710 disclosed above, in one or more aspects. For example, introducing an alcoholic beverage into a first side of an FO system can including introducing one or more of beer, wine, a malt beverage, distilled spirits, or combinations thereof into the first side of the FO system. In embodiments, introducing an alcoholic beverage into a first side of a forward osmosis system can include using a FO membrane having a polyamide support to separate the first side from the second side.

The act 1820 of circulating a draw solution in a second side of the FO system in a countercurrent flow with respect to the alcoholic beverage, the draw solution having an alcohol concentration lower than the alcohol concentration in the alcoholic beverage can be similar or identical to the act 1720 disclosed above, in one or more aspects. For example, circulating a draw solution in a second side of the FO system in a countercurrent flow with respect to the alcoholic beverage can include circulating a draw solution having an alcohol concentration that is at least 1 wt % less (e.g., at least 1 wt %, 2 wt %, 3 wt %, 4 wt %, 5 wt %, or 10 wt % less, or ranges between any of the foregoing) than the alcohol concentration of the feed solution. For example, the draw solution entering the FO membrane may be less than 0.25 wt % alcohol and the feed solution entering the FO element (e.g., on an opposite side thereof in counter current flow) may have an ethanol content of at least about 5 wt %. In embodiments, circulating a draw solution in a second side of the FO system can include circulating a draw solution having a total solutes content that is higher than a total solutes content of the feed solution (e.g., the glycerol concentration of the draw solution can be higher than the total solutes content of the alcoholic beverage). In embodiments, the draw solution includes two or more solutes, such as one or more impermeable solutes and one or more impermeable solutes (e.g., ethanol and glycerol, respectively). In some examples, the draw solution can be circulated in a concurrent configuration with the feed solution.

The act 1830 of generating a diluted draw solution in the second side of the FO system, the diluted draw solution having a higher water concentration and higher alcohol concentration than the draw solution can be similar or identical to the act 1730 disclosed above in one or more aspects. For example, generating a diluted draw solution in the second side of the FO system can include removing ethanol from the feed solution via the FO membrane.

The act 1840 of producing a product stream including a concentrated beverage having a reduced alcohol content and reduced water content from the first side of the forward osmosis system can be similar or identical to the act 1740 disclosed above, in one or more aspects. For example, producing a product stream including a concentrated beverage having a reduced alcohol content and reduced water content can include removing at least some water and at least some alcohol from the alcoholic beverage via the FO membrane. In embodiments, producing a product stream including a concentrated beverage having a reduced alcohol content and reduced water content can include producing a concentrated beverage having a lower water content and a lower concentration of alcohol than the concentration of alcohol in the alcoholic beverage. For example, producing a product stream including a concentrated beverage having a reduced alcohol content and reduced water content can include producing a non-alcoholic beverage concentrate (e.g., beer having alcohol and water removed therefrom). In embodiments, producing a product stream including a concentrated beverage having a reduced alcohol content and reduced water content can include producing an alcoholic beverage concentrate having a lower ethanol content than the feed stream.

The act 1850 of regenerating the draw solution from the diluted draw solution can be similar or identical to the act 1750 disclosed above in one or more aspects. For example, regenerating the draw solution from the diluted draw solution can include performing one or more of low-rejection reverse osmosis, reverse osmosis, or distillation on the diluted draw solution. In embodiments, regenerating the draw solution from the diluted draw solution can include cycling (e.g., circulating) the diluted draw solution through a first reverse osmosis process followed by at least a second reverse osmosis process. In embodiments, regenerating the draw solution from the diluted draw solution can include cycling the diluted draw solution through a first series of reverse osmosis processes followed by at least a second series of reverse osmosis processes. In embodiments, regenerating the draw solution from the diluted draw solution can include cycling the diluted draw solution through at least one distillation process, such as at least one reverse osmosis process followed by at least one distillation process.

The act 1860 of producing a permeate stream from the diluted draw solution can include producing a permeate via one or more of RO (e.g., low rejection or high rejection RO), distillation, or nanofiltration). In embodiments, producing a permeate stream from the diluted draw solution can include producing a substantially pure water permeate stream. For example, producing a permeate stream from the diluted draw solution can include producing a permeate via at least one RO process, distilling the permeate via at least one distillation process, and producing a second permeate from the bottoms (e.g., non-distillate liquid) of the distillation process. The second permeate may include substantially pure water, which may be disposed of, recycled for use in the feed solution, or recycled for later reconstitution of the feed solution using the concentrated feed solution. The one or more solutes (e.g., alcohol and/or glycerin) removed from the diluted draw solution, the RO permeate, and the bottoms may be recycled to reconstitute one or more of the feed solution or the draw solution. Accordingly, one or more solutes may be maintained in the system at a selected amount or concentration. The method 1800 may include maintaining the concentration or total amount of alcohol in the feed solution. For example, when the maintenance of one or more solutes (e.g., alcohol) in any of the systems disclosed herein (e.g., in the feed solution or concentrated feed solution solution) is desired, the one or more solutes can be substantially completely recovered from the draw solutions and permeate streams and may be recycled back to the feed solution entering the forward osmosis process. In such examples, the method 1800 may include using at least one additional reverse osmosis process after a distillation process to recover any residual amounts of the one or more solutes remaining in the bottoms (e.g., non-distillate liquid) of the distillation problems. The recovered residual amounts of the one or more solutes from the at least one additional reverse osmosis process may be combined with the permeate stream prior to introducing the permeate stream into the distillation apparatus. Accordingly, the permeable solute may be substantially completely recovered from the diluted draw stream and may be recycled for use in a regenerated draw stream.

In embodiments, the method 1800 can further include recirculating the draw solution that has been regenerated through the second side of the forward osmosis system. In embodiments, recirculating the draw solution that has been regenerated through the second side of the forward osmosis system can be similar or identical to the act 1760 disclosed above, in one or more aspects. For example, recirculating the draw solution that has been regenerated through the second side of the forward osmosis system can include pressurizing the regenerated draw solution in a pump to provide the same to the second side of the FO system at a selected pressure and/or rate.

In embodiments, the method 1800 can further include combining at least some of the substantially pure water permeate (e.g., a permeate stream from the draw stream recovery apparatus(es)) with the concentrated beverage. In such embodiments, an at least partially reconstituted beverage can be formed.

In embodiments, the method 1800 can include combining at least some of the permeate from the draw stream recovery apparatuses (e.g., substantially pure water) with the alcoholic beverage prior to introducing the alcoholic beverage into the first side of the forward osmosis system. Such addition can be used to dilute, maintain, or otherwise control the alcohol content of the alcoholic beverage entering the FO elements to a desired concentration of one or more solutes therein, such as to produce a selected one or more solutes content in the resulting concentrated beverage.

In embodiments, the method 1800 can further include combining at least some of the concentrated beverage (e.g., concentrated feed solution) with an incoming raw feed solution (e.g., prior to the FO element) to form the feed solution introduced into the FO element. The method 1800 can further include combining substantially pure water with the combined raw feed solution and concentrated beverage to form the feed solution. In such a manner the one or more solutes content introduced into the FO element can be controlled to produce a desired one or more solutes content in the concentrated beverage produced by the FO element. Accordingly, one or more of the concentrated feed solution and one or more components of the diluted draw solution can be recirculated through the FO system and related methods to produce a selected one or more permeable solutes content in the product solution.

In examples, the systems and methods herein may be used to maintain a concentration or amount of one or more solutes (e.g., alcohol) in a solution (e.g., feed solution or stream of an alcoholic beverage) while removing water therefrom. For example, a method for maintaining an amount or concentration of one or more solutes in the solution while removing water therefrom may include utilizing a higher concentration of at least one permeable solute in the draw solution than the feed solution (or the concentrated feed solution). The method may include introducing a feed solution having at least one permeable solute into a first side of a forward osmosis system which may be similar or identical to the act 1110 or 1710 in one or more aspects. The method may include circulating a draw solution through a second side of the forward osmosis system, the draw solution having two or more solutes and a concentration of the at least one permeable solute that is greater than a concentration of the at least one permeable solute in the feed solution which may be similar or identical to the act 1120 or 1720 in one or more aspects. The method may include generating a diluted draw solution in the second side of the forward osmosis system, the diluted draw solution having a higher water concentration and lower at least one permeable solute concentration than the draw solution which may be similar or identical to the act 1130 or 1730 in one or more aspects. The method may include producing a product stream including a concentrated feed solution from the first side of the forward osmosis system, the concentrated feed solution having a lower water content and a concentration of the at least one permeable solute that is higher than the concentration of the at least one permeable solute in the feed solution which may be similar or identical to the act 1140 or 1740 in one or more aspects. The method may include regenerating the draw solution from the diluted draw solution which may be similar or identical to the act 1150 or 1750 in one or more aspects. The method may include recirculating the draw solution that has been regenerated through the second side of the forward osmosis system which may be similar or identical to the act 1760 in one or more aspects. In examples, the at least one permeable solute may include alcohol. For example, the feed solution may include an alcoholic beverage such as one or more of beer, wine, or distilled spirits.

The method may include circulating the diluted draw stream through a reverse osmosis element to separate at least some of the solutes (e.g., permeable and/or impermeable solutes) from the diluted draw stream. The reverse osmosis element may produce a reverse osmosis concentrate (e.g., reject) and a reverse osmosis permeate. The reverse osmosis permeate may be further processed. For example, the reverse osmosis permeate may be distilled to separate distillate (e.g., alcohol) from the draw permeate (e.g., still bottoms). The distillate may be recycled to regenerate the draw stream or to the feed stream. The draw permeate remaining after distillation may be further processed to separate any residual or remaining solutes from the draw permeate (e.g., still bottoms), such as to produce substantially pure water. The draw permeate may be processed in at least a second reverse osmosis element to produce a second reverse osmosis concentrate (e.g., substantially pure alcohol or another solute) and a second reverse osmosis permeate (e.g., substantially pure water). The second reverse osmosis concentrate may be recirculated to the reverse osmosis permeate exiting the first reverse osmosis element prior to entering the distillation apparatus to recover the solute(s) (e.g., alcohol) therein. In embodiments, the solute(s) recovered from one or more of the reverse osmosis element, the distillation apparatus, and the second reverse osmosis element may be recycled to regenerate the draw solution.

The method may include selectively controlling a concentration of the at least one permeable solute in the feed solution prior to introducing the feed solution into the forward osmosis system. For example, the at least one permeable solute concentration of the feed solution may be controlled by adding one or more of water or concentrated feed solution to the feed solution prior to introducing the feed solution into the forward osmosis system, such as disclosed herein with respect to FIG. 14. In examples, selectively controlling a concentration of the at least one permeable solute in the feed solution prior to introducing the feed solution into the forward osmosis system may include sensing or detecting the concentration of the at least one permeable solute (e.g., alcohol) in one or more of the feed solution, the concentrated feed solution, or the diluted draw solution and responsive thereto, selectively adding one or more of water or concentrated feed solution to the feed solution to control the at least one permeable solute in the feed solution or concentrated feed solution. In examples, the selective control (e.g., addition of water or concentrated feed solution) can be carried out continuously to maintain a selected alcohol concentration in the concentrated feed solution.

In examples, adding water to the feed solution can include adding one or more of tap water, softened water, distilled water, purified water, filtered water, ion exchanged water, deaerated water, municipal water, culinary water, boiled water, treated water, pH balanced water, water recycled from the distillation apparatus and/or at least a second RO element, or any other type of potable water, to the feed solution. In examples, selectively controlling a concentration of the at least one permeable solute in the feed solution may include cycling the diluted draw solution through at least a first reverse osmosis system to provide a first reverse osmosis permeate having a lower concentration of the two or more solutes and at least one permeable solute than the diluted draw solution. In examples, selectively controlling a concentration of the at least one permeable solute in the feed solution may include distilling the first reverse osmosis permeate to produce bottoms having a lower concentration of the two or more solutes and at least one permeable solute than the reverse osmosis permeate. In examples, selectively controlling a concentration of the at least one permeable solute in the feed solution may include cycling the bottoms through at least a second reverse osmosis system to provide a second reverse osmosis permeate that is substantially pure water. In examples, selectively controlling a concentration of the at least one permeable solute in the feed solution may include adding water to the feed solution. In examples, adding water to the feed solution may include recycling the substantially pure water from the second reverse osmosis permeate to the feed solution. In examples, the feed solution may include beer, wine, or distilled spirits and the at least one permeable solute may include one or more of glycerin or alcohol.

The above described methods and systems can be used to form concentrated beer, wine, malted beverages, liquor, or other alcoholic solutions. The above described methods and systems can be used to form dewatered and/or non-alcoholic beer, wine, malted beverages, liquor, or other concentrates from previously alcohol-containing beverages. The methods and systems can also include acts and components to reconstitute the concentrated beer, wine, malted beverages, liquor, other alcoholic solutions, or concentrates via controlled addition of at least water thereto.

Other specific forms of examples described herein may be used without departing from its spirit or essential characteristics. The described embodiments are to be considered in all respects only as illustrative and not restrictive. For example, any of the individual acts of the methods and components of the systems disclosed herein can be used with any of the other methods and systems disclosed herein. The scope of the invention is, therefore, indicated by the appended claims rather than by the foregoing description. All changes that come within the meaning and range of equivalency of the claims are to be embraced within their scope.

What is claimed is:

1. A method for concentrating a solution, the method comprising:
introducing a feed solution having at least one permeable solute comprising ethanol into a first side of a forward osmosis system;
circulating a draw solution through a second side of the forward osmosis system in a countercurrent flow with respect to the feed solution, the draw solution having one or more solutes and a concentration of the at least one permeable solute that is lower than a concentration of the at least one permeable solute in the feed solution;
generating a diluted draw solution in the second side of the forward osmosis system, the diluted draw solution having a higher water concentration and higher at least one permeable solute concentration than the draw solution;
producing a product stream including a concentrated feed solution from the first side of the forward osmosis system, the concentrated feed solution having a lower water content and a concentration of the at least one permeable solute that is less than the concentration of the at least one permeable solute in the feed solution;
regenerating the draw solution from the diluted draw solution; and
recirculating the draw solution that has been regenerated through the second side of the forward osmosis system.

2. The method of claim 1 wherein generating a diluted draw solution and producing a product stream includes removing water from the feed solution via a forward osmosis membrane.

3. The method of claim 2, wherein generating a diluted draw solution and producing a product stream includes removing ethanol from the feed solution via the forward osmosis membrane.

4. The method of claim 1, wherein the feed solution includes beer, wine, a malt beverage, distilled spirits, or combinations thereof.

5. The method of claim 1, wherein the feed solution has an at least about 1 wt % greater concentration of the at least one permeable solute than the concentrated feed solution.

6. The method of claim 1, wherein the one or more solutes in the draw solution include ethanol and glycerol.

7. The method of claim 1, wherein regenerating the draw solution from the diluted draw solution includes cycling the diluted draw solution through a first reverse osmosis process followed by at least a second reverse osmosis process.

8. The method of claim 1, wherein regenerating the draw solution from the diluted draw solution includes cycling the diluted draw solution through at least one reverse osmosis process followed by at least one distillation process.

9. The method of claim 1, further comprising:
processing the diluted draw solution in a first reverse osmosis element to produce a reverse osmosis permeate and a reverse osmosis reject;
distilling the reverse osmosis permeate in a distillation apparatus to produce a retained stream and a distillate; and
processing the retained stream from the distillation apparatus to produce a second reverse osmosis permeate and a second reverse osmosis concentrate;
wherein the second reverse osmosis concentrate includes the at least one permeable solute and the second reverse osmosis permeate includes substantially pure water.

10. The method of claim 9, further comprising recirculating the second reverse osmosis concentrate to the reverse osmosis permeate exiting the first reverse osmosis element.

11. The method of claim 1, further comprising at least partially reconstituting the concentrated feed solution.

12. A method for concentrating an alcoholic beverage via forward osmosis, the method comprising:
introducing the alcoholic beverage into a first side of a forward osmosis system;
circulating a draw solution in a second side of the forward osmosis system in a countercurrent flow with respect to the alcoholic beverage, the draw solution having an ethanol concentration lower than the ethanol concentration in the alcoholic beverage;
generating a diluted draw solution in the second side of the forward osmosis system, the diluted draw solution having a higher water concentration and higher ethanol concentration than the draw solution;
producing a product stream including a concentrated beverage having a reduced ethanol content and reduced water content from the first side of the forward osmosis system;
regenerating the draw solution from the diluted draw solution; and
producing a permeate stream from the diluted draw solution.

13. The method of claim 12, wherein the draw solution includes a total solutes content that is higher than a total solutes content of the alcoholic beverage.

14. The method of claim 12, further comprising selectively controlling a concentration of one or more solutes in the alcoholic beverage by adding one or more of water or concentrated beverage to the alcoholic beverage prior to introducing the alcoholic beverage into the first side of the forward osmosis system.

15. A system for concentrating a solution, the system comprising:
a forward osmosis element including at least one selectively permeable forward osmosis membrane separating a first side of the forward osmosis element from a second side of the forward osmosis element;
a supply of a solution containing one or more permeable solutes comprising ethanol fluidly coupled to the first side;
a supply of a draw solution operably coupled to the second side in a countercurrent flow with respect to the first side, the draw solution having a concentration of the one or more permeable solutes that is less than a concentration of the one or more permeable solutes in the solution and a total solutes concentration higher than a total solutes concentration of the solution; and
at least one draw solution regenerating apparatus operably coupled to the second side and configured to receive output therefrom.

16. The system of claim 15, wherein the at least one draw solution regenerating apparatus includes at least one of a reverse osmosis apparatus, a low-rejection reverse osmosis apparatus, or a distillation apparatus.

17. The system of claim 15, wherein the at least one draw solution regenerating apparatus includes:
a first reverse osmosis element operably coupled to the second side of the forward osmosis element to receive a diluted draw stream therefrom and produce a first reverse osmosis permeate and a first reverse osmosis concentrate;
a distillation apparatus operably coupled to the first reverse osmosis element to receive the first reverse osmosis permeate therefrom and produce a distillate and retained stream; and
a second reverse osmosis element operably coupled to the distillation apparatus to receive the retained stream therefrom and produce a second reverse osmosis permeate and a second reverse osmosis concentrate.

18. The system of claim 17, wherein the at least one draw solution regenerating apparatus includes:
a first series of draw solution regeneration apparatuses including one or more of at least one of a reverse osmosis apparatus, a low-rejection reverse osmosis apparatus, or a distillation apparatus; and
at least a second series of draw solution regeneration apparatuses including one or more of at least one of a reverse osmosis apparatus, a low-rejection reverse osmosis apparatus, or a distillation apparatus.

19. The system of claim 15, wherein a reject side of the at least one draw solution regeneration apparatus is fluidly coupled to the supply of the draw solution and configured to supply a regenerated draw solution thereto.

20. The system of claim 15, wherein a permeate side of the at least one draw solution regeneration apparatus is fluidly coupled to one or more of the supply of the solution or a product side of the forward osmosis element, and is configured to supply a water permeate thereto.

* * * * *